(12) United States Patent
Cochran et al.

(10) Patent No.: US 10,570,238 B2
(45) Date of Patent: Feb. 25, 2020

(54) THERMOPLASTIC ELASTOMERS VIA ATOM TRANSFER RADICAL POLYMERIZATION OF PLANT OIL

(71) Applicant: Iowa State University Research Foundation, Inc., Ames, IA (US)

(72) Inventors: Eric William Cochran, Ames, IA (US); Ronald Christopher Williams, Ames, IA (US); Nacu Hernandez, Ames, IA (US); Andrew A. Cascione, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 31 days.

(21) Appl. No.: 15/896,151

(22) Filed: Feb. 14, 2018

(65) Prior Publication Data

US 2018/0237571 A1    Aug. 23, 2018

Related U.S. Application Data

(62) Division of application No. 13/744,733, filed on Jan. 18, 2013, now Pat. No. 9,932,435.

(60) Provisional application No. 61/587,816, filed on Jan. 18, 2012.

(51) Int. Cl.
| | | |
|---|---|---|
| *C08F 267/06* | (2006.01) | |
| *C09J 153/00* | (2006.01) | |
| *C08L 53/00* | (2006.01) | |
| *C08F 293/00* | (2006.01) | |

(52) U.S. Cl.
CPC ........ *C08F 267/06* (2013.01); *C08F 293/005* (2013.01); *C08L 53/00* (2013.01); *C09J 153/00* (2013.01); *C08F 2438/01* (2013.01); *C08L 2555/80* (2013.01); *C08L 2666/24* (2013.01)

(58) Field of Classification Search
CPC .......................... C08F 293/005; C08F 2438/01
See application file for complete search history.

(56) References Cited

U.S. PATENT DOCUMENTS

| | | | |
|---|---|---|---|
| 2,190,906 A | 2/1940 | Stoesser et al. | |
| 3,499,857 A | 3/1970 | Searight et al. | |
| 5,763,548 A | 6/1998 | Matyjaszewski et al. | |
| 5,932,675 A | 8/1999 | Rizzardo et al. | |
| 6,184,289 B1 | 2/2001 | Teranishi et al. | |
| 6,197,905 B1 | 3/2001 | Rizzardo et al. | |
| 6,235,857 B1 | 5/2001 | Rizzardo et al. | |
| 6,512,081 B1 | 1/2003 | Rizzardo et al. | |
| 6,538,091 B1 | 3/2003 | Matyjaszewski et al. | |
| 6,642,318 B1 | 11/2003 | Chiefari et al. | |
| 7,205,362 B2 | 4/2007 | Favier et al. | |
| 7,714,075 B1 | 5/2010 | Le et al. | |
| 9,650,463 B2 | 5/2017 | Cochran et al. | |
| 9,926,392 B2 | 3/2018 | Cochran et al. | |
| 2002/0095007 A1 | 7/2002 | Larock et al. | |
| 2003/0088007 A1 | 5/2003 | Wool et al. | |
| 2003/0212168 A1 | 11/2003 | White et al. | |
| 2006/0252901 A1 | 11/2006 | Narayan et al. | |
| 2008/0153982 A1 | 6/2008 | Lai et al. | |
| 2008/0281071 A1 | 11/2008 | Ionescu et al. | |
| 2011/0302825 A1 | 12/2011 | Bloom | |
| 2012/0316309 A1 | 12/2012 | Chisholm et al. | |
| 2013/0142996 A1 | 6/2013 | Poncelet et al. | |
| 2013/0145957 A1 | 6/2013 | Shchukin et al. | |
| 2013/0184383 A1 | 7/2013 | Cochran et al. | |
| 2014/0343192 A1 | 11/2014 | Cochran et al. | |

FOREIGN PATENT DOCUMENTS

| | | |
|---|---|---|
| CL | 200101275 | 5/2002 |
| CL | 2014001890 A | 1/2015 |
| CN | 101563377 A | 10/2009 |
| CN | 102203149 A | 9/2011 |
| EP | 1384729 A1 | 1/2004 |
| EP | 2430096 A1 | 6/2015 |
| ES | 2108646 B1 | 12/1997 |
| FR | 2670497 | 6/1992 |
| IL | 172766 B | 3/2011 |
| JP | S33-003732 A | 5/1958 |

(Continued)

OTHER PUBLICATIONS

Office Action in European Patent Application No. 13738906.0, based on PCT/US2013/022131, dated Oct. 8, 2018.
Office Action in Indonesian Patent Application No. P-00201404758, based on PCT/US2013/022131, dated Nov. 2, 2018.
Office Action in Korean Patent Application No. 10-2014-7022520, based on PCT/US2013/022131, dated Nov. 16, 2018.
Office Action in Japanese Application No. 2016-515021 dated Mar. 19, 2018 based on PCT/US2014/038799.
Extended European Search Report for European Patent Application No. 18150507.4 dated May 5, 2018.

(Continued)

*Primary Examiner* — Jeffrey C Mullis
(74) *Attorney, Agent, or Firm* — Pepper Hamilton LLP

(57) ABSTRACT

The present invention relates to a block copolymer comprising at least one PA block and at least one PB block. The PA block represents a polymer block comprising one or more units of monomer A, and the PB block represents a polymer block comprising one or more units of monomer B. Monomer A is a vinyl, acrylic, diolefin, nitrile, dinitrile, or acrylonitrile monomer. Monomer B is a radically polymerizable plant oil monomer containing one or more triglycerides. The present invention also relates to a method of preparing a thermoplastic block copolymer by radical polymerizing a radically polymerizable monomer with a radically polymerizable plant oil monomer containing one or more triglycerides, in the presence of an initiator and a transition-metal catalyst system to form the thermoplastic block copolymer. The polymerized plant oil-based block copolymers are useful in a variety of applications, such as asphalt modifiers, rubber compositions, adhesives, tires, in the automobile industry, footwear, packaging, etc.

31 Claims, 22 Drawing Sheets

(56) References Cited

FOREIGN PATENT DOCUMENTS

| JP | 57-165460 A | 10/1982 |
|---|---|---|
| JP | H01-129097 A | 5/1989 |
| JP | 2002-528609 A | 9/2002 |
| JP | 2003-012719 A | 1/2003 |
| JP | 2003-504437 A | 2/2003 |
| JP | 2009-529081 | 8/2009 |
| JP | 2012-514117 A | 6/2012 |
| WO | WO 1992/13903 A1 | 8/1992 |
| WO | WO 1994/22957 | 10/1994 |
| WO | WO 1999/05099 A1 | 2/1999 |
| WO | WO 1999/021900 A1 | 5/1999 |
| WO | WO 1999/31144 A1 | 6/1999 |
| WO | WO 2001059008 A1 | 8/2001 |
| WO | WO 2005/000923 A1 | 1/2005 |
| WO | WO 2005/000924 A1 | 1/2005 |
| WO | WO 2005/113612 A1 | 12/2005 |
| WO | WO 2007/100719 A1 | 9/2007 |
| WO | WO 2007/101909 A1 | 9/2007 |
| WO | WO 2009/105688 A1 | 9/2009 |
| WO | WO 2010/078320 | 7/2010 |
| WO | 2013/003887 | 1/2013 |
| WO | WO 2013/109878 A1 | 7/2013 |

OTHER PUBLICATIONS

Alemdar et al., "Production of Oil-Based Binder by RAFT Polymerization Technique", Progress in Organic Coatings, 69(4):552-526 (2010).
Alemdar et al., "Styrenation of Triglyceride Oil by Nitroxide Mediated Radical Polymerization," Progress in Organic Coatings 66:99-106 (2009).
Alli et al., "Poly(N-isopropylacrylamide) thermoresponsive cross-linked conjugates containing polymeric soybean oil and/or polypropylene glycol", European Polymer Journal 44: 1701-1713 (2008).
Bonnaillie et al., "Thermosetting Foam with a High Bio-Based Content from Acrylated Epoxidized Soybean Oil and Carbon Dioxide," J. Appl. Polym. Sci. 105: 1042-52 (2007).
Cakmakli et al., "Synthesis and Characterization of Polymeric Linseed Oil Grafted Methyl Methacrylate or Styrene", Macromol. Biosci., 4: 649-655 (2004).
Can et al., "Rigid, Thermosetting Liquid Molding Resins From Renewable Resources. I. Synthesis and Polymerization of Soy Oil Monoglyceride Maleates," Journal of Applied Polymer Science 81:69-77 (2001).
Cascione et al., "Development of Biopolymers from Soybean Oil," Presentation at the Petersen Asphalt Conference, Laramie, WY (Oct. 10, 2012).
Cascione et al., "Investigation of Bitumen Modified with Biopolymers Derived from Soybean Oil," Presented at the 5th European Asphalt Technology Association (EATA) Conference, Braunschweig, Germany (Jun. 3-5, 2013).
Cochran et al., "Kumho Pre-Poposal for Development of a Bitumen Modifier from Thermoplastic Elastomers Produced with Soybean Oil Feedstock" (Jan. 19, 2011).
Cochran et al., "Development of Oil-Based Styrenic Block Copolymers via Atom Transfer Radical Polymerization for Bitumen Modification," White paper to DuPont (May 2011).
Cochran et al., "Development of Soybean Oil-Based Styrenic Block Copolymers via Atom Transfer Radical Polymerization for Bitumen Modification," A Grant Proposal to Kumho Petrochemical Initiative, submitted Jan. 19, 2011.
Cochran et al., "Development of Bio Based Polymers for Use in Asphalt," White paper to DOT (Mar. 7, 2011).
Cochran et al., "Thermoplastic Elastomers for Bitumen Modifications from Soybean Oil-Based Styrenic Block Copolymers," Presentation to DuPont (Jun. 21, 2011).
Compendium of Chemical Terminology Gold Book, published by the International Union of Pure and Applied Chemical Chemistry (version 2.3.2, Aug. 19, 2012), pp. 322-323.

Demirbas, "Mechanisms of Liquefaction and Pyrolysis Reactions of Biomass," Energy Conversion & Management 41:633-646 (2000).
Dong et al., "Synthesis of Hyperbranched Polymers with Pendent Norbornene Functionalities via RAFT Polymerization of a Novel Asymmetrical Divinyl Monomer," Macromolecules 42(13):4596-5603 (2009).
Dong et al., "Branched Polystyrene with Abundant Pendant Vinyl Functional Groups from Asymmetric Divinyl Monomer," J. Polym. Sci., Part A: Polym. Chem. 46(18):6023-6034 (2008).
Dziczkowski et al., "Route to Co-Acrylic Modified Alkyd Resins Via a Controlled Polymerization Technique", Progress in Organic Coatings, 73(4):355-365 (2012).
Extended European Search Report and European Search Opinion in European National Application No. 13738906.0 based on PCT/US2013/02131 (dated Jun. 25, 2015).
Final Examination Report in Singapore Application No. 11201404228U (dated Jun. 28, 2016).
Fokou et al., "Acyclic Triene Metathesis Polymerization with Chain-Stoppers: Molecular Weight Control in the Synthesis of Branched Polymers," Macromol. Rapid Commun. 29:1620-25 (2008).
Funke et al., "Microgels—Intramolecularly Crosslinked Macromolecules with a Globular Structure," Advances in Polymer Science. 136:142-227 (1998).
Gao et al., "Gelation in ATRP Using Structurally Different Branching Reagents: Comparison of Inimer, Divinyl and Trivinyl Cross-Linkers," Macromolecules 42: 8039-43 (2009).
Gao et al., "Polymers from Triglyceride Oils II. Vinyl Polymers and Some Other Composites or Hybrid Materials," Guangzhou Chemistry, 35(4): 61-71 (2010). Abstract in English.
Gultekin et. al., "Styrenation of Castor Oil and Linseed Oil by Macromer Method," Macromol. Mater. Eng. 283:15-20 (2000).
Harrison et al., "Peroxide Catalyzed Polymerization of Styrene in Pure Fatty Methyl Esters," The Journal of the American Oil Chemists' Society 114-117 (1953).
Henna et al., "Biobased Thermoset From the Free-Radical Copolymerization of Conjugated Linseed Oil," Journal of Applied Polymer Science 104:979-985 (2007).
Hernandez, "Thermoplastic Elastomeric Block Copolymers Via Controlled Radical Polymerization of Soybean Oil," Abstract on ACS website (Aug. 21, 2012).
Hernandez et al., "Thermoplastic Elastomeric Block Copolymers Via Controlled Radical Polymerization of Soybean Oil," Presentation at the American Chemical Society Meeting, Philadelphia, PA (Aug. 21, 2012).
Hernandez-Cantu, "Sustainability Through Blockcopolymers—Novel Ion Exchange Cathode Membranes and Soybean Oil Based Thermoplastic Elastomers," Thesis, Iowa State University, Ames, IA (submitted Nov. 15, 2012).
Hernandez-Cantu, "Sustanability Through Blockcopolymers—Fuel Cells' Cathode Membranes and Soybean Oil Based Thermoplastic Elastomers," Thesis Defense Presentation, Ames, IA (Nov. 2012).
Hsu et al. "Free-Radical Crosslinking Copolymerization of Styrene/Unsaturated Polyester Resins: 1. Phase Separation and Microgel Formation", Polymer, 34(21): 4496-1505 (1993).
International Preliminary Report on Patentability, dated Jul. 31, 2014, for PCT/US2013/022131.
International Search Report and the Written Opinion of the International Search Authority for PCT/US2014/038799, dated Jan. 29, 2015.
International Search Report and the Written Opinion of the International Searching Authority, or the Declaration, dated May 7, 2013, for PCT/US2013/022131.
International Preliminary Report on Patentability for PCT/US2014/038799, dated Oct. 2, 2015.
Khot et al., "Development and Application of Triglyceride-based Polymers and Composites," J. Appl. Polym. Sci. 82: 703-23 (2001).
Landin et al., "Rheological Changes During the Copolymerization of Vinyl and Divinyl Monomers", ACS Symposium Series, 243(3): 33-46 (1984).
Lebreton et al., "Use of Original ω-Perfluorinated Dithioesters for the Synthesis of Well-Controlled Polymers by Reversible Addition-Fragmentation Chain Transfer (RAFT)," Macro. Chem. Phys. 203(3):522-37 (2002).

(56) References Cited

OTHER PUBLICATIONS

Lin et al., "Reversible Addition-Fragmentation Chain Transfer Mediated Radical Polymerization of Asymmetrical Divinyl Monomers Target Hyperbranched Vinyl Polymers," J. Polym. Sci. 45: 26-40 (2006).
Lu et al., "Novel Polymeric Materials from Vegetable Oils and Vinyl Monomers: Preparation, Properties, and Applications," ChemSusChem 2:136-147 (2009).
Masaki et al., "Kinetic Study of the Crosslinking Reaction of 1,2-Polybutadiene with Dicumyl Peroxide in the Absence and Presence of Vinyl Acetate," J. Polym. Sci., Part A: Polym. Chem. 42(17):4437-47 (2004).
Matsumoto et al., "Approach to Ideal Network Formation Governed by Flory-Stockmayer Gelation Theory in Free-Radical Cross-Linking Copolymerization of Styrene with m-Divinylbenzene," Macromolecules, 32:8336-39 (1999).
McCleery, "Goodyear Researchers Try Soybean Oil as Tire Ingredient," IndyStar Online Edition Business Section (Jul. 25, 2012).
Meier et al., "Plant Oil Renewable Resources as Green Alternatives in Polymer Science," Chem. Soc. Rev. 36:1788-1802 (2007).
Moad et al., "Living Radical Polymerization by the RAFT Process" Aust. J. Chem. 58:379-410 (2005).
Moad et al., "Living Radical Polymerization by the RAFT Process—A First Update," Aust. J. Chem. 59:669-692 (2006).
Moad et al., "Living Radical Polymerization by the RAFT Process—A Second Update," Aust. J. Chem. 62:1402-1472 (2009).
Moad et al., "Living Radical Polymerization by the RAFT Process—A Third Update," Aust. J. Chem. 65: 985-1076 (2012).
Moad, "RAFT (Reversible Addition-Fragmentation Chain Transfer) Crosslinking (Co)Polymerization of Multi-Olefinic Monomers to Form Polymer Networks," Polym. Int. 64: 15-24 (2014).
"Modern Styrenic Polymers: Polysterenes and Styrenic Copolymers," Scheirs, eds. John Wiley & Sons, Ltd (2003) ("Handbook").
Office Action dated Jul. 20, 2017 in Australian National Application No. 2014268692, based on PCT/US2014/038799.
Pure and Applied Chem., 66(5)1155-1156.
Written opinion in Canada. National Application App. No. 2,860,861, based on PCT/US2013/022131 dated Dec. 15, 2017.
Office Action dated Apr. 5, 2017, in Chilean National Application No. 201503375, based on PCT/US2014/038799.
Office Action dated Aug. 23, 2017 in Chilean National Application No. 201503375, based on PCT/US2014/038799. English Translation also provided.
Office Action dated Sep. 5, 2017 in Chilean National Application No. 1890-2014, based on PCT/US2013/022131. English Translation also provided.
First Office Action and Search Report in Chinese National Application No. 201380009567.9 based on PCT/US2013/02131 (dated Nov. 5, 2015).
Second Office Action and Supplemental Search Report in Chinese National Application No. 201380009567.9 based on PCT/US2013/02131 (dated Jun. 8, 2016).
Third Office Action and Supplemental Search Report in Chinese National Application No. 201380009567.9 based on PCT/US2013/02131 (dated Nov. 15, 2016).
Fourth Office Action dated Jul. 12, 2017 in Chinese National Application No. 201380009567.9, based on PCT/US2013/022131. English Translation also provided.
Office Action dated Jan. 19, 2018 in Chinese National Application No. 201480029039.4 based on PCT/US2014/038799.
Office Action dated Apr. 12, 2017 in Chinese National Application No. 201480029039.4, based on PCT/US2014/038799. English translation also provided.
Office Action in Eurasia National Application No. 201491384, based on PCT/US2013/02131, dated May 31, 2017. English translation also provided.
Office Action in Eurasia National Application No. 201491384 based on PCT/US2013/022131 (dated Jan. 28, 2016).
Office Action in Eurasia National Application No. 201491384 based on PCT/US2013/022131 (dated Oct. 4, 2016).
Office Action dated Feb. 27, 2017, in Eurasian National Application No. 201592176, based on PCT/US2014/038799. English Translation also provided.
Office Action dated Nov. 24, 2017 in Eurasian National Application No. 201592176, based on PCT/US2014/038799. English Translation also provided.
Office Action dated Jul. 26, 2017 in European National Application No. 14732720.9, based on PCT/US2014/038799.
Office Action dated Mar. 19, 2017, in Israel National Application No. 233491, based on PCT/US2013/022131. English Translation also provided.
Notice of Reasons for Rejection in Japanese Patent Application No. 2014-553449 (dated Dec. 7, 2016).
Notice of Reasons for Rejection in Japanese Application No. 2014-553449, based on PCT/US2013/022131 (dated Aug. 28, 2017) English Translation also provided.
Office Action dated Sep. 15, 2017 in Malaysia National Application No. PI2014002118, based on PCT/US2013/022131. English Translation provided.
Office Action in Mexico National Application No. MX/a/2014/008636 corresponding to PCT/2013/022131.
Search Report and Written Opinion for Singapore Patent Application No. 11201404228U dated Dec. 10, 2015.
Office Action dated Sep. 12, 2017 in Singapore National Application No. 10201606742U, based on PCT/US2014/038799.
Written opinion in Singapore National Application App. No. 10201606740Q based on PCT/US2014/038799 dated Nov. 30, 2017.
Office Action in U.S. Appl. No. 13/744,733 (dated Mar. 17, 2015).
Office Action in U.S. Appl. No. 13/744,733 (dated Aug. 25, 2015).
Office Action in U.S. Appl. No. 13/744,733 (dated Apr. 20, 2016).
Office Action in U.S. Appl. No. 13/744,733 (dated Oct. 14, 2016).
Office Action in U.S. Appl. No. 14/282,737 (dated Nov. 23, 2015).
Office Action in U.S. Appl. No. 14/282,737 (dated Feb. 5, 2016).
Office Action in U.S. Appl. No. 14/282,737 (dated Jul. 15, 2016).
Office Action in U.S. Appl. No. 13/744,733 (dated Jun. 8, 2017).
Polanowski et al., "Modeling of Branching and Gelation in Living Copolymerization of Monomer and Divinyl Cross-Linger Using Dynamic Lattice Liquid Model (DLL) and Flory-Stockmayer Model," Polymer 51(25):6084-92 (2010).
Pradel et al., "Controlled Radical Polymerization of 1,3-Butadiene. II. Initiation by Hydrogen Peroxide and reversible Termination by TEMPO," J. Polym. Sci., Part A: Polym. Chem. 38(18):3293-3302 (2000).
Robertson et al., "Sustainable thermoplastic elastomers derived from vegetable oils," Abstract for the Presentation at 245th ACS National Meeting and Exposition, Apr. 10, 2013, New Orleans, Louisiana.
Saithai et al., "Synthesis and Characterization of Triglyceride-based Copolymer from Soybean Oil", Materials Science Forum, 695:320-323 (2011).
Skey et al., "Facile One Pot Synthesis of a Range of Reversible Addition-Fragmentation Chain Transfer (RAFT) Agents", Chem Comm., 4183-4185 (2008).
Sun et al., "Microgel Formation in the Free Radical Cross-Linking Copolymerization of Methyl Methacrylate (MMA) and Ethylene Glycol Dimethacrylate (EGDMA)", Ind. Eng. Chem. Res. 36:1343-1351 (1997).
Vo et al., "RAFT Synthesis of Branched Acrylic Copolymers," Macromolecules 40: 7119-25 (2007).
Wang et al., "Branching and Gelation in Atom Transfer Radical Polymerization of Methyl Methacrylate and Ethylene Glycol Dimethacrylate," Polym. Eng. Sci. 45: 720-27 (2005).
Wang et al., "Sustainable Thermoplastic Elastomers Derived from Fatty Acids", Macromolecules, 46(18):7207-7212 (2013).
Wei et al., "Ab initio RAFT Emulsion Polymerization of Butadiene Using the Amphiphilic Poly(acrylic acid-b-styrene) Trithiocarbonate as Both Surfactant and Mediator," J. Polym. Sci. 49:2980-89 (2011).
Wei et al., "Synthesis of Structured Nanoparticles of Styrene/Butadiene Block Copolymers via RAFT Seeded Emulsion Polymerization," Polym. 51:3879-86 (2010).

(56) References Cited

OTHER PUBLICATIONS

Wei et al., "Styrene-Butadiene-Styrene Triblock Copolymer Latex via Reversible Addition-Fragmentation Chain Transfer Miniemulsion Polymerization," Ind. Eng. Chem. Res. 51:15530-35 (2012).
Wikipedia, "Molar Mass Distribution;" accessed Dec. 18, 2015.
Williams et al., "Development of Bio Based Polymers for Use in Asphalt", a white paper to Iowa Department of Transportation (Mar. 7, 2011).
Williams et al., "Development of Bio-Based Polymers for Use in Asphalt", InTrans Project Reports, Iowa State University, Institute for Transportation, 1-34 (Feb. 2014).
Xia et al., "Vegetable Oil-Based Polymeric Materials: Synthesis, Properties, and Applications," Green Chem. 12:1893-1909 (2010).
Yan et al., "Gel Point Suppression in RAFT Polymerization of Pure Acrylic Cross-Linker Derived from Soybean Oil," Biomacromolecules 17(8):2701-9 (2016).
Young et al., "Radical Polymerization," Introduction to Polymers, Boca Raton, FL: CRC, 2011. 117-18. eBook PDF.
Yu et al., "Reaction Behavior and Network Development in RAFT Radical Polymerization of Dimethacrylates," Macromol. Chem. Phys. 209: 551-56 (2008).
Yu et al., "Comparison of Reaction Kinetics and Gelation Behaviors in Atom Transfer, Reversible Addition-Fragmentation Chain Transfer and Conventional Free Radical Copolymerization of Oligo(ethylene glycol) Methyl Ether Methacrylate and Oligo(ethylene glycol) Dimethacrylate" Polymer 50: 3488-94 (2009).
Yu et al., "Interfacially Confined RAFT Miniemulsion Copolymerization of Styrene and Butadiene," J. Appl. Polym. Sci. 127:2557-65 (2013).
Office Action in India Patent Application No. 5488/CHENP/2014, based on PCT/US2013/022131, dated May 16, 2019.
Office Action in Thailand Application No. 1501006934, based on PCT/US2014/038799, dated Jun. 18, 2018.
Office Action in Malaysian Patent Application No. PI 2017001677, based on PCT/US2013/022131, dated Jun. 29, 2019.
Office Action in U.S. Appl. No. 16/123,601, dated Aug. 9, 2019.
Black et al. "Chain Transfer of Vegetable Oil Macromonomers in Acrylic Solution Copolymerization," Journal of Applied Polymer Science 120:1390-1396 (2011).
Office Action in U.S. Appl. No. 16/020,818, dated Jul. 29, 2019.
Eren et al. "Synthesis and Polymerization of the Acrylamide Derivatives of Fatty Compounds," Journal of Applied Polymer Science 97:2264-2272 (2005).
Heimenz "Networks, Gels, and Rubber Elasticity," Polymer Chemistry 2nd Ed., Boca Raton, FL: CRC Press, pp. 410-414 (2007).
Wikipedia, "Compression molding" (Accessed: Sep. 10, 2019).
Rosato, "Compression Molding," Plastic Product Material and Process Selection Handbook, New York, New York; Elsevier, pp. 439-454 (2004).
Capelot et al., "Catalytic Control of the Vitrimer Glass Transition," ACS Macro Lett. 1:789-792 (2012).
Montamal et al., "Silica-Like Malleable Materials from Permanent Organic Networks," Science 334:965-968 (2011).
Office Action in U.S. Appl. No. 16/123,601, dated Nov. 15, 2019.
Office Action in India Application No. 7116/CHENP/2015, based on PCT/US2014/038799, dated Nov. 15, 2019.
Bening et. al, "Styrenic Block Copolymer Elastomers," in Scheirs eds., Modern Styrenic Polymers: Polystyrenes and Styrenic Copolymers, John Wiley & Sons (2003).
Preliminary Office Action in Brazil Application No. 112014017476-8, based on PCT/US2013/022131, dated Nov. 12, 2019 (with English translation).
Preliminary Office Action in Brazil Application No. 1112015028368-3, based on PCT/US2014/038799, dated Dec. 12, 2019 (with English translation).

THERMOPLASTIC ELASTOMERS VIA ATOM TRANSFER RADICAL POLYMERIZATION OF PLANT OIL

This application is a Divisional of U.S. patent application Ser. No. 13/744,733, filed Jan. 18, 2013 which claims the benefit of U.S. Provisional Patent Application Ser. No. 61/587,816, filed Jan. 18, 2012, which is hereby incorporated by reference in its entirety.

FIELD OF THE INVENTION

The present invention relates to a novel thermoplastic elastomer composition and methods of making and using thereof. In particular, the present invention relates to a thermoplastic block copolymer comprising a block of radically polymerizable monomer and a block of polymerized plant oil containing one or more triglycerides, methods for making the thermoplastic block copolymer, and uses of the thermoplastic block copolymer in various applications.

BACKGROUND OF THE INVENTION

Styrenic block copolymers (SBCs), most notably those of DuPont's Kraton® family, such as styrene-butadiene type polymers (e.g., styrene-butadiene di-block, SB; styrene-butadiene-styrene tri-block, SBS), have historically served the asphalt and footwear industries for years, with markets also in the industries of packaging, pressure sensitive adhesives, packaging materials, etc. Of these markets, the use of SBSs as bitumen modifiers is one of the largest and the most forgiving in terms of material properties.

The global asphalt market is to reach 118.4 million metric tons by 2015, according to a January 2011 report by Global Industry Analysts, Inc. The asphalt paving industry accounts for the largest end-use market segment of asphalt. With increasing growth in the developing markets of China, India, and Eastern Europe, asphalt will be increasingly needed to construct roadway infrastructure for the next decade. The increased demand for asphalt, along with the need for improved asphalt materials/pavement performance, creates the opportunity for an asphalt modifier.

The grade of the asphalt governs the performance of paving mixtures at in-service temperatures. In many cases, the characteristics of bitumen needs to be altered to improve its elastic recovery/ductility at low temperatures for sufficient cracking resistance as well as to increase its shearing resistance for sustained loads and/or at high temperatures for rutting resistance. The physical properties of bitumen are typically modified with the addition of SBS polymers to produce an improved asphalt grade that enhances the performance of asphalt paving mixtures. Of the asphalt mixtures that are polymer modified, approximately 80% of polymer modified asphalt uses SBS-type polymers.

Over the past few years, the price of butadiene, the principal component of SBC polymers used for bitumen modification, has increased dramatically. In 2008, there was a shortage of SBS polymers for the asphalt industry. With the forecast of increasing demand of liquid asphalt for the next decade, there remains a strong need for a new type of cost-effective, environment-friendly, viable polymers that can be used as an asphalt modifier in lieu of standard styrene-butadiene type modifiers.

Vegetable oils have been considered as monomeric feedstocks for the plastics industry for over 20 years. Polymers from vegetable oils have obtained increasing attention as public policy makers and corporations alike have been interested in replacing traditional petrochemical feedstocks due to their environmental and economic impact. To date, moderate success has been achieved through the application of traditional cationic and free radical polymerization routes to vegetable oils to yield thermoset plastics (i.e., plastics which, once synthesized, permanently retain their shape and are not subject to further processing). While these thermoset materials may indeed supplant a number of petrochemically-derived thermosets, the vast majority of commodity polymers are highly processable thermoplastic materials. There is thus a need in the art to develop from vegetable oils a highly processable thermoplastic and elastomeric polymer with a wide range of applications and physical properties.

The present invention is directed to fulfilling these needs in the art.

SUMMARY OF THE INVENTION

One aspect of the present invention relates to a block copolymer comprising at least one PA block and at least one PB block. The PA block represents a polymer block comprising one or more units of monomer A, and the PB block represents a polymer block comprising one or more units of monomer B. Monomer A is a vinyl, acrylic, diolefin, nitrile, dinitrile, or acrylonitrile monomer. Monomer B is a radically polymerizable plant oil monomer containing one or more triglycerides.

Another aspect of the present invention relates to a method of preparing a thermoplastic block copolymer. The method comprises providing a radically polymerizable monomer, represented by A, or a polymer block PA comprising one or more units of monomer A. A radically polymerizable plant oil monomer containing one or more triglycerides, represented by B, is also provided. Monomer A or the polymer block PA is then radically polymerized with monomer B, in the presence of an initiator and a transition-metal catalyst system to form the thermoplastic block copolymer.

Alternatively, the method of preparing a thermoplastic block copolymer comprises providing a radically polymerizable plant oil monomer containing one or more triglycerides, represented by B, or a polymer block PB comprising one or more units of monomer B. A radically polymerizable monomer, represented by A, is also provided. Monomer B or the polymer block PB is then radically polymerized with monomer A, in the presence of an initiator and a transition-metal catalyst system, to form the thermoplastic block copolymer.

A further aspect of the present invention relates to a thermoplastic polymer comprising one or more units of a radically polymerizable plant oil monomer containing one or more triglycerides.

Another aspect of the present invention relates to a method of preparing a thermoplastic polymer or polymer block. The method comprises providing a radically polymerizable plant oil monomer containing one or more triglycerides. This plant oil monomer is then radically polymerized, in the presence of an initiator and a transition-metal catalyst system to form the thermoplastic polymer block. This thermoplastic polymer can itself be used as a thermoplastic elastomer. Alternatively, this thermoplastic polymer can be used as a polymer block, and can be further polymerized with other monomers to form a polymerized plant oil-based thermoplastic block copolymer.

The disclosure of the present invention involves the successful application of atom transfer radical polymerization (ATRP) to biofeedstock, such as soybean oil. The distinctive feature of this chemistry is that it allows the design of the molecular architecture of the resultant polymers such that they are predominantly non-crosslinked linear or lightly branched chains that behave as elastomers/rubbers at room temperature but reversibly melt and are susceptible to common processing techniques at elevated temperatures. ATRP has received attentions with respect to petrochemical feedstocks, but it has not been successfully applied to biofeedstocks such as soybean oil. The success of the technology on vegetable oils such as soybean oil is surprising, as conventional radical polymerization typically brings the polymerization of triglycerides into thermoset materials, whereas the present invention successfully controls the polymerization of triglyceride so that it terminates at a desired molecular weight and block composition and produces thermoplastic polysoybean oil.

Typical monomers for chain-growth derived thermoplastic polymers are monofunctional, that is, the monomer contains only a single polymerizable functional group. Triglycerides contain a number of double bonds (which varies greatly within parent plant oil species and even between cultivars of the same species) and so as triglyceride monomers for polymerization will exhibit at least two varying functionalities. Accordingly, each polytriglyceride repeat unit has the potential to crosslink with at least one other polytriglyceride; when approximately a fraction of 1/N of such units have crosslinked (N denotes the number of repeat units in a polymer chain), the polymers are said to be at their "gel point" at which an infinite polymer network has formed and the material is a thermoset. Thus, when the reactivity of a propagating chain towards all functional sites on both free monomers and repeat units that are already incorporated into a chain are identical, the expectation is that the gel point will be reached at an extremely low conversion, such that, prior to gelation, the polytriglyceride has not yet achieved a degree of polymerization sufficient for useful mechanical properties to develop. This expectation is supported by the past two decades of reports of thermosets from vegetable oils produced by conventional cationic and free radical polymerization. The expectation of early gelation would also extend to ATRP if the reactivity ratios between propagating radials and all unreacted functional sites on the triglycerides were rigorously identical. In accordance with the present invention, preferences for free monomers can be exacerbated through the appropriate selection of temperatures and the use of counter-catalysts; under such conditions, it is possible to produce polymerized triglycerides to targeted molecular weights of up to 500 kDa prior to the gel point.

Polymerized vegetable oil, such as soybean oil, is intrinsically biodegradable, renewable, and are environmental friendly. The elastomeric properties of the vegetable oil polymer appear to be competitive with modern commodities such as polybutadiene (synthetic rubber). Further, the cost of the vegetable oil monomer is highly competitive. Thus, the novel thermoplastic polymers or block copolymer of the present invention provides a cost-effective, environment-friendly, viable polymers alternatives for the conventional petrochemially-derived materials.

These polymerized plant oil-based thermoplastic polymers or block copolymers are suitable in various applications, such as asphalt modifiers, adhesives, rubber compositions, in the automobile industry, footwear, packaging, etc.

BRIEF DESCRIPTION OF THE DRAWINGS

FIG. 1A depicts the process of preparing poly(soybean oil) by ATRP of soybean oil (SBO) that contains different triglyceride analogues. FIG. 1B depicts the process of preparing biopolymeric thermoplastic elastomer (i.e., poly(styrene-SBO-styrene)) by ATRP of styrene and SBO.

FIGS. 3A-3C show that molecular weight increases and the amount of monomer (i.e., the amount of product that has a lower molecular weight) decreases, as time increases.

DETAILED DESCRIPTION OF THE INVENTION

Figure 1A:
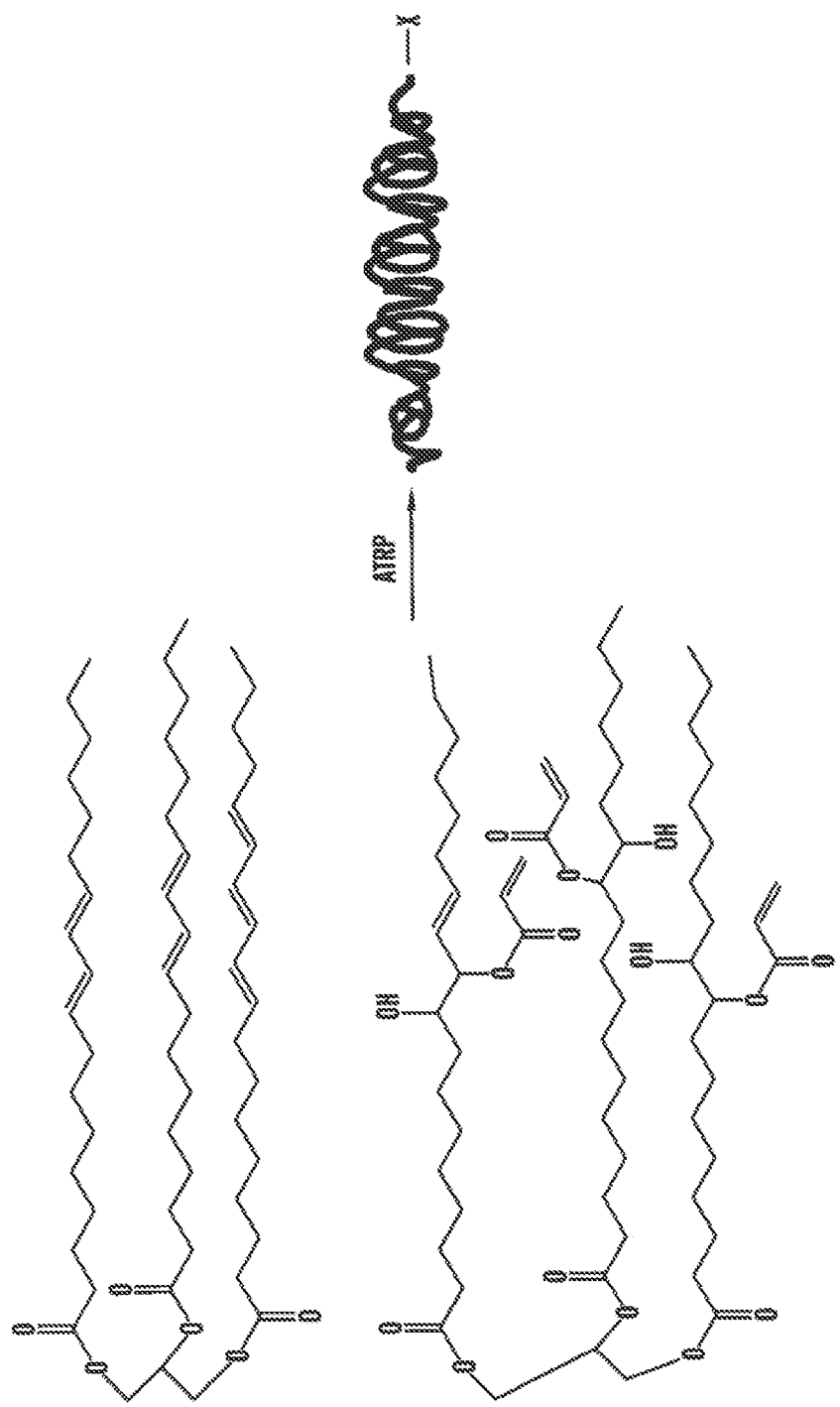
FIGS. 1A-1B are schematic drawings, illustrating the preparation of bio-polymeric thermoplastic elastomers (TPE) from soybean oil via atom transfer radical polymerization (ATRP).

One aspect of the present invention relates to a block copolymer comprising at least one PA block and at least one PB block. The PA block represents a polymer block comprising one or more units of monomer A, and the PB block represents a polymer block comprising one or more units of monomer B. Monomer A is a vinyl, acrylic, diolefin, nitrile, dinitrile, or acrylonitrile monomer. Monomer B is a radically polymerizable plant oil monomer containing one or more triglycerides.

The thermoplastic block copolymer can be a linear or light-branched copolymer, and can contain two or more blocks. Exemplary copolymer architecture includes, but are not limited to (PA-PB)$_n$, (PA-PB)$_n$-PA, and PB-(PA-PB)$_n$, n is an integer greater than 0. For example, n ranges from 2 to 50, or from 2 to 10. The block copolymer typically has a di-block polymer architecture (PA-PB), tri-block polymer architecture (PA-PB-PA or PB-PA-PB) or penta-block polymer architecture (PA-PB-PA-PB-PA or PB-PA-PB-PA-PB).

The PA block is made by polymerizing one or more radically polymerizable monomers, and has an average molecular weight of about 1 to about 300 kDa, or about 10 to about 30 kDa. The PA block may comprise repeating units of monomer A. For instance, the PA block can be a polymerized linear-chain or branched-chain monomer A or radicals thereof. The PB block is made by polymerizing one or more monomeric plant oil containing one or more triglycerides, and has an average molecular weight of about 5 to about 500 kDa, or about 40 to about 80 kDa. The PB block may comprise repeating units of monomeric plant oil containing one or more triglycerides. For instance, the PB block can be a polymerized linear-chain or branched-chain monomeric plant oil, or radicals thereof.

PA-PB di-block copolymers typically contain about 5 wt % to about 95 wt % of the polymerized A block and about 95 wt % to about 5 wt % of polymerized plant oil block. PA-PB-PA or PB-PA-PB tri-block copolymers typically contain about 5 wt % to about 95 wt % of the polymerized A block and about 95 wt % to about 5 wt % of polymerized plant oil block. PA-PB-PA-PB-PA or PB-PA-PB-PA-PB penta-block copolymers typically contain about 5 wt % to about 95 wt % of the polymerized A block and about 95 wt % to about 5 wt % of polymerized plant oil block. For instance, the above block copolymers may contain about 10 wt % to about 90 wt % of the polymerized A block and about 90 wt % to about 10 wt % of polymerized plant oil block The PA block of the block copolymer can be considered as a "hard" block, and has properties characteristic of thermoplastic substances in that it has the stability necessary for processing at elevated temperatures and yet possesses good strength below the temperature at which it softens. The PA block is polymerized from one or more radically polymerizable monomers, which can include a variety type of monomers such as vinyl, acrylic, diolefin, nitrile, dinitrile, or acrylonitrile monomer. Vinyl aromatic monomers are exemplary vinyl monomers that can be used in the block copolymer, and include any vinyl aromatics optionally having one or more substituents on the aromatic moiety. The aromatic moiety can be either mono- or polycyclic. Exemplary monomers for the PA block include styrene, α-methyl styrene, t-butyl styrene, vinyl xylene, vinyl naphthalene, vinyl pyridine, divinyl benzene, methyl acrylate, $C_1$-$C_6$ (meth)acrylate (i.e., methyl methacrylate, ethyl methacrylate, propyl (meth)acrylate, butyl (meth)acrylate, heptyl (meth)acrylate, or hexyl (meth)acrylate), acrylonitrile, adiponitrile, methacrylonitrile, butadiene, isoprene, and mixtures thereof. Moreover, two or more different monomers can be used together in the formation of the PA block. A typical radically polymerizable monomer A used herein is styrene, and the resulting PA block is a styrene homopolymer.

The PB block of the block copolymer can be considered as a "soft" block, and has elastomeric properties which allow it to absorb and dissipate an applied stress and then regain its shape. The PB block is polymerized from one or more monomeric plant oils containing one or more triglycerides. The monomeric plant oils used in the block copolymer can be any plant oil that is radically polymerizable, particular those that contain one or more types of triglycerides. Suitable plant oils include, but are not limited to, a variety of vegetable oils such as soybean oil, peanut oil, walnut oil, palm oil, palm kernel oil, sesame oil, sunflower oil, safflower oil, rapeseed oil, linseed oil, flax seed oil, colza oil, coconut oil, corn oil, cottonseed oil, olive oil, castor oil, false flax oil, hemp oil, mustard oil, radish oil, ramtil oil, rice bran oil, salicornia oil, tigernut oil, tung oil, etc., and mixtures thereof. Typical compositions of several exemplary vegetable oils are shown in Table 1. A typical vegetable oil used herein is soybean oil, and the resulting PB block is polymerized triglyceride or triglyceride derivatives.

TABLE 1

Typical compositions of vegetable oils.

| Vegetable oil | Linoleic acid (%) | Polyunsaturated (%) | Monounsaturated (%) | Saturated (%) |
|---|---|---|---|---|
| Soybean | 54 | 63 | 22 | 15 |
| Safflower | 78 | 78 | 13 | 9 |
| Sunflower | 75 | 75 | 14 | 11 |
| Walnut | 64 | 64 | 22 | 14 |
| Corn | 59 | 60 | 27 | 13 |
| Sesame | 43 | 43 | 43 | 14 |
| Peanut | 31 | 31 | 51 | 18 |

Vegetable oils are mixtures of triglycerides. A representative structure of a triglyceride is shown as below:

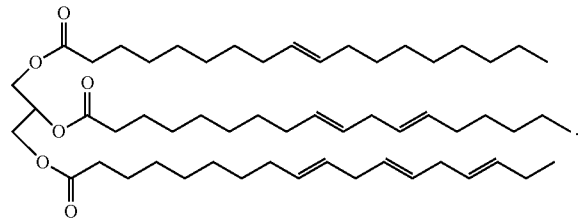 [SMILES: CC/C=C/C/C=C/C/C=C/CCCCCCCC(=O)OCC(COC(=O)CCCCCCC/C=C/CCCCCCCC)OC(=O)CCCCCCC/C=C/C/C=C/CCCCC]

A typical triglyceride structure contains a number of double bonds that may serve as candidates for polymerization. Various soybean cultivars express a variety of triglyceride compositions in their oils. Different strains of soybeans may be appropriately selected based on the triglyceride compositions to enhance the block copolymer yield and properties.

In unprocessed oils, the double bonds contained in triglycerides are typically located in the middle of the alkyl chains, and have limited reactivity towards propagation reactions due to steric hindrance and unfavorable stability of the free radical. This reactivity improves dramatically when the double bonds are conjugated (Li et al., "Soybean Oil-Divinylbenzene Thermosetting Polymers: Synthesis, Structure, Properties and their Relationships," *Polymer* 42(4): 1567-1579 (2001); Henna et al., "Biobased Thermosets from Free Radical Copolymerization of Conjugated Linseed Oil," *Journal of Applied Polymer Science* 104:979-985 (2007); Valverde et al., "Conjugated Low-Saturation Soybean Oil Thermosets: Free-Radical Copolymerization with Dicyclopentadiene and Divinylbenzene," *Journal of Applied Polymer Science* 107:423-430 (2008); Robertson et al., "Toughening of Polylactide with Polymerized Soybean Oil," *Macromolecules* 43:1807-1814 (2010), which are hereby incorporated by reference in their entirety). The conjugation of double bonds in triglycerides may be readily achieved to nearly 100% conversion with homogeneous Rh catalysis (Larock et al., "Preparation of Conjugated Soybean Oil and Other Natural Oils and Fatty Acids by Homogeneous Transition Metal Catalysis," *Journal of the American Oil Chemists' Society* 78:447-453 (2001), which is hereby incorporated by reference in its entirety).

In any embodiment of the present invention, the polymerizable plant oil monomer containing triglyceride can be replaced with a polymerizable monomer containing one or more triglycerides from an animal source, for instance, animal fats. Thus, the PB block in any embodiment of the present invention can instead be polymerized from one or more monomeric animal fat containing one or more triglycerides. Examples of suitable animal fats used in accordance with the present invention include, but are not limited to, beef or mutton fat such as beef tallow or mutton tallow, pork fat such as pork lard, poultry fat such as turkey and/or chicken fat, and fish fat/oil. The animal fats can be obtained from any suitable source including restaurants and meat production facilities.

"Triglycerides," as defined herein, may refer to any unmodified triglycerides naturally existent in plant oil or animal fat as well as any derivatives of unmodified triglycerides. An unmodified triglyceride may include any ester derived from glycerol with three similar or different fatty acids. Triglyceride derivatives may include any modified triglycerides that contain conjugated systems (i.e. a system of connected p-orbitals with delocalized electrons in triglycerides). Such conjugated systems increase the reactivity of triglycerides towards propagation reactions. Useful conjugated triglycerides include, but are not limited to, triglyceride derivatives containing conjugated double bonds or conjugated systems formed by acrylate groups.

The term "soybean oil" used herein may refer broadly to any raw soybean oil or processed soybean oil that contains at least one form of triglyceride or its derivative suitable for the polymerization reaction of the present invention. The term "conjugated soybean oil" used herein refers to any raw soybean oil or processed soybean oil containing at least one triglyceride with at least one conjugated site. Similar definitions also apply to other plant oil or conjugated plant oil.

The conjugated triglyceride may contain one or more conjugated sites. For instance, the conjugated triglyceride may contain a single conjugated site per triglyceride. Alternatively, each fatty-acid chain of the triglyceride may contain one or more conjugated sites.

Exemplary conjugated triglycerides are:

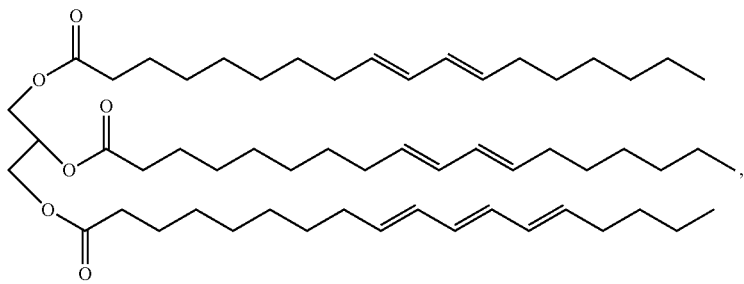

-continued

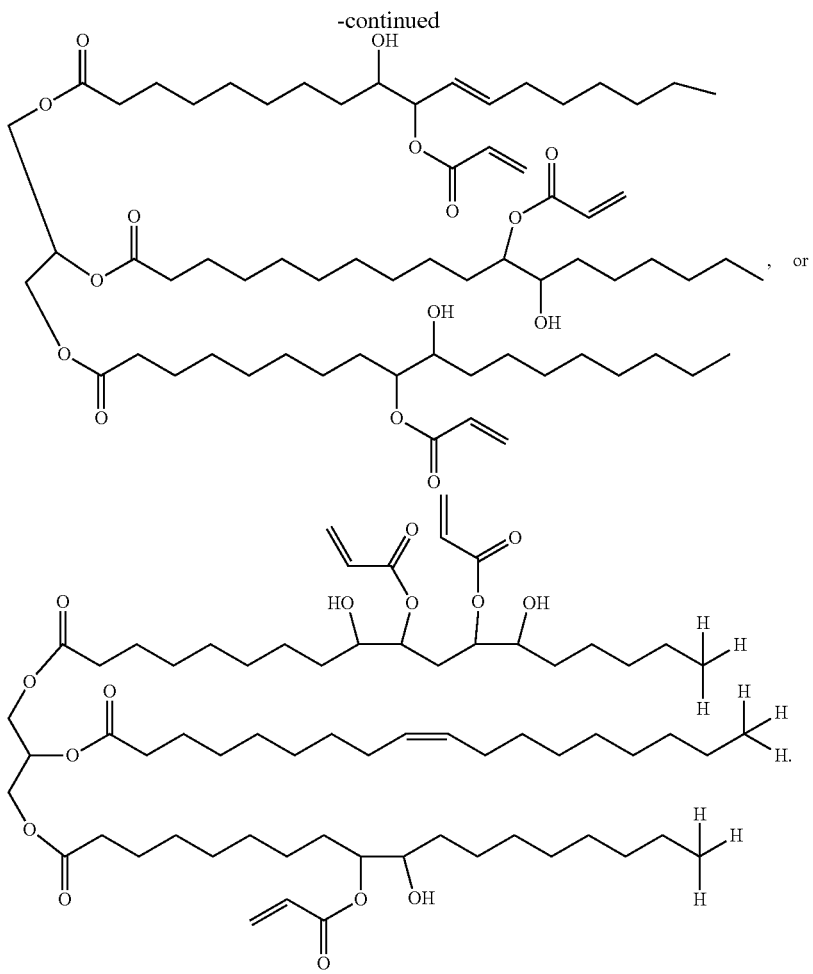

A further description of conjugation sites in soybean oil, epoxidation of soybean oil, and acrylation of soybean oil can be found in NACU BERNARDO HERNANDEZ-CANTU, "SUSTAINABILITY THROUGH BLOCKCOPOLYMERS—NOVEL ION EXCHANGE CATHODE MEMBRANES AND SOYBEAN OIL BASED THERMOPLASTIC ELASTOMER," (Iowa State University, Ames, Iowa 2012), which is incorporated herein by reference in its entirety.

In one embodiment, the conjugated plant oil is acrylated epoxidized plant oil, such as acrylated epoxidized soybean oil; the conjugated triglyceride is acrylated epoxidized triglyceride.

In any embodiment of the present invention, the block copolymer is a thermoplastic elastomer. The mechanism for achieving the dual properties of thermoplasticity and elasticity in the plant oil-based styrenic block copolymer arises from polymer thermodynamics and the chain architecture of the polymer. Flory-Huggins theory illustrates that nearly all polymers are mutually immiscible, due to the drastic loss of mixing entropy. The chemically dissimilar monomer sequences found in the block copolymers may be thought of conceptually as immiscible homopolymers bound covalently end-to-end. Due to this constraint, when a block copolymer phase separates, incompatible polymer types form meso-domains with a well-defined geometry dictated by the block composition and with a size governed by the overall molecular weight (Bates et al. "Block Copolymers-Designer Soft Materials," *Physics Today* 52(2):32-38 (1999), which is hereby incorporated by reference in its entirety).

In a typical SBS elastomer, the styrene composition is about 10-30 wt % such that spherical or cylindrical styrene domains form in a matrix of butadiene. When the temperature is below the glass transition temperature of polystyrene ($T_g=100°$ C.), the polybutadiene matrix is liquid ($T_g<-90°$ C.) but is bound between the vitreous polystyrene spheres, which serve as physical crosslinks. When the temperature is above the glass transition temperature of polystyrene, the entire elastomer system is molten and may be processed easily. Crosslinked poly(soybean oil) has been reported to have $T_g$ values as low as $-56°$ C. (Yang et al., "Conjugation of Soybean Oil and It's Free-Radical Copolymerization with Acrylonitrile," *Journal of Polymers and the Environment* 1-7 (2010), which is hereby incorporated by reference in its entirety). Thus, the poly(soybean oil) is an excellent candidate to serve as the liquid component in thermoplastic elastomers based on styrenic block copolymers.

Accordingly, in one embodiment of the present invention, the thermoplastic and elastomeric block copolymer has a PA-PB diblock polymer architecture, where the PA block is a linear-chain polystyrene (PS) and the PB block is a linear or light-branched polymerized soybean oil (PSBO) or radicals thereof, or polymerized conjugated soybean oil (PCSBO) or radicals thereof. The PS-PSBO di-block copolymer has a molecular weight ranging from 5 to 500 kDa, for instance, from about 15 to 300 kDa, from about 40 to about 100 kDa, or from about 80 to about 100 kDa. The PSBO block has a glass transition temperature ($T_g$) below −15° C., for instance, from about −60° C. to about −28° C.

In one embodiment of the present invention, the thermoplastic and elastomeric block copolymer has a PA-PB-PA triblock polymer architecture, where the PA block is a linear-chain polystyrene (PS), and the PB block is a linear or light-branched polymerized soybean oil (PSBO) or radicals thereof, or polymerized conjugated soybean oil (PCSBO) or radicals thereof. This soybean oil-based styrenic triblock copolymer (PS-PSBO-PS) thus has an elastomeric interior block PSBO, and a thermoplastic outer block PS formed on both ends of the interior block PSBO. The PS-PSBO-PS tri-block copolymer has a molecular weight ranging from 7 kDa to 1000 kDa, for instance, from about 7 to about 500 kDa, from about 15 to about 350 kDa, from about 80 to about 120 kDa or from about 100 to about 120 kDa. The PSBO block has a $T_g$ below −15° C., for instance, from about −60° C. to about −28° C.

In one embodiment, the radical polymerizing is carried out by atom transfer radical polymerization. In one embodiment, the plant oil to be radically polymerized is soybean oil, linseed oil, flax seed oil, or rapeseed oil. In one embodiment, acrylated epoxidized plant oil, such as acrylated epoxidized soybean oil, is radically polymerized in accordance with the method of the present invention.

Another aspect of the present invention relates to a method of preparing a thermoplastic block copolymer. The method comprises providing a radically polymerizable monomer, represented by A, or a polymer block PA comprising one or more units of monomer A. A radically polymerizable plant oil monomer containing one or more triglycerides, represented by B, is also provided. Monomer A or the polymer block PA is then radically polymerized with monomer B, in the presence of an initiator and a transition-metal catalyst system to form the thermoplastic block copolymer.

The radical polymerizing step can be carried out by a) radical polymerizing monomer A in a solvent suitable for dissolving PA; and b) radical polymerizing monomer B in a solvent suitable for dissolving PA and PB. PA from step a) acts as the initiator to form a diblock copolymer PA-PB. The resulting diblock copolymer PA-PB from step b) may be used as the initiator to c) further radically polymerize with monomer A. This adds an additional polymer block to the di-block copolymer PA-PB, forming a tri-block copolymer PA-PB-PA.

Step c) may be repeated multiple times, adding desired polymer block (either the PA or PB block), to form a desirable multiple block copolymer. For instance, a penta-block copolymer PA-PB-PA-PB-PA may be formed by repeating c) three times, adding PA, PB and PA, in each step respectively, to the di-block copolymer PA-PB formed from step b).

Using this method, by repeating c) multiple times, and adding the desired polymer block each time, different block copolymer architectures may be achieved, for instance, multiple block copolymer having a (PA-PB)$_n$ architecture or (PA-PB)$_n$-PA architecture, where n is an integer of greater than 1.

Alternatively, the method of preparing a thermoplastic block copolymer may comprises providing a radically polymerizable plant oil monomer containing one or more triglycerides, represented by B, or a polymer block PB comprising one or more units of monomer B. A radically polymerizable monomer, represented by A, is also provided. Monomer B or the polymer block PB is then radically polymerized with monomer A, in the presence of an initiator and a transition-metal catalyst system, to form the thermoplastic block copolymer.

The radical polymerizing step can be carried out by a) radical polymerizing monomer B in a solvent suitable for dissolving PB; and b) radical polymerizing monomer A in a solvent suitable for dissolving PA and PB. PB from step a) acts as the initiator to form the diblock copolymer PB-PA. The resulting diblock copolymer PB-PA from step b) may be used as the initiator to c) further radically polymerize with monomer B. This adds an additional polymer block to the di-block copolymer PB-PA, forming a tri-block copolymer PB-PA-PB.

Step c) may be repeated multiple times, adding desired polymer block (either the PB or PA block), to form a desirable multiple block copolymer. For instance, a penta-block copolymer PB-PA-PB-PA-PB may be formed by repeating c) three times, adding PB, PA, and PB, in each step respectively, to the di-block copolymer PB-PA formed from step b).

Using this method, by repeating c) multiple times, and adding the desired polymer block each time, different block copolymer architectures may be achieved, for instance, multiple block copolymer having a PB-(PA-PB)$_n$ architecture, where n is an integer of greater than 1.

The radical polymerization of monomers A and B to form thermoplastic block copolymer can be performed through living free radical polymerization which involves living/controlled polymerization with free radical as the active polymer chain end (Moad et al., "The Chemistry of Radical Polymerization—Second Fully Revised Edition," Elsevier Science Ltd. (2006), which is hereby incorporated by reference in its entirety). This form of polymerization is a form of addition polymerization where the ability of a growing polymer chain to terminate has been removed. The rate of chain initiation is thus much larger than the rate of chain propagation. The result is that the polymer chains grow at a more constant rate than seen in traditional chain polymerization and their lengths remain very similar. One form of living free radical polymerization is atom transfer radical polymerization.

Atom transfer radical polymerization (ATRP) is a catalyzed, reversible redox process that achieves controlled polymerization via facile transfer of labile radicals (e.g., halide radicals) between growing polymer chains and a catalyst (Davis et al., "Atom Transfer Radical Polymerization of tert-Butyl Acrylate and Preparation of Block Copolymers," Macromolecules 33:4039-4047 (2000); Matyjaszewski et al., "Atom Transfer Radical Polymerization," Chemical Reviews 101:2921-2990 (2001), which are hereby incorporated by reference in their entirety). In ATRP, chain termination and transfer reactions are essentially eliminated by keeping the free radical concentration small. Briefly, the mechanism by which ATRP operates may be summarized as:

$$P-X + Cu_I X \overset{K}{\rightleftharpoons} P\cdot + Cu_{II} X_2 \qquad (1)$$

$$P_i\cdot + M \overset{k_p}{\longrightarrow} P_{i+1}. \qquad (2)$$

In Equation (1), the labile radical X may be a halogen (e.g., Br, Cl) attached to end of a polymer P. The catalyst, Cu$_I$Br, reversibly abstracts this halogen, forming a polymer free radical (P.). The equilibrium achieved between inert polymers and active polymer free radicals strongly favors the left side ($K \ll 10^{-8}$). Equation (2) is the standard free radical propagation reaction between a polymer of length i and a monomer M. The small free radical concentration ensured by equation (1) virtually eliminates termination reactions, and the halogen functionality is retained on polymers produced, which allows the production of block copolymers from nearly any monomer amenable to conventional free radical polymerization.

The ATRP polymerization reaction starts with initiation. Initiation is accomplished by adding an agent capable of decomposing to form free radicals; the decomposed free radical fragment of the initiator attacks a monomer yielding a monomer-free radical, and ultimately produces an intermediate capable of propagating polymerization. These agents often are referred to as "initiators." The initiation is typically based on the reversible formation of growing radicals in a redox reaction between various transition metal compounds and an initiator. Suitable initiators depend greatly on the details of the polymerization, including the types of monomers being used, the type of catalyst system, the solvent system and the reaction conditions. Simple organic halides are typically used as model halogen atom transfer initiators.

For the polymerization of plant oil blocks, initiators may be compounds having structural similarity to the polystyrene repeat unit. Exemplary initiators are aralkyl halides or aryl halides, such as benzyl bromide or benzyl chloride. Similar initiators can also be used for the polymerization of PA block, such as the vinyl aromatic block. Moreover, for vinyl aromatic blocks such as styrene, thermal self-initiation can occur without the need for additional initiators.

In ATRP, the introduction of a catalyst system to the reaction media is required to establish the equilibrium between active states (active polymer free radicals for the growth of the polymer) and dormant states (the formed inert polymer). The catalyst is typically a transition metal compound being capable of participating in a redox cycle with the initiator and a dormant polymer chain. The transition-metal compound used herein is a transition-metal halide. Any transition metal that can participate in a redox cycle with the initiator and dormant polymer chain, but does not form a direct C-metal bond with the polymer chain, is suitable in the present invention. The exemplary transition metal includes $Cu^{1+}$, $Cu^{2+}$, $Fe^{2+}$, $Fe^{3+}$, $Ru^{2+}$, $Ru^{3+}$, $Ru^{4+}$, $Ru^{5+}$, $Ru^{6+}$, $Cr^{2+}$, $Cr^{3+}$, $Mo^{0}$, $Mo^{+}$, $Mo^{2+}$, $Mo^{3+}$, $W^{2+}$, $W^{3+}$, $Mn^{3+}$, $Mn^{4+}$, $Rh^{+}$, $Rh^{2+}$, $Rh^{3+}$, $Rh^{4+}$, $Re^{2+}$, $Re^{3+}$, $Re^{4+}$, $Co^{+}$, $Co^{2+}$, $Co^{3+}$, $V^{2+}$, $V^{3+}$, $V^{4+}$, $V^{5+}$, $Zn^{+}$, $Zn^{2+}$, $Au^{+}$, $Au^{2+}$, $Au^{3+}$, $Hg^{+}$, $Hg^{2+}$, $Pd^{0}$, $Pd^{+}$, $Pd^{2+}$, $Pt^{0}$, $Pt^{+}$, $Pt^{2+}$, $Pt^{3+}$, $Pt^{4+}$, $Ir^{+}$, $Ir^{2+}$, $Ir^{3+}$, $Ir^{4+}$, $Os^{2+}$, $Os^{3+}$, $Os^{4+}$, $Nb^{3+}$, $Nb^{4+}$, $Nb^{5+}$, $Ta^{3+}$, $Ta^{4+}$, $Ta^{5+}$, $Ni^{0}$, $Ni^{+}$, $Ni^{2+}$, $Ni^{3+}$, $Nd^{0}$, $Nd^{+}$, $Nd^{2+}$, $Nd^{3+}$, $Ag^{+}$, and $Ag^{2+}$. A typical transition-metal catalyst system used herein is $CuCl/CuCl_2$.

The ligand serves to coordinate with the transition metal compound such that direct bonds between the transition metal and growing polymer radicals are not formed, and the formed copolymer are isolated. The ligand can be any N-, O-, P- or S-containing compound that coordinates with the transition metal to form a σ-bond, any C-containing compound that coordinates with the transition metal to form a π-bond, or any C-containing compound that coordinates with the transition metal to form a C-transition metal σ-bond but does not form a C—C bond with the monomers under the polymerizing conditions. A typical ligand used herein is pentamethyldiethylene-triamine (PMDETA).

The state of the art of ATRP has been reviewed by Matyjaszewski (Matyjaszewski et al., "Atom Transfer Radical Polymerization," *Chemical Reviews* 101:2921-2990 (2001), which is hereby incorporated by reference in its entirety). More details for selection of initiators, catalysts/ligand system for ATRP reaction can be found in U.S. Pat. No. 5,763,548 to Matyjaszewski et al. and U.S. Pat. No. 6,538,091 to Matyjaszewski et al., which are hereby incorporated by reference in their entirety.

Figure 1B:
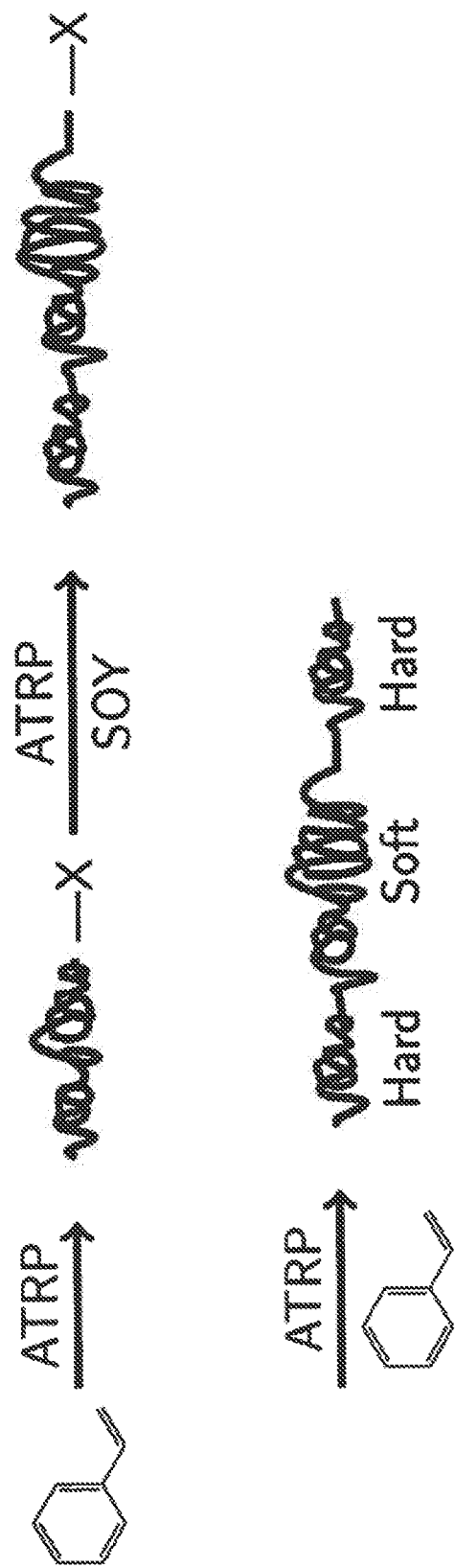

Some embodiments of the present invention relates to methods of making a thermoplastic block copolymer comprising a polymer block of radically polymerizable monomer and a polymer block of radically polymerized plant oil containing one or more triglycerides, according to the above-described steps. The radically polymerizable monomers used in this method include, but are not limited to, a vinyl, acrylic, diolefin, nitrile, dinitrile, acrylonitrile monomer, and mixtures thereof. Exemplary radically polymerizable monomer used in this method are styrene, α-methyl styrene, t-butyl styrene, vinyl xylene, vinyl naphthalene, vinyl pyridine, divinyl benzene, methyl acrylate, $C_1$-$C_6$ (meth)acrylate (i.e., methyl methacrylate, ethyl methacrylate, propyl (meth)acrylate, butyl (meth)acrylate, heptyl (meth)acrylate, or hexyl (meth)acrylate), acrylonitrile, adiponitrile, methacrylonitrile, butadiene, isoprene, or mixtures thereof. In one embodiment, the polymerized vinyl monomer is a vinyl aromatic monomer, for instance, a polystyrene homopolymer. In one embodiment, the polymerized plant oil is poly(soybean oil). An exemplary scheme illustrating the preparation of bio-polymeric thermoplastic elastomers from conjugated soybean oil and styrene via ATRP is shown in FIG. 1.

Accordingly, in one embodiment, the present invention relates to methods of making a thermoplastic and elastomeric block copolymer having a poly(styrene-soybean oil) (PS-PSBO) diblock copolymer architecture or a poly(styrene-soybean oil-styrene) (PS-PSBO-PS) triblock polymer architecture, via ATRP reaction. The method comprises the following steps: a) ATRP of styrene homopolymer (PS), to reach a molecular weight of 1 to 300 kDa, or 10 to 30 kDa, optionally followed by purification; b) ATRP of SBO or CSBO using PS as a macroinitiator, in a solvent suitable for the mutual dissolution of PS and polySBO or polyCSBO, to yield the diblock copolymer PS-PSBO or PS-PCSBO having a molecular weight of 5 to 500 kDa, 15 to 300 kDa, 40 to 100 kDa, or 80 to 100 kDa; and c) optionally ATRP of styrene using PS-PSBO or PS-PCSBO as the macroinitiator, to yield triblock copolymer PS-PSBO-PS or PS-PCSBO-PS having a molecular weight of 7 to 1000 kDa, 7 to 500 kDa, 15 to 350 kDa, 80 to 120 kDa or 100 to 120 kDa.

Alternatively, the method of the present invention may comprise the following steps: a) ATRP of SBO or CSBO to reach a molecular weight of 1 to 300 kDa, or 10 to 30 kDa, optionally followed by purification; b) ATRP of styrene homopolymer (PS), using PSBO or PCSBO as a macroinitiator, in a solvent suitable for the mutual dissolution of PS and PSBO or PCSBO, to yield the diblock copolymer PS-PSBO or PS-PCSBO having a molecular weight of 5 to 500 kDa, 15 to 300 kDa, 40 to 100 kDa, or 80 to 100 kDa; and c) optionally ATRP of styrene to the end of PSBO or PCSBO using PS-PSBO or PS-PCSBO as the macroinitiator, to yield triblock copolymer PS-PSBO-PS or PS-PCSBO-PS having a molecular weight of 7 to 1000 kDa, 7 to 500 kDa, 15 to 350 kDa, 80 to 120 kDa or 100 to 120 kDa.

A typical conjugated plant oil used in accordance with the method of the present invention is acrylated epoxidized plant oil, such as acrylated epoxidized soybean oil, which contains one or more acrylated epoxidized triglycerides.

In ATRP of styrene and soybean oil to prepare thermoplastic elastomers, polymerization can be carried out at a temperature of 120° C. or lower. The optimal temperature is the minimum at which polymerization can occur over reasonable time scales, e.g., 6-48 hours. In ATRP of SBO or CSBO to make PSBO- or PCSBO-based thermoplastic elastomers, it is desirable to produce PSBO or PCSBO with high molecular weight and low glass transition temperature ($T_g$), and with the retention of the terminal halogen, which allows the subsequent addition of a polystyrene block. Thus, high reaction temperatures as in conventional radical polymerizations are undesirable in ATRP of SBO or CSBO. Typical reaction temperature for ATRP of styrene and soybean oil is 100° C. or lower, for instance, from 60° C. to 100° C., or from 65° C. to 85° C.

Benzyl bromide or benzyl chloride can be used as initiator in ATRP of styrene and soybean oil. CuX (X=Br or Cl) can be used as the catalyst system and PMDETA can be used as the ligand. Typically, a 1:1 molar ratio of $Cu_pX:PX$ is sufficient to establish the equilibrium between active and dormant states of the resulting polymers. $CuX_2$ can be used a counter-catalyst to further reduce the polymer free radical concentration. Typically, a 0.1:1 molar ratio of counter-catalyst; catalyst and a 1:1 molar ratio of ligand:(catalyst+counter-catalyst) are desirable to ensure the solvation of the catalyst. The molecular weight of the resulting polymer is governed in part through the monomer:initiator molar ratio, which may vary between 5:1 to 1000:1.

Solvent is selected based the requirements of mutual polySBO/polystyrene solubility and a normal boiling point compatible with the polymerization temperature. The solvent used in the ATRP of styrene and soybean oil may be toluene, THF, chloroform, cyclohexane, or a mixture thereof. Typical solvent used for ATRP of styrene and soybean oil is toluene. Monomer concentrations in the reactions depend partially on the solubility of the monomer and the polymer products as well as the evaporation temperature of the solvent. The concentration of monomers dissolved in the solvent in the ATRP reactions may range from 5% to 100% weight percentage monomer. Typically, a monomer concentration of less than 50% by mass is suitable to ensure the solubility of the resulting polymers and additionally to prevent premature gelation.

In one embodiment, the method is carried out in the presence of a solvent, without a counter-catalyst. The polymerization can be carried out at a temperature ranging from 65 to 100° C. The solvent concentration can range from 10% to 40% by mass ratio of the solvent to the monomer B. For instance, the solvent concentration can range from 10% to 25% by mass ratio of the solvent to the monomer B when the polymerization is carried out at 100° C.; the solvent concentration can range from 15% to 35% when the polymerization is carried out at 85° C.; and the solvent concentration can range from 25% to 40% when the polymerization is carried out at 65° C.

In one embodiment, the method is carried out in the presence of a counter-catalyst and a solvent. The polymerization can be carried out at a temperature ranging from 65 to 100° C., for instance, at a temperature ranging from 65 to 85° C. The solvent concentration can range from 15% to 60% by mass ratio of the solvent to the monomer B. For instance, the solvent concentration can range from 15% to 25% when the polymerization is carried out at 100° C.; the solvent concentration can range from 20% to 40% when the polymerization is carried out at 85° C.; and the solvent concentration can range from 35% to 60% when the polymerization is carried out at at 65° C.

After the radical polymerization, the polymerized plant oil-based block copolymer may be further catalytically hydrogenated to partially or fully saturate the plant oil block. This process removes reactive unsaturation from the rubbery component, yielding improved resistance to oxidative degradation, reduced crosslinkability and increased resistance to chemical attack. Moreover, hydrogenation precludes gelation on subsequent block additions.

Other aspects of the present invention relate to the use of the polymerized plant oil-based block copolymers in a variety of applications. The benefit of utilizing the polymeric materials of the present invention is multifaceted. The block copolymers of the present invention are based on vegetable oils, such as soybean oils. Polymerized soybean oil is intrinsically biodegradable and the feedstock is produced through a negative carbon-emissions process (i.e., growing soybeans). Thus, these polymeric materials are attractive from an environmental/biorenewable perspective. Moreover, the elastomeric properties of the soybean oil polymer are competitive with modern commodities such as polybutadiene and polyisoprene (synthetic rubber). The cost of the bio-monomer is highly competitive (in many cases more economical than peterochemically-derived feedstocks). Further, with appropriate modification of the soybean oil (such as conjugation of triglycerides, or development of soybean oil types that are particularly suitable for polymerization), the chemical properties, thermal properties, microstructure and morphology, and mechanical/rheological behaviors of the soybean oil-based polymers can be improved and fine-tuned to make these polymers highly useful in the plastics industry.

Exemplary applications of the block copolymers of the present invention include their use: as rubbers or elastomers; as toughened engineering thermoplastics; as asphalt modifiers; as resin modifiers; as engineering resins; as leather and cement modifiers; in footwear, such as in rubber shoe heels, rubber shoe soles; in automobiles, such as in tires, hoses, power belts, conveyor belts, printing rolls, rubber wringers, automobile floor mats, mud flaps for trucks, ball mill liners, and weather strips; as adhesives, such as pressure sensitive adhesives; in aerospace equipment; as viscosity index improvers; as detergents; as diagnostic agents and supports therefore; as dispersants; as emulsifiers; as lubricants and/or surfactants; as paper additives and coating agents; and in packaging, such as food and beverage packaging materials.

In some embodiments, the polymerized plant oil-based block copolymers of the present invention can be used as a main component in a thermoplastic elastomer composition, to improve the thermoplastic and elastic properties of the composition. To form an elastomeric composition, the block copolymer can be further vulcanized, cross-linked, compatibilized, and/or compounded with one or more other materials, such as other elastomer, additive, modifier and/or filler. The resulting elastomer can be used as a rubber composition, in various industries such as in footwear, automobiles, packaging, etc.

In one embodiment, the polymerized plant oil-based block copolymers of the present invention can be used in an automobile, such as in vehicle tires, hoses, power belts, conveyor belts, printing rolls, rubber wringers, automobile floor mats, mud flaps for trucks, ball mill liners, and weather strips. The block copolymers can serve as a main component in a thermoplastic elastomer composition, to improve the thermoplastic and elastic properties of the automobile compositions (e.g., vehicle tires). The resulting compositions can be further vulcanized, cross-linked, compatibilized, and/or compounded with one or more other materials, such as other elastomer, additive, modifier and/or filler.

In one embodiment, the polymerized plant oil-based block copolymers of the present invention can be used in an asphalt composition, as an asphalt additive, modifier and/or filler. The asphalt composition may further comprise a bitumen component. The asphalt composition may comprise a wide range of the block copolymer. For instance, the asphalt composition comprises 1 to 5 wt % of the block copolymer.

In one embodiment, the polymerized plant oil-based block copolymers can be used in an adhesive composition. The adhesive composition may further comprise a tackifier and/or a plasticizer.

In one embodiment, the polymerized plant oil-based block copolymers can be used in a toughened engineering thermoplastic composition. A toughened engineering thermoplastic composition typically comprises predominantly a glassy or semicrystalline component with a minority of rubbery or elastomeric component to increase the toughness (reduce the brittleness) of the material, e.g. analogous to High-Impact Polystyrene (HIPS). To form a toughened engineering thermoplastic composition, the block copolymer of the present invention may be formulated such that the plant-oil block is a minority component and serves to absorb energy that would otherwise lead to the fracture of the solid matrix. The block copolymer in the toughened engineering thermoplastic composition may be further compounded with other materials, such as other engineering thermoplastics, additives, modifiers, or fillers.

A further aspect of the present invention relates to a thermoplastic polymer comprising one or more units of a radically polymerizable plant oil monomer containing one or more triglycerides. All above embodiments described for the PB block, such as compositions, structures, physical and chemical properties (e.g., molecular weight, transition temperature, etc.) are suitable for the polymerizable plant oil-based thermoplastic polymers.

Another aspect of the present invention relates to a method of preparing a thermoplastic polymer or polymer block. The method comprises providing a radically polymerizable plant oil monomer containing one or more triglycerides. This plant oil monomer is then radically polymerized, in the presence of an initiator and a transition-metal catalyst system to form the thermoplastic polymer or polymer block. This thermoplastic polymer can itself be used as a thermoplastic elastomer. Alternatively, this thermoplastic polymer can be used as a polymer block, and can be further polymerized with other monomers to form a polymerized plant oil-based thermoplastic block copolymer. All above embodiments described for methods of preparing the PB block, including reaction steps and reaction conditions (e.g., reaction reagents, catalyst system, initiators, temperature, solvent, initiation and termination of the reaction, etc.) are suitable for producing the polymerizable plant oil-based thermoplastic polymers.

All the above embodiments described for applications of the polymerized plant oil-based thermoplastic block copolymers are also suitable applications of the plant oil-based thermoplastic polymers.

Exemplary procedures for synthesizing poly(conjugated soybean oil) (PCSBO) via ATRP and blending the resulting block copolymers with asphalt binders are discussed in the following paragraphs.

In one embodiment, PCSBO is synthesized via ATRP.

Conjugated soybean oil (CSBO) is polymerized reproducibly via the ATRP mechanism. A typical procedure of bulk polymerization of CSOY is described as following. The CSBO is degassed and placed under an inert atmosphere. Benzyl bromide or benzyl chloride, due to their structural similarity with the polystyrene repeat unit, is used as the initiator. A copper catalyst system CuX and counter-catalyst $CuX_2$ is used with PMDETA (PentaMethylDiethyleneTriAmine) as the ligand. Detailed procedures of preparing conjugated soybean oil can be found in the literature (Yang et al., "Conjugation of Soybean Oil and It's Free-Radical Copolymerization with Acrylonitrile," *Journal of Polymers and the Environment* 1-7 (2010); Robertson et al., "Toughening of Polylactide with Polymerized Soybean Oil," *Macromolecules* 43:1807-1814 (2010); Larock et al., "Preparation of Conjugated Soybean Oil and Other Natural Oils and Fatty Acids by Homogeneous Transition Metal Catalysis," *Journal of the American Oil Chemists' Society* 78:447-453 (2001), which are hereby incorporated by reference in their entirety).

ATRP experiments can be carried out by varying the following parameters.

Temperature

Conventional free radical polymerization (CFRP) of CSBO has been reported at temperatures ranging from 60-150° C. In CFRP, the temperature dependence on polymerization kinetics is dominated by the decomposition reaction of the initiator. The trade-off of the high temperature is a higher polymerization rate with lower molecular weight and increased chain transfer reactions. Increasing chain transfer reactions is desirable in the production of thermosets, where the polySBO eventually gels and solidifies as chains begin to crosslink (Valverde et al., "Conjugated Low-Saturation Soybean Oil Thermosets: Free-Radical Copolymerization with Dicyclopentadiene and Divinylbenzene," *Journal of Applied Polymer Science* 107:423-430 (2008); Robertson et al., "Toughening of Polylactide with Polymerized Soybean Oil," *Macromolecules* 43:1807-1814 (2010), which are hereby incorporated by reference in their entirety).

For the method of preparing CSBO-based thermoplastic elastomers, the optimal temperature is the minimum at which polymerization can occur over reasonable time scales, e.g., 6-48 hours. In contrast to conventional free radical polymerization, the primary role of temperature in ATRP reaction is to shift the equilibrium towards higher free radical concentration and to increase the propagation rate. These are desirable to a certain extent; however, as the free radical concentration increases so does the rate of termination and transfer reactions. In ATRP of CSBO to make PCSBO-based thermoplastic elastomers, it is desirable to produce PCSBO with high molecular weight and low glass transition temperature ($T_g$), and with the retention of the terminal halogen, which allows the subsequent addition of a polystyrene block. Thus, the increased rate of termination and transfer reactions (i.e., high reaction temperature) are undesirable in ATRP of CSBO.

Halogen

Halogen atoms are reversibly transferred between the transition metal catalyst system and the initiator for ATRP. Both Br and Cl are used for halogen system. Br systems tend to shift the ATRP equilibrium reaction to the left (dormant side) of the equation (see, e.g., equations (1) & (2) in paragraph [0073]) compared to Cl systems. This variable allows flexibility in independently tuning the propagation rate (e.g., by adjusting reaction temperature) and free radical concentration.

Catalyst Composition and Concentration

In ATRP, the introduction of $Cu_IX$ to the reaction media is required to establish the equilibrium between active and dormant states. Typically, a 1:1 molar ratio of $Cu_IX$:PX is sufficient to establish this equilibrium (Matyjaszewski et al., "Atom Transfer Radical Polymerization," *Chemical Reviews* 101:2921-2990 (2001), which is hereby incorporated by reference in its entirety). In some systems, the equilibrium falls too far to the right and polymerization is uncontrolled unless the counter catalyst, $Cu_{II}X_2$, is introduced to control the equilibrium, which is independent of the reaction temperature (Behling et al., "Influence of Graft Density on Kinetics of Surface-Initiated ATRP of Polystyrene from Montmorillonite," *Macromolecules* 42:1867-1872 (2009); Behling et al., "Hierarchically Ordered Montorillonite Block Copolymer Brushes," *Macromolecules*, 43(5): 2111-2114 (2010), which are hereby incorporated by reference in their entirety).

Solvent

Bulk polymerization is the starting point as solvent directly places limits on the polymerization temperature and also influences the ATRP equilibrium. The synthesis of polySBO from a polystyrene macroinitiator requires a solvent. Solvent is selected based the requirements of mutual polySBO/polystyrene solubility and a normal boiling point compatible with the polymerization temperature.

Reactions are allowed to progress for 12 hours, and gel permeation chromatography is used to assess the degree of polymerization. The polymerization kinetics are subsequently assessed and the parameters are fine-tuned such that polySBO compounds can be reproducibly produced with minimal polydispersity and of targeted molecular weight. Differential scanning calorimetry is used to assess the $T_g$ of the polySBO materials, which is expected to be on the order of $-50°$ C. (Yang et al., "Conjugation of Soybean Oil and It's Free-Radical Copolymerization with Acrylonitrile," *Journal of Polymers and the Environment* 1-7 (2010); Robertson et al., "Toughening of Polylactide with Polymerized Soybean Oil," *Macromolecules* 43:1807-1814 (2010), which are hereby incorporated by reference in their entirety).

In one embodiment, poly(styrene-block-SBO-block-styrene) (PS-PSBO-PS) is synthesized via ATRP.

The extensive experience with the synthesis of styrene-containing block copolymers via ATRP can be useful to the synthesis of PS-PSBO-PS (Behling et al., "Influence of Graft Density on Kinetics of Surface-Initiated ATRP of Polystyrene from Montmorillonite," *Macromolecules* 42:1867-1872 (2009); Behling et al., "Hierarchically Ordered Montorillonite Block Copolymer Brushes," *Macromolecules*, 43(5): 2111-2114 (2010), which are hereby incorporated by reference in their entirety).

Production of triblock copolymers amounts to a three step process:
1) ATRP of styrene homopolymer (PS), to reach a molecular weight of 10-30 kDa, followed by purification; 2) ATRP of SBO or CSBO using PS as a macroinitiator, in a solvent suitable for the mutual dissolution of PS and polySBO or polyCSBO at the reaction temperature determined in the above embodiment, to yield PS-PSBO or PS-PCSBO; and 3) ATRP of styrene using PS-PSBO or PS-PCSBO as the macroinitiator, to yield PS-PSBO-PS or PS-PCSBO-PS.

The resulting PS-PSBO-PS or PS-PCSBO-PS polymer can contain ≈25 wt % polystyrene and be on the order of 100 kDa.

In one embodiment, PS-PSBO-PS polymers from above embodiment is blended with asphalt binders.

As the structure-property relationships for the PS-PSBO-PS system are built, composition and molecular weight ranges that should be best suited as bitumen modifiers can be identified from above embodiment.

At least three PS-PSBO-PS polymer compositions are scaled up to the 200 g range for further testing as bitumen modifiers.

Figure 2:
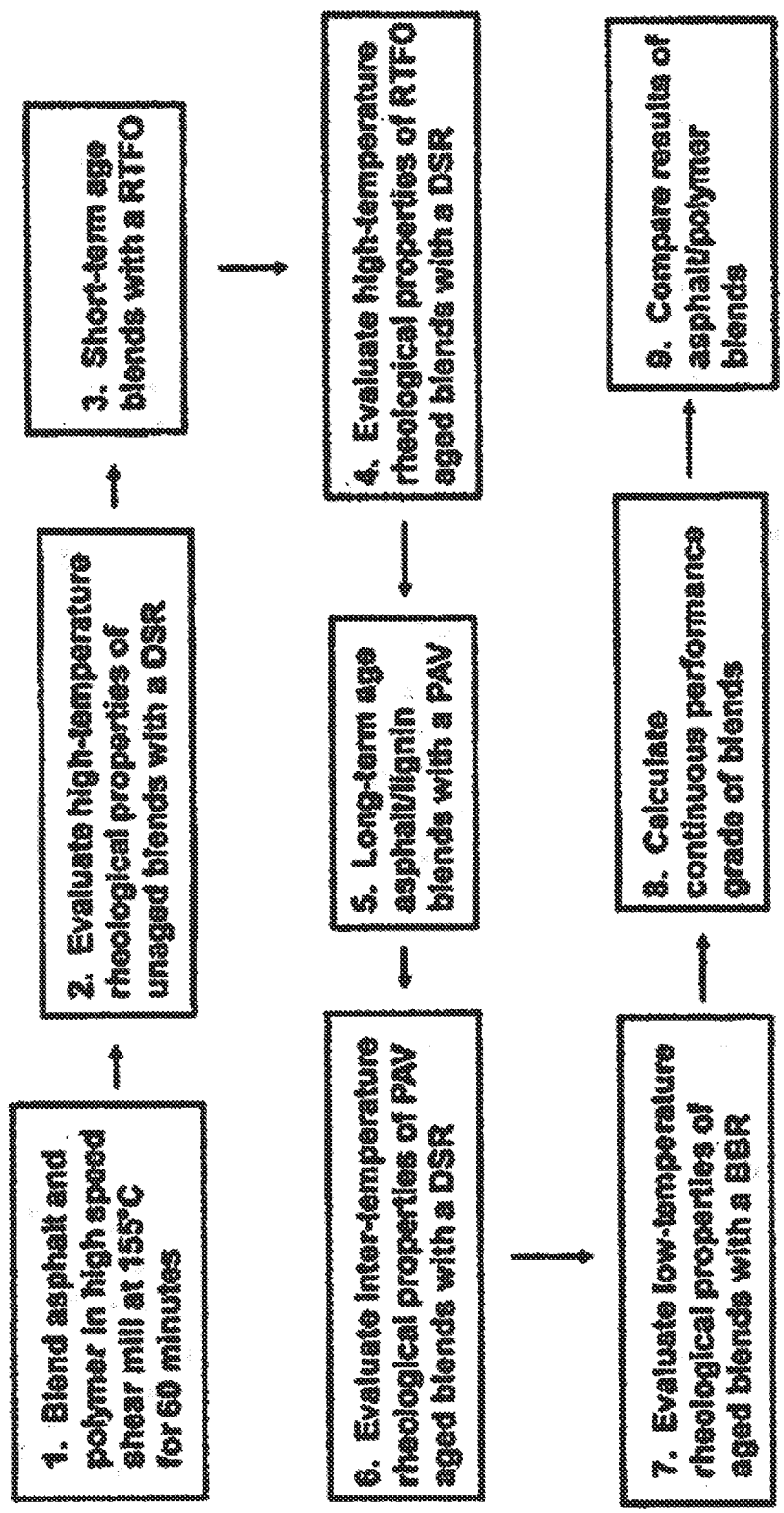
FIG. 2 is a flowchart showing the process of blending of poly(styrene-SBO-styrene) block copolymer compositions with asphalt binders and then testing their rheological properties.
Figure 3A:
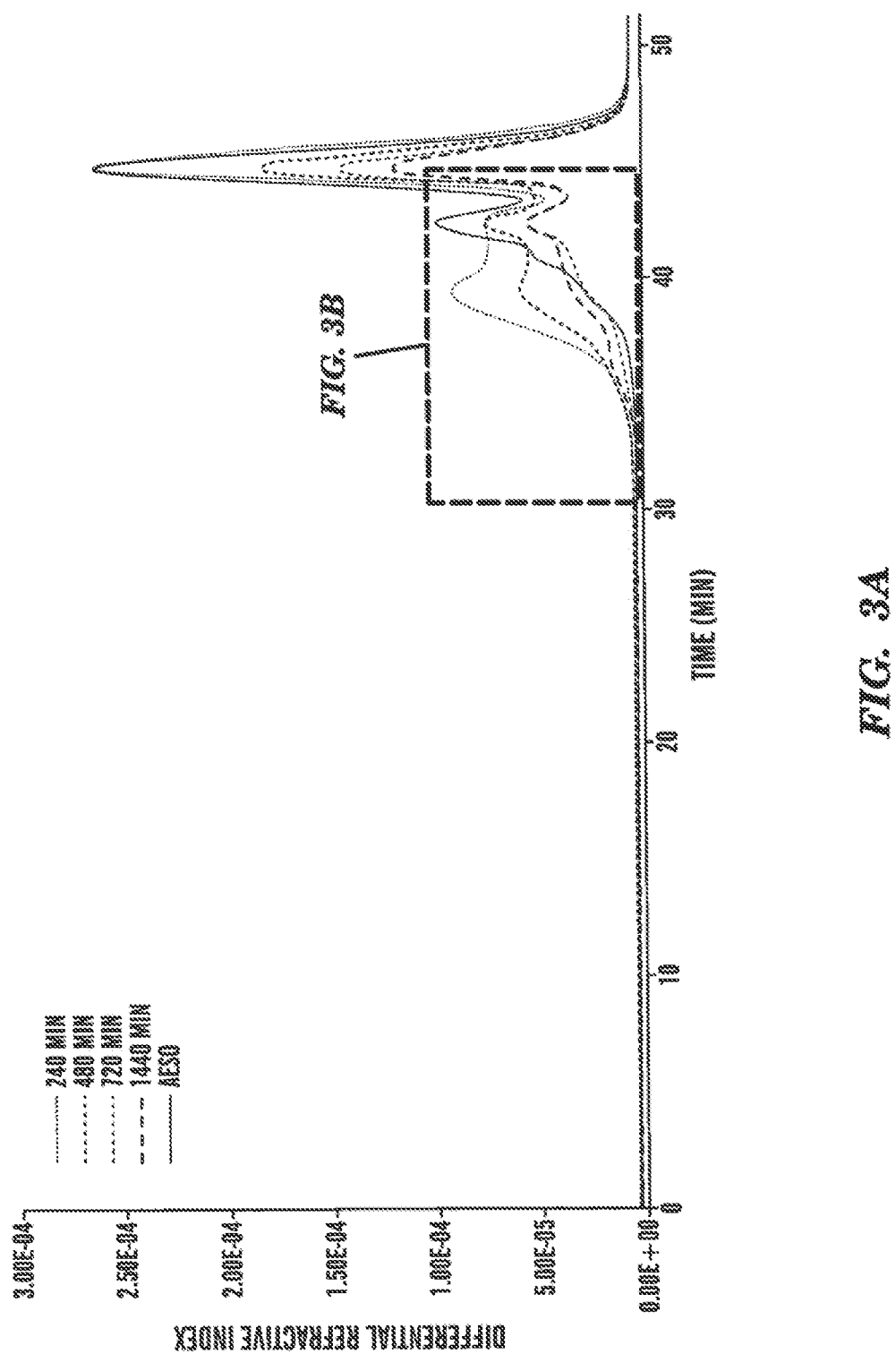
FIGS. 3A and 3B are graphs showing the gel permeation chromatography (GPC) of products resulting from polymerization of acrylated epoxidized soybean oil (AESO) under different reaction times, starting with the samples having an AESO monomer-to-solvent mass ratio of 0.6.
Figure 3B:
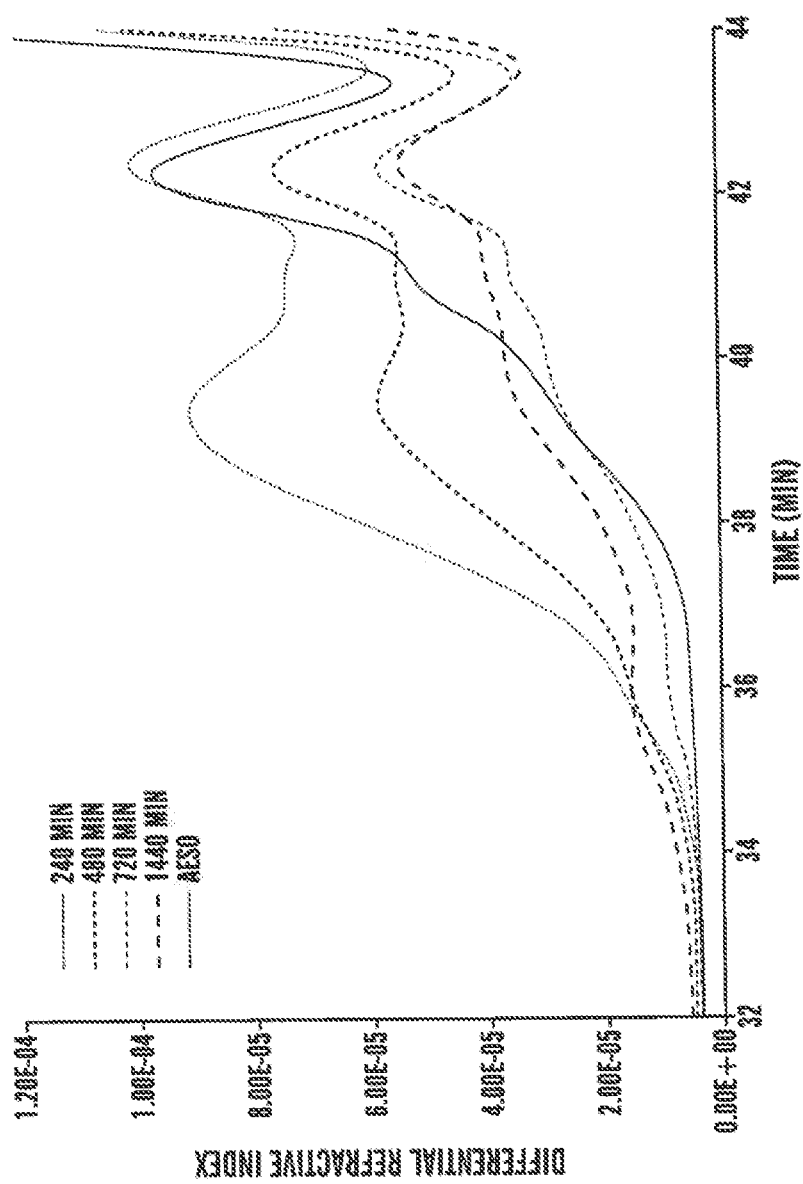
Figure 3C:
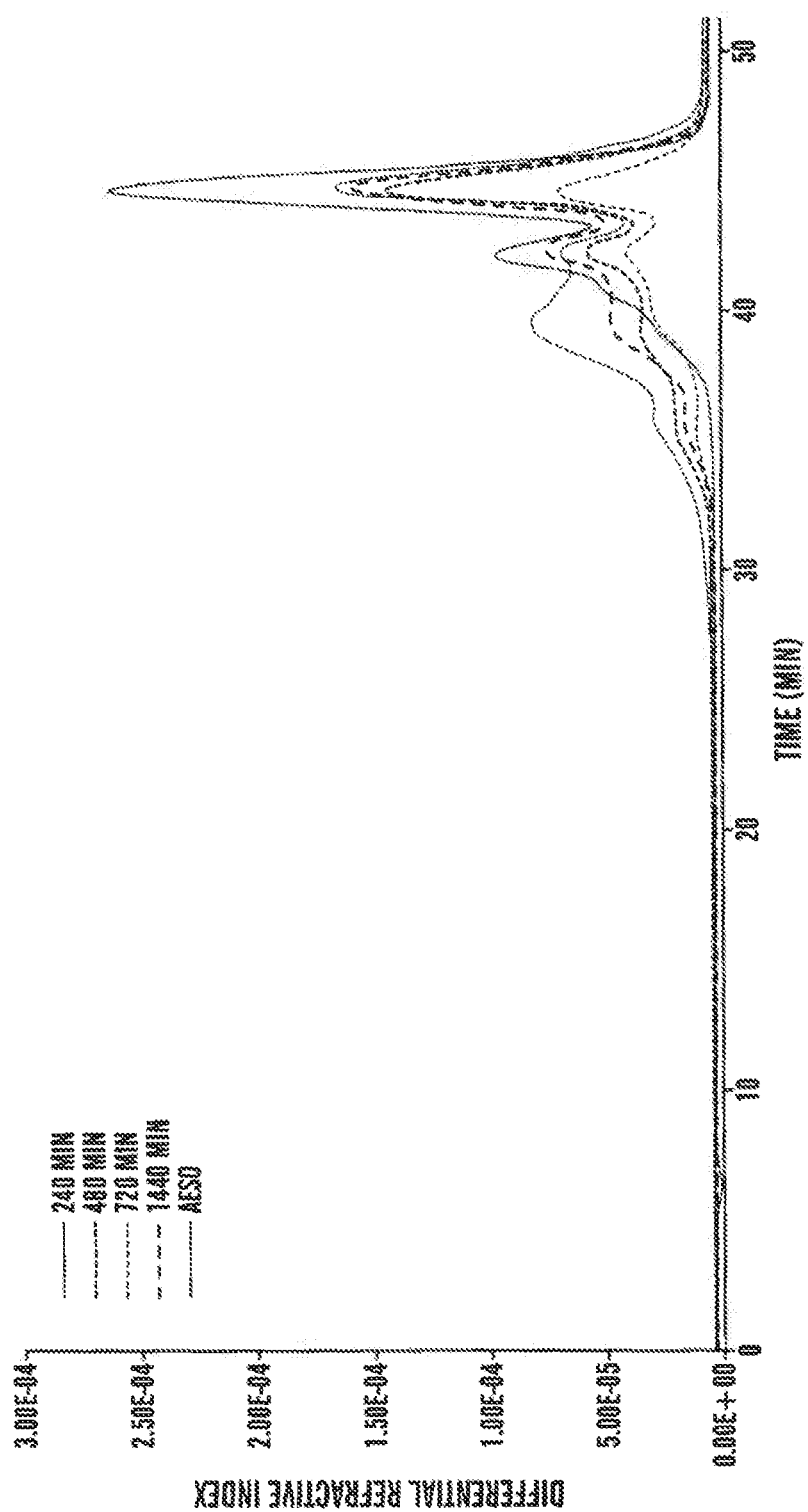
FIG. 3C is a graph showing the GPC of products resulting from polymerization of AESO under different reaction times, starting with the samples having a monomer-to-solvent mass ratio of 0.8.
Figure 3D:
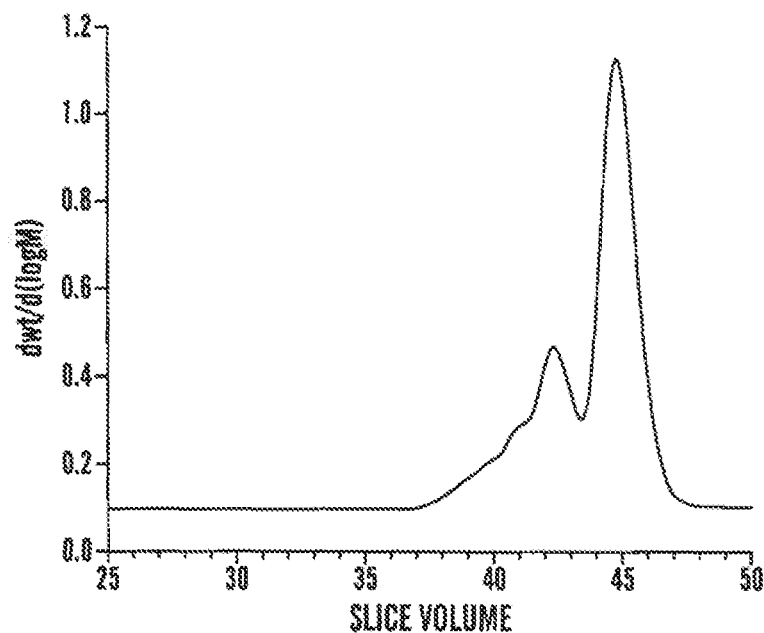
FIG. 3D shows the molecular weight distribution of AESO monomer.
Figure 3E:
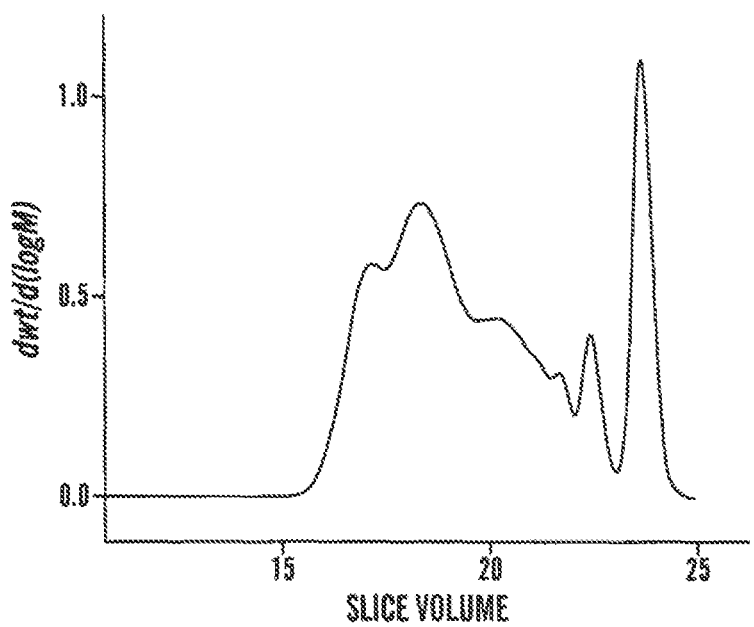
FIG. 3E shows the molecular weight distribution of poly-AESO polymer after 48 hours of reaction.

The developed biopolymers are blended with two asphalts for subsequent testing. The asphalt binders used are derived from Canadian and Texas crude sources as they are commonly used in the United States. The asphalt binders have a performance grade of PG58-28 or PG64-22 as these are the most common grades used for subsequent polymer modification. The biopolymers are blended at 1%, 2%, and 4% by weight of the combined asphalt binder. A styrene-butadiene type polymer is used as a benchmark polymer for the subsequent techno-economic analysis. The blending and subsequent rheological testing is outlined in FIG. 2 and follows the American Association of State Highway and Transportation Officials (AASHTO) M 320 testing for determining the grade of an asphalt binder (AASHTO M 320: Standard Specification for Performance-graded Asphalt Binder. American Association of State Highway and Transportation Officials, Washington, D.C. (2002), which is hereby incorporated by reference in its entirety)

Frequency sweeps are carried out in a dynamic shear rheometer (DSR) and rotational viscometer (RV) at multiple temperatures. Bending beam rheometer testing is carried out at multiple temperatures. A rolling thin film oven (RTFO) and pressure aging vessel (PAV) are used to conduct simulated aging of the binder blends representing the aging of binders that occurs during production of asphalt mixtures and the in-situ aging, respectively.

These tests allow for understanding the effects of polymer content, effects of crude source, and the rheological behavior of the developed blends. Prior to rheological testing, separation testing is done to assess the ability of the polymers to meet American Society for Testing and Materials (ASTM) standards for maintaining homogeneity, ASTM D7173 utilizing a rotational viscometer (ASTM Standard C33: Standard Practice for Determining the Separation Tendency of Polymer from Polymer Modified Asphalt. ASTM International, West Conshohocken, Pa. (2003), which is hereby incorporated by reference in its entirety). Each test is conducted in triplicate on the same blends, which allows for analysis of variance (ANOVA) and subsequent regression analysis.

Statistical analysis of the data is performed utilizing the chemical and physical data of the biopolymers and the rheological properties. The analysis also includes ANOVA to identify independent variables that are significant, e.g. what variables effect the shear modulus of the binders derived from DSR testing. Once the significant variables are identified, regression analysis can be conducted utilizing the significant variables to identify interactions between variables and understand their relative magnitude/effect on the dependent variable. Additional analysis of the data includes development of binder master curves for comparison of rheological properties of the binders over a range of temperatures.

EXAMPLES

The following examples are for illustrative purposes only and are not intended to limit, in any way, the scope of the present invention.

Example 1—Synthesis of Poly(Acrylated
Epoxidized Soybean Oil-Block-Styrene)
(PAESO-PS) Via Atom Transfer Radical
Polymerization Benzyl chloride (BCl), copper(II) chloride ($Cu_{II}Cl_2$), and N,N,N',N'',N''-pentamethyldiethylenetriamine (PMDETA) were purchased from Aldrich Chemical and used without further purification. Copper(I) chloride ($Cu_ICl$) was purchased from Aldrich Chemical and purified with acetic acid. Acrylated epoxidized soy bean oil (AESO) was purchased from Fisher Scientific, dissolved in high-performance liquid chromatography (HPLC)-grade tetrahydrofuran (THF) and purified over basic alumina and inhibitor removers (Aldrich product No. 311332). Prior to use, THF in AESO was removed via rotary evaporation and the monomer AESO was degassed using three freeze-pump-thaw cycles. HPLC-grade toluene was purchased from Fisher Scientific, purified over basic alumina, and degassed prior to use. Styrene was purchased from Fisher Scientific and purified by three freeze-pump-thaw cycles followed by stirring over dibutyl magnesium and by subsequent vacuum distillation.

Atom Transfer Radical Polymerization (ATRP) of Acrylated Epoxidized Soybean Oil

ATRP synthesis was performed in a similar manner to the procedures described in Matyjaszewski et al., "Controlled/"Living" Radical Polymerization. Kinetics of the Homogeneous Atom Transfer Radical Polymerization of Styrene," *Journal of the American Chemical Society* 119(4): 674-680 (1997), which is hereby incorporated by reference in its entirety. The AESO monomer, the initiator (BCl), the catalyst (CuCl), the ligand (PMDETA), and the solvent were mixed under argon in a round-bottomed flask with the following ratios of various components: various mass ratios of monomer: solvent; a 100:1 molar ratio of monomer: initiator; a 1:1 molar ratio of initiator (BCl) to catalyst (CuCl), a 1:1 molar ratio of ligand (PMDETA) to catalyst, and a 0.1:1 molar ratio of counter-catalyst ($CuCl_2$) to catalyst.

Understanding Reaction Kinetics

Experiments were carried out to find a better solvent system for the polymerization reaction, evaluated by factors such as the ease of purification, the ease of removal of the solvent from the final polymer, the solubility of the final polymer in the solvent, and the influence of the solvent on the reaction kinetics. Chloroform, THF, and toluene were studied as solvents. Toluene proved to be a better candidate solvent than the other two solvents for its higher evaporation temperature and better solubility with the product polymer.

Figure 4:
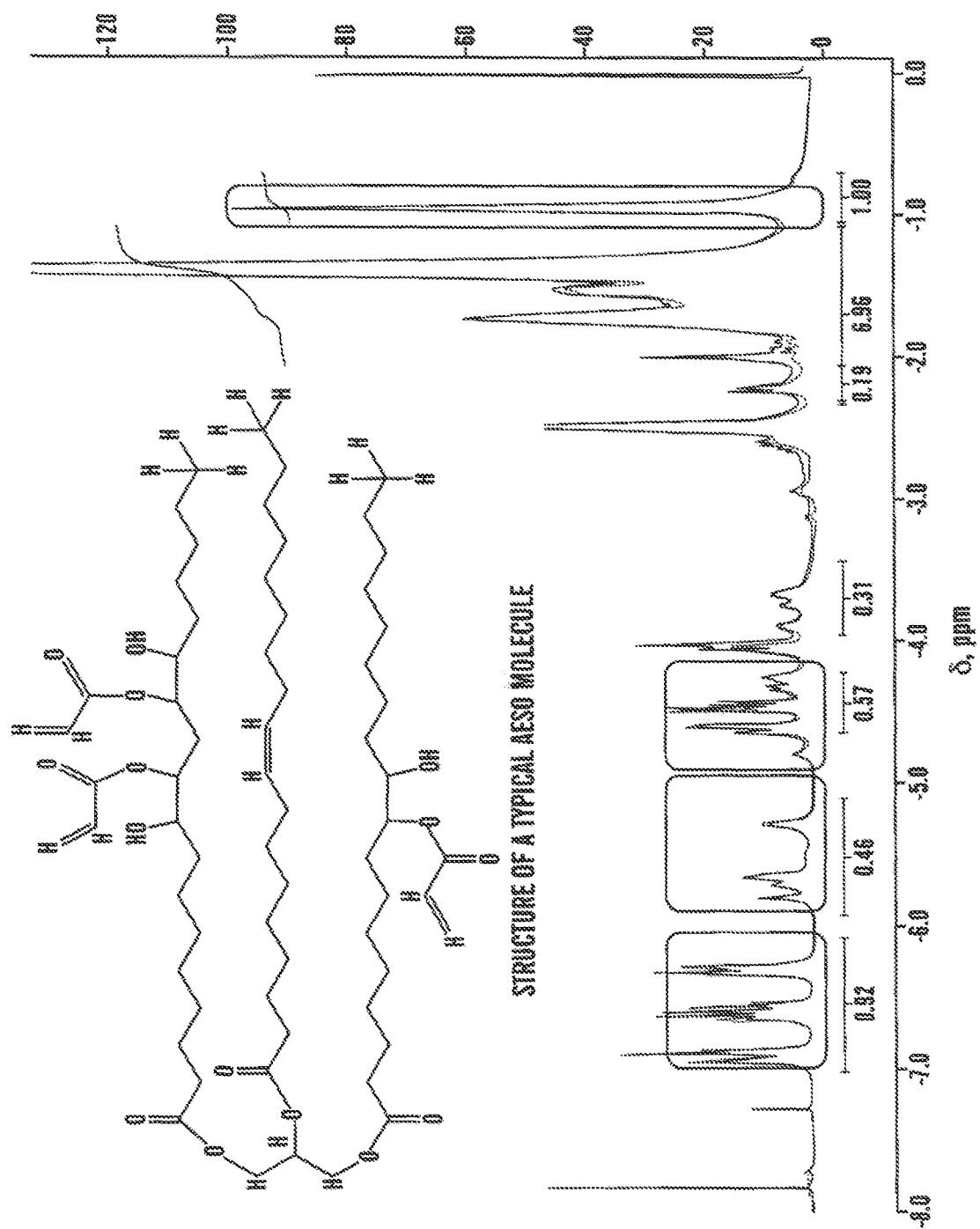
FIG. 4 is a graph showing the nuclear magnetic resonance (NMR) spectra of AESO (the left most square) and a representative PAESO (the second to the left square) after 48 hours of reaction.

Experiments were also carried out to investigate the reaction kinetics (i.e., conversion of monomer to polymer as a function of time), with all reaction conditions fixed except for the temperature and the ratio of monomer to solvent. Kinetic studies examined all combinations of three temperatures (65° C., 85° C., and 100° C.) and six monomer concentrations ranging from 50 to 100 weight percent monomer. The molecular weight distribution of each product polymer, poly(acrylated epoxidized soybean oil) (PAESO), was determined by size exclusion chromatography (see FIG. 3). The reactions that did not reach the gel point were terminated by quenching the reaction system to room temperature after 72 hours. PAESO was redissolved in THF, passed through basic alumina, and then precipitated in a 1:10 volumetric ratio of water to methanol. The precipitate was dried in a vacuum oven at room temperature to constant mass. To further characterize the extent of polymerization of the AESO, nuclear magnetic resonance (NMR) was performed on the dried sample (see FIG. 4).

Synthesis of P(AESO-B-Styrene)

Figure 5:
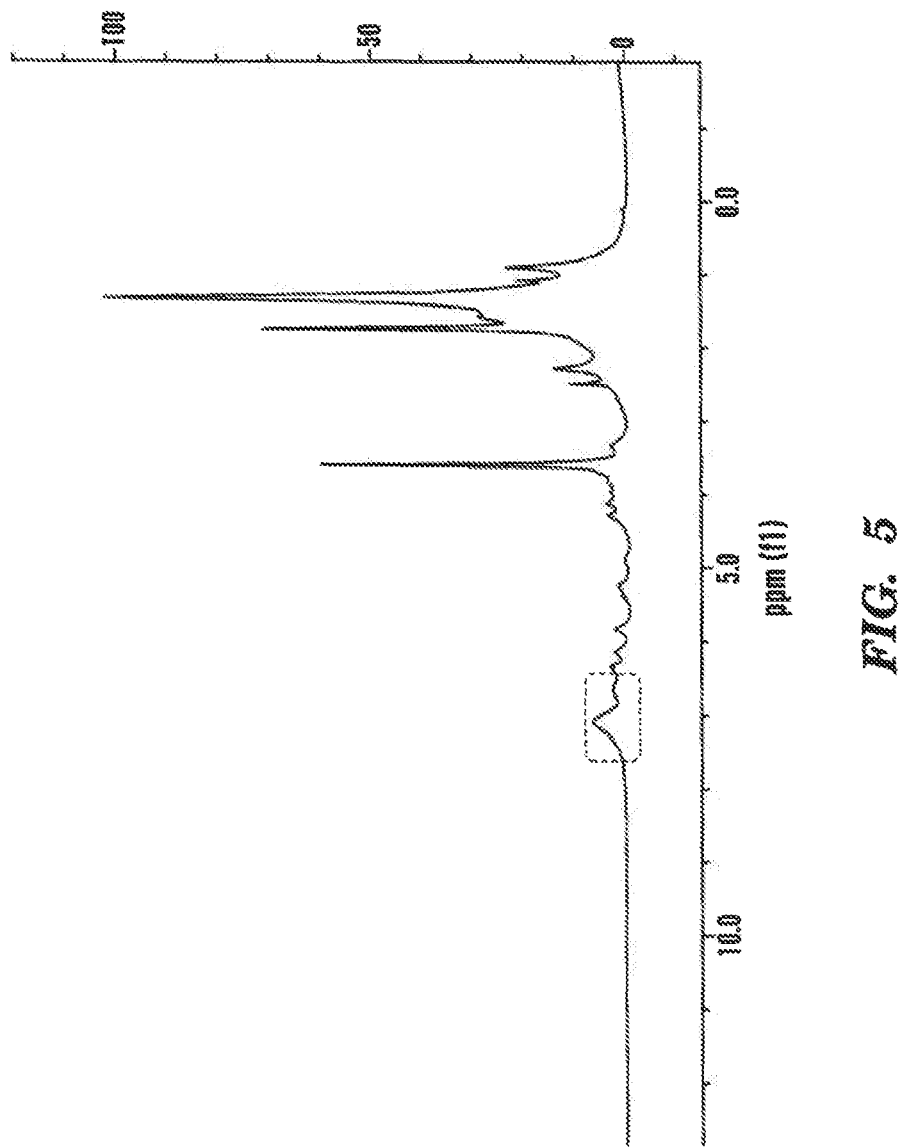
FIG. 5 is a graph showing the NMR spectra of poly (AESO-styrene) (PAESO-PS). The highlighted region shows the aromatic hydrogens of poly(styrene).

In a 100 mL round-bottom flask, 10 g of styrene was mixed with 20 g of PAESO that was dissolved in 20 g THF and 2.5 g toluene. THF was removed via evaporation at the beginning of the polymerization reaction. CuCl, PMDETA, and BCl were all added with the same reactant-monomer ratio according to the same procedure as in the polymerization of AESO discussed above. The reaction proceeded for 72 hours at 100° C. with moderate stirring. After the reaction was ended, the product polymer was filtered through an alumina column to remove the catalyst. The solution was then precipitated several times in a 1:10 ratio of water to methanol. The polymer was collected and vacuum-dried at room temperature. $^1H$ NMR was performed to prove the presence of polystyrene in the product (see FIG. 5).

Differential Scanning Calorimetry (DSC) of PAESO and PAESO-PS

Figure 6:
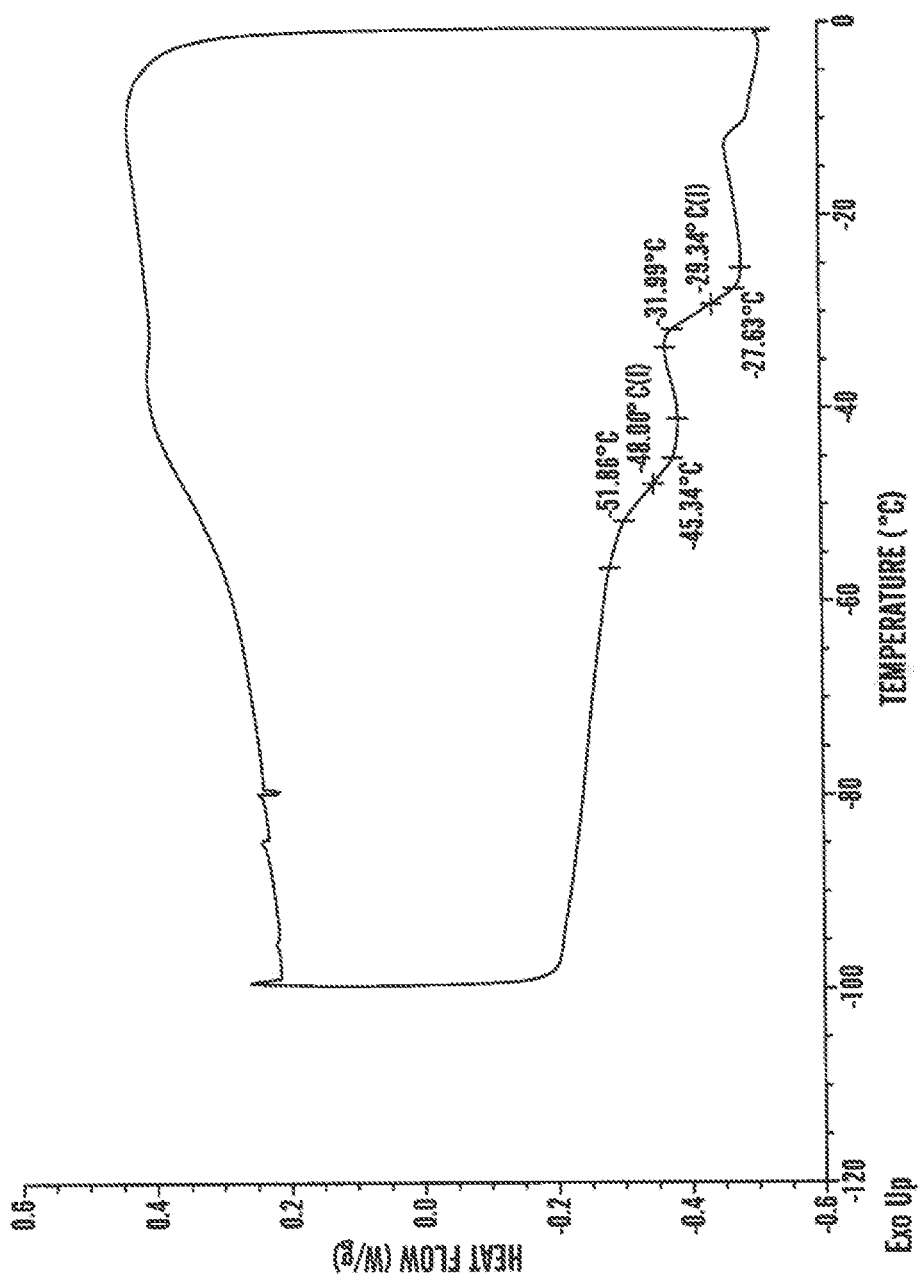
FIG. 6 is a graph showing the results of differential scanning calorimetry (DSC) of a PAESO sample after 240 minutes of reaction. Two main glass transition temperatures are shown in the graph: at −48° C. and at −29° C.
Figure 7:
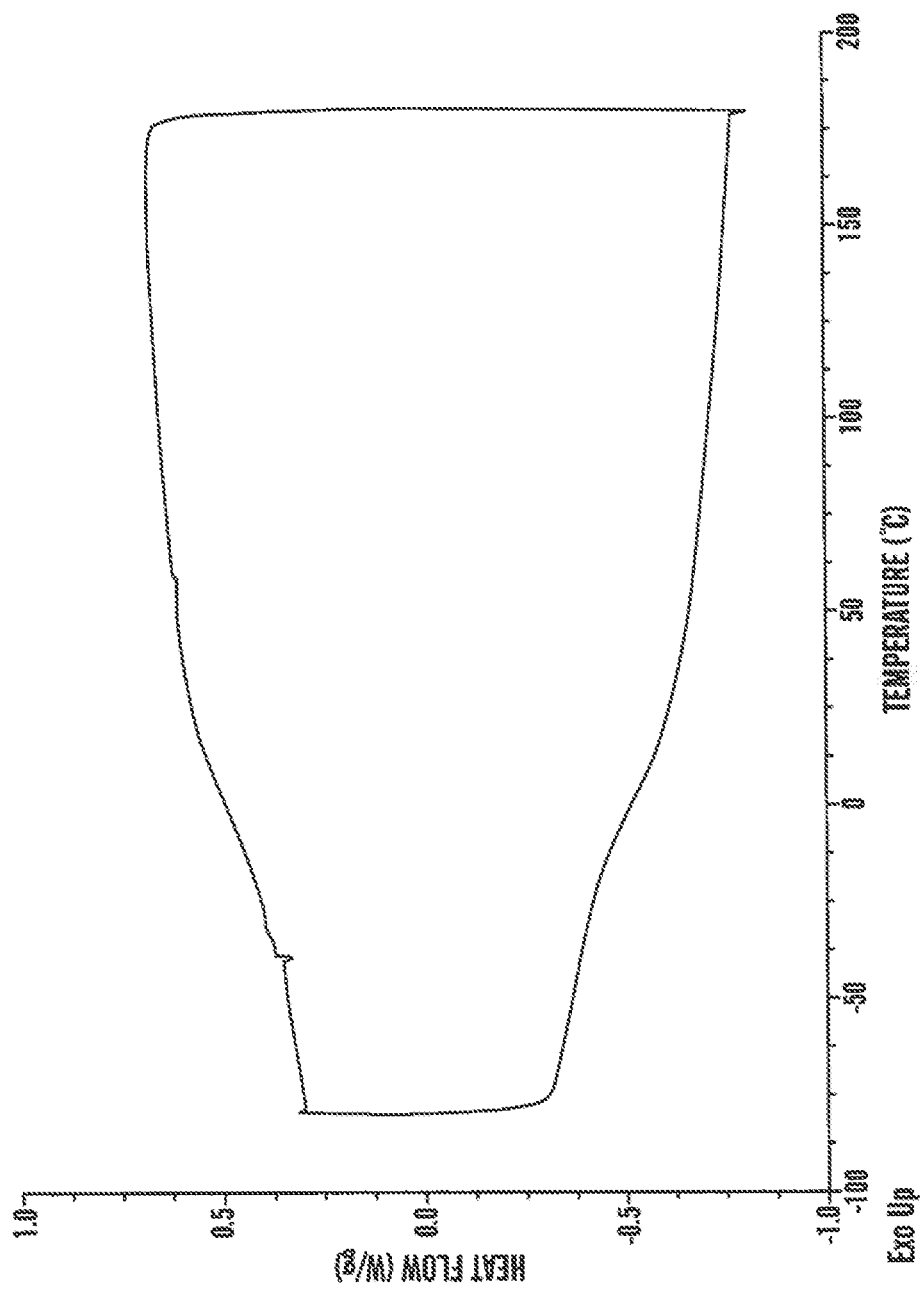
FIG. 7 is a graph showing the results of DSC of a PAESO-PS sample after 72 hours of reaction. A glass transition is shown in the graph at −18° C.; no apparent glass transition is present for the PS block.

DSC was performed to measure the glass transition temperatures ($T_g$) of the polymers. The PAESO and the PAESO-PS were each characterized by DSC to find the $T_g$. FIG. 6 shows the DSC plot for the PAESO sample at 240 minutes where two distinct glass transitions are visible. FIG. 7 shows the DSC plot for the diblock PAESO-PS after 72 hours, the glass transition for the PAESO block is visible but no definite point of glass transition was seen for the polystyrene block.

Rheological Measurements of PAESO-PS

Figure 8:
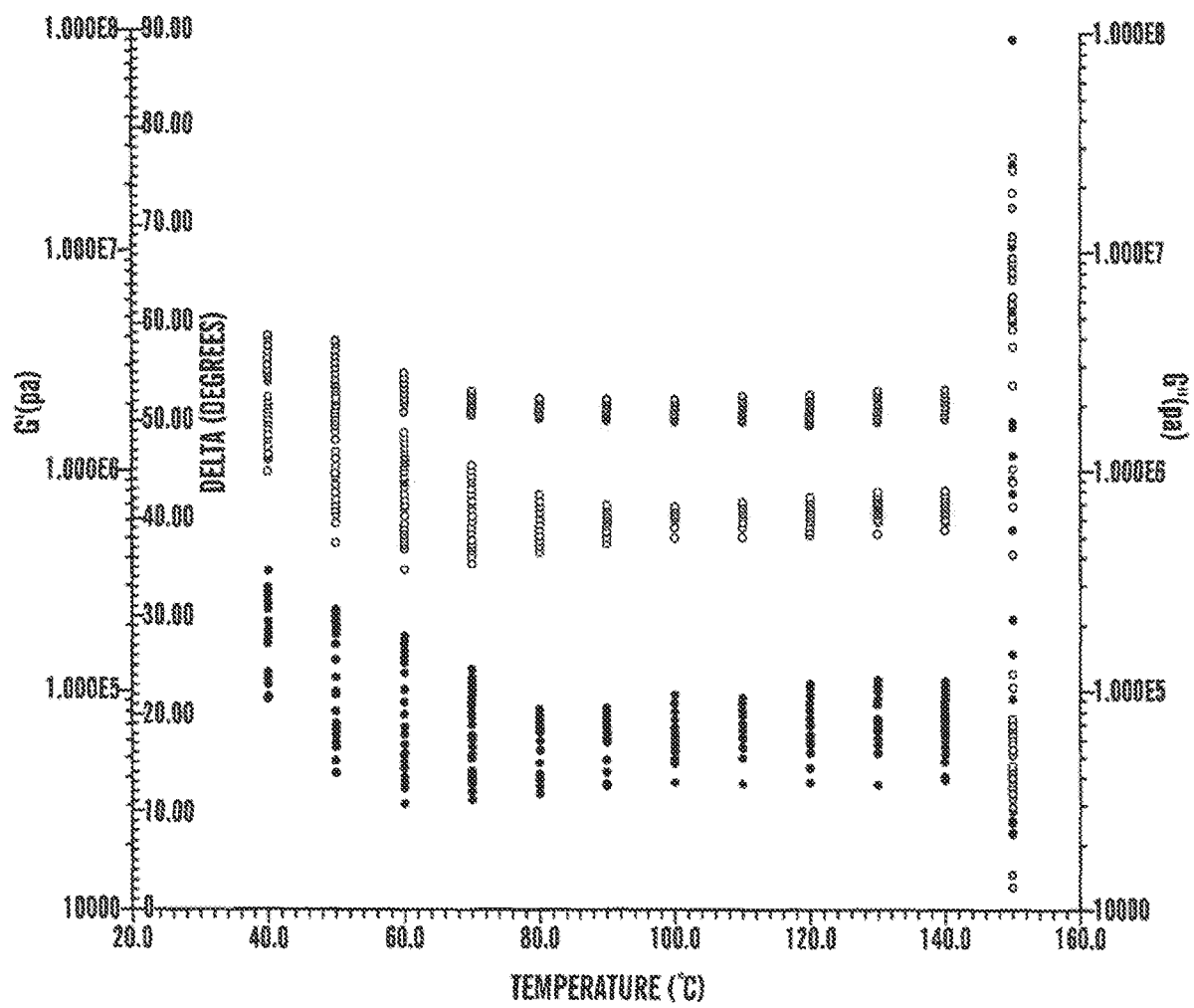
FIG. 8 is a graph showing the rheology plot of a PAESO-PS sample after 72 hours of reaction.

The dynamic complex modulus of PASEO-PS was measured using an advanced rheometric expansion system (ARES), strain-controlled rheometer in the parallel plate configuration. The results are shown in FIG. 8. Isothermal frequency scans with a frequency range were conducted within the linear viscoelastic regime using a strain of 2.5%. The initial temperature was set to 150° C. and the final temperature was set to 25° C. Temperature was changed in a 10° C.-decrement allowing 1 minute as the equilibration time. The elastic modulus, G', is nearly invariant to frequency and temperature above 80° C., a characteristic of elastic solids.

Example 2—General Synthetic Procedures for
Preparation of Poly(Acrylated Epoxidized Soybean
Oil) (PAESO) Via Atom Transfer Radical
Polymerization 10 g AESO (CAS #91722-14-4) and 20 g HPLC-grade THF were mixed and passed through a chromatography column packed with basic alumina and inhibitor removers (Sigma Aldrich product No. 311332). THF was removed using rotary evaporation. The AESO was then subjected to three "freeze-pump-thaw" cycles. In each cycle, the AESO was frozen under vacuum over liquid nitrogen in a vacuum flask and allowed to thaw. This process removes any dissolved gasses. 10 g HPLC-grade toluene was degassed in the same manner. 10 g AESO and 10 g toluene were then added to a 50 ml round-bottom flask in an Argon-filled glove box. To this mixture 16.9 mg BCl (50:1 molar ratio of AESO monomer to the initiator), 13.2 mg $Cu_ICl$ (1:1 molar ratio of initiator to catalyst), 23 mg PMDETA (1:1 molar ratio of ligand to catalyst), and 1.8 mg $Cu_{II}Cl_2$ (10:1 molar ratio of catalyst to counter-catalyst) were added prior to sealing the flask. The mixture was immersed in a temperature-controlled silicon oil bath at 100° C. for 12 hours, and then quenched to room temperature. The resulting PAESO was recovered from the solution by precipitation into 200 ml 10°

C. methanol. Two additional dissolution-precipitation cycles were conducted to further purify the product to remove residual AESO and catalyst.

Figure 9:
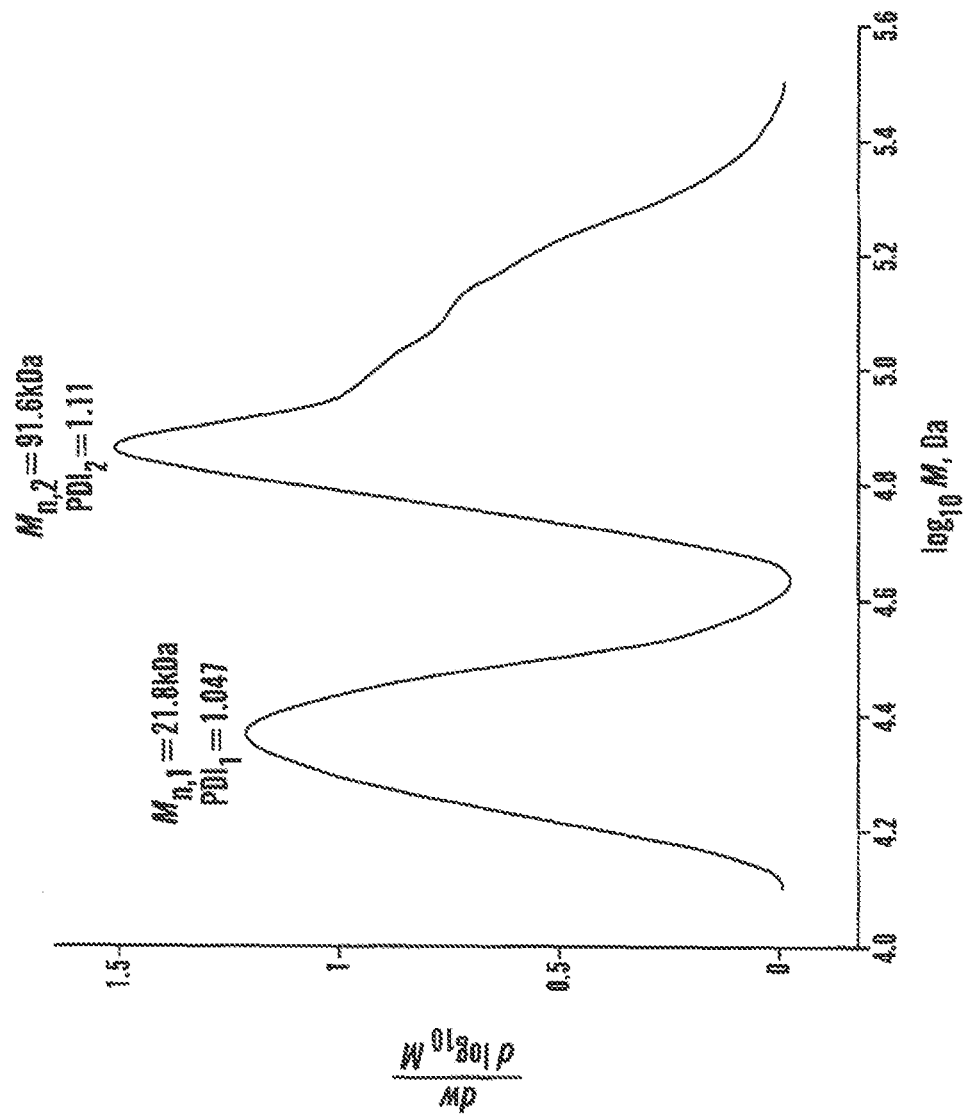
FIG. 9 is a graph showing the results of size exclusion chromatography (SEC) (calibrated to polystyrene standards) of poly(acrylated epoxidized soybean oil) (PAESO) synthesized according with the present invention.

The final product had a yield of 1.6 g PAESO. Size exclusion chromatography (SEC) indicated a bimodal distribution with $M_{n,1}$=21.8 kDa, $PDI_1$=1.047, and $M_{n,2}$=91.6 kDa, $PDI_2$=1.11. See the results of SEC in FIG. 9.

Figure 10:
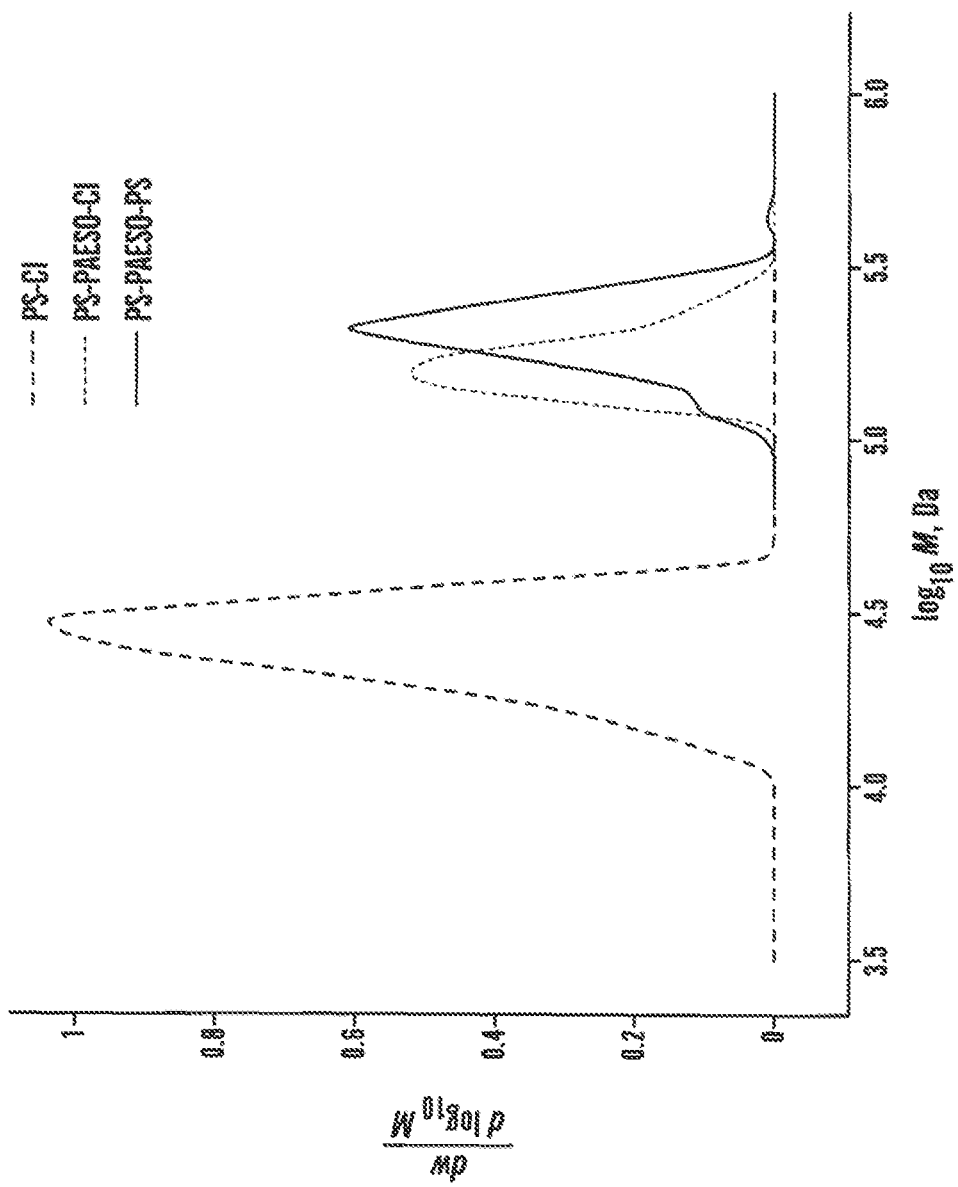
FIG. 10 is a graph showing the results of SEC (calibrated to polystyrene standards) of PS-Cl, PS-PAESO-Cl and PS-PAESO-PS synthesized according with the present invention.

Example 3—General Synthetic Procedures for Preparation of Poly(Styrene-Block-Acrylated Epoxidized Soybean Oil-Block-Styrene) (PS-PAESO-PS) Via Atom Transfer Radical Polymerization 10 g styrene (Sigma-Aldrich) was subjected to three "freeze pump-thaw" cycles followed by stirring over 10 mmol dibutyl magnesium and by subsequent vacuum distillation. The purified styrene was then polymerized via ATRP using the benzyl chloride/CuCl/PMDETA system following the procedures described in the literature (Matyjaszewski et al., "Controlled/"Living" Radical Polymerization. Kinetics of the Homogeneous Atom Transfer Radical Polymerization of Styrene," *Journal of the American Chemical Society* 119(4): 674-680 (1997), which is hereby incorporated by reference in its entirety). The product had a yield of 8.3 g PS-Cl, and was characterized by SEC to have $M_{n,s}$=24.7 kDa and $PDI_s$=1.057. See FIG. 10.

A catalyst/ligand solution was prepared by adding 1.35 g $Cu_lCl$ and 1.73 g PMDETA into a 100 mL volumetric flask followed by adding degassed-HPLC-grade toluene, producing a 0.1 M concentration of catalyst/ligand solution. The final concentration of 10 M catalyst ligand solution was achieved by two sequential 10-fold dilutions of the 0.1 M solution with toluene. A similar procedure was used to prepare a 1 M counter-catalyst solution of $Cu_{II}Cl_2$. The macroinitiator PS-Cl was purified by three solvation-precipitation cycles (using 3:1 volumetric ratio of methanol to isopropanol as the precipitant), and was dried to constant mass at room temperature under dynamic vacuum. 0.25 g purified PS-Cl (0.01 mmol), 0.1 ml catalyst solution, 0.1 ml counter-catalyst solution, 10 g AESO (prepared as per Example 2), and 10 g degassed HPLC-grade toluene were mixed under argon in a round-bottom flask and heated to 100° C. for 12 hours using a temperature-controlled oil bath. The resulting PS-PAESO-Cl was recovered by precipitation into a 3:1 volumetric mixture of methanol and isopropanol, purified by two subsequent salvation-precipitation cycles, and dried to constant mass under dynamic vacuum. The product had a yield of 1.79 g PS-PAESO-Cl, and was characterized by SEC to have $M_n$=168 kDa and PDI=1:04. See FIG. 10.

The final PS block was added to PS-PAESO as follows. 1.5 g purified PS-PASEO-Cl, 0.1 ml catalyst solution, 0.1 ml counter-catalyst solution, 0.25 g purified styrene, and 3 g toluene were added to a round-bottom flask under argon and sealed. The flask was heated to 100° C. for 6 hours and then quenched to room temperature. PS-PAESO-PS was recovered and purified by three sequential solvation-precipitation cycles. The final product had a yield of 1.68 g PS-PAESO-PS, and was characterized by SEC to have $M_n$=193 kDa, PDI=1:063. See FIG. 10. The final styrene composition in PS-PAESO-PS was 33.7 wt % by $^1$H-NMR.

Example 4—Evaluating the Effects of a Bio-elastomer Blended with an Asphalt Binder An experimental plan was developed to evaluate the effects of a developed bio-elastomer (plant-oil based block copolymer) when blended with an asphalt binder and compare to two standard elastomers commonly used in asphalt. The base asphalt was a performance grade (PG) 52-34 as determined by American Association of State Highway and Transportation Officials (AASHTO) specification M-320 and was supplied by a regional asphalt supplier. The two standard elastomers selected to blend with the PG52-34 binder were the Kraton 1101 and the Kraton 1118 as both are used with the supplied asphalt binder for modification. Blending of the elastomers into the PG52-34 asphalt binder were done using a Silverson L4RT-A laboratory shear mill in quart size stainless steel containers for 90-150 minutes at 3000 rpm utilizing aJ-KEM Scientific temperature probe for digital temperature control at 170° C. in a heating mantle. The elastomers were blended at 1, 2, 3, 4, and 5% by weight of the total binder blend resulting in approximately 280 g samples for each blend for subsequent testing.

Dynamic shear rheometer testing of the unaged, rolling thin film oven tested (RTFOT) aged, and RTFOT and pressure aging vessel (PAV) was done at multiple temperatures to determine the shear modulus (G*), phase angle (δ), and the combined effects—G*/sin δ) on the unaged and RTFOT aged and G*·sin δ on the RTFOT and PAV aged—of the various blends. Mass loss determination was also done on samples that were subjected to RTFOT aging. Bending beam rheometer testing at multiple temperatures was done on the RTFOT and PAV aged blends resulting in the stiffness (S) and m-value being determined for the blends. Tests were done on each blend in triplicate.

Statistical hypotheses were used to determine if there were statistical differences in the test results for the three different elastomers as well as the percentage of each elastomer added to the PG52-34 asphalt binder.

An example of the hypotheses to be tested between the three different elastomers is as follows:

$H_o$: G*, 1% Kraton 1101 at 64° C.=G*, 1% Bio-elastomer at 64° C.

$H_a$: G*, 1% Kraton 1101 at 64° C.≠G*, 1% Bio-elastomer at 64° C.

An example of the hypotheses evaluating the whether or not there are differences at varying levels of elastomer contents:

$H_o$: G*, 1% Bio-elastomer at 64° C.=G*, 2% Bio-elastomer at 64° C.

$H_a$: G*, 1% bio-elastomer at 64° C.≠G*, 2% Bio-elastomer at 64° C.

Example 5—Determining the Gel Point for AESO Polymerization

The AESO monomer synthesized in Examples 2-4 contains 1-3 polymerizable moieties. Polymerization of these moieties to form PAESO can yield polymers with some degree of branching. Conventional free radical polymerization offers no manner in which the level of branching may be controlled. Accordingly, thermosets are the only products that may be anticipated by conventional free radical polymerization. Controlled free radical polymerization chemistries such as ATRP, however, offer the ability to limit the extent of polymerization such that branching is mitigated to a level below the gel point. Thus the resulting polymers of the controlled free radical polymerization (e.g., ATRP) are thermoplastic. It is therefore important to control the reaction conditions, such as limiting conditions of gel point, to produce thermoplastic block copolymer. PAESO is produced in this example to show different reaction conditions in relation to the gel point.

Consequently, experiments were performed to test gelation times for a set of concentrations of initiator and catalyst (i.e.—benzyl chloride and $Cu_fCl$), see Table 2. The experiments were performed to understand the effect of the solvent, counter catalyst, and temperature on gelation of PAESO. 5 g of purified AESO, 6 μg $Cu_fCl$, and 7 μg B were added into each of 12 vials in an argon-filled glove box. 5 g toluene 0.8 μg $Cu_{II}Cl_2$ were added to 6 vials in a manner such that 4 sets vials each containing 3 vials had combinations of with/without $Cu_{II}Cl_2$ and with/without solvent. Within each set, 1 vial was heated to 65° C., another to 85° C., and another to 100° C. to initiate ATRP. Each vial was monitored periodically to assess if the PAESO had reached its gel point as observed by a sudden increase in solution viscosity, phase separation, or solidification of the reaction medium. The results are shown in Table 2.

TABLE 2

Gel point conditions in Example 5

| Vial | Temp, ° C. | $Cu_{II}Cl_2$? | Solvent? | Time to gel point, hour |
|---|---|---|---|---|
| 1 | 65 | No | No | 12 |
| 2 | 85 | No | No | 10 |
| 3 | 100 | No | No | 6 |
| 4 | 65 | No | Yes | — |
| 5 | 85 | No | Yes | 48 |
| 6 | 100 | No | Yes | 35 |
| 7 | 65 | Yes | No | 30 |
| 8 | 85 | Yes | No | 20 |
| 9 | 100 | Yes | No | 12 |
| 10 | 65 | Yes | Yes | — |
| 11 | 85 | Yes | Yes | — |
| 12 | 100 | Yes | Yes | 48 |

"—" = gelation was not reached in 72 hours

It was shown that the addition of solvent (20% by mass solvent/monomer) and $Cu_{II}Cl_2$ in a reaction system at 65° C. slowed the polymerization the most, and no gelation occurred under such condition in 72 hours. Reactions with the higher percent of monomer, without $Cu_{II}Cl_2$ at 100° C. reached gelation within 10 hours after reaction started.

Example 6—General Synthetic Procedures for Preparation of Poly(Styrene-Block-AESO Block-Styrene) Via Atom Transfer Radical Polymerization Poly(Styrene-Block-AESO-Block-Styrene) was synthesized using the procedure analogous to the synthesis of the homopolymers in the diblock copolymers in Examples 1-3.

Styrene was polymerized using: BCl, CuCl, PMDETA, and toluene, as similarly described in Examples 1 and 3. The reaction proceeded for 48 hours at 100° C., the product was then dissolved in THF and passed through alumina followed by its precipitation in a mixture of 3:1 methanol to isopropanol. The resulting product was collected and vacuum-dried at 70° C., and then redissolved in THF.

The above product was mixed with AESO along with CuCl, PMDETA, and toluene. THF was removed via evaporation at the beginning of the polymerization reaction. The reaction proceeded for 6 hours at 100° C., with moderate stirring. The solution was then passed through alumina and precipitated several times in a 1:10 ratio of water to methanol. The diblock polymer was collected and vacuum-dried at room temperature.

The diblock was redissolved once again in THF (THF was removed prior to the beginning of the polymerization), and mixed with styrene along with CuCl, PMDETA, and toluene. The reaction proceeded for 8 hours at 100° C., and the product was then precipitated several times in a 1:10 ratio of water to methanol, collected and vacuum-dried at room temperature.

Example 7—Molecular Characterization of Polymers Produced in Examples 1-3 and 6

$^1$H NMR spectra were determined on a Varian VXR-300 spectrometer in deuterated chloroform ($CDCl_3$) or deuterated tetrahydrofuran ($d_8$—THF) at room temperature. Molecular weights and molecular weight distributions were determined via gel permeation chromatography (GPC) with respect to polystyrene standards (HPLC chloroform as the solvent) in a Waters 717 autosampler and a Waters 515 HPLC system with a Waters 2414 refractive index detector. A HPLC-tetrahydrofuran GPC was used for samples that were not soluble in chloroform.

Example 8—Asphalt Modification with PAESO-Based Thermoplastic Elastomers

The viability of the PAESO-based thermoplastic elastomers as a replacement for the tradition SBS polymers used in asphalt modification was determined. Bitumen was mixed with 1-5% by mass of PAESO-based biopolymer for 3 hours at 180° C.

Figure 11:
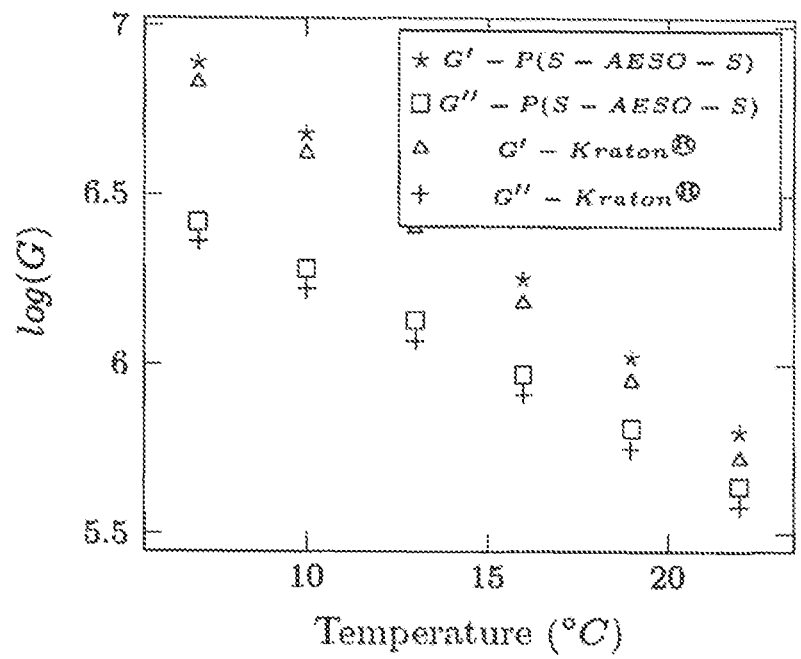
FIG. 11 is a graph showing the storage and loss modulus G' and G" as a function of temperature of bitumen with 1% mass poly(styrene-b-AESO-styrene) triblock and of bitumen with 1% Kraton®.

The results demonstrated that the rheology of these biopolymers when mixed with bitumen showed a higher increase in the storage and loss modulus G' and G" compared to their petroleum-based counterparts. See FIG. 11.

Discussion of Examples 1-8

Polymers from vegetable oils have obtained increasing attention as public policy makers and corporations alike have been interested in replacing traditional petrochemical feedstocks due to their environmental and economic impact. In recent years, the cost of the bio-monomer has become highly competitive (in many cases more economical than petrochemical feedstocks). With appropriate modification of the soybean oil (such as conjugation of triglycerides, or development of soybean oil types that are particularly suitable for polymerization), the chemical properties, thermal properties, microstructure and morphology, and mechanical/rheological behaviors of the soybean oil-based polymers could be fine-tuned to make these biopolymers highly useful in the plastics industry.

To date, some success has been achieved through the application of traditional cationic and free radical polymerization routes to vegetable oils to yield thermoset plastics. Pfister & Larock, *Bioresource Technology* 101:6200 (2010), which is hereby incorporated by reference in its entirety, have researched a variety of polymers, ranging from soft rubbers to hard, though plastics using cationic copolymerization of vegetable oils, mainly SBO, to produce thermoset plastics using boron triflouride diethyletherate (BFE) as the initiator. Lu et al. synthesized soybean-oil-based waterborne polyurethane films with different properties ranging from elastomeric polymers to rigid plastics by changing the polyol functionality and hard segment content of the polymers (Lu et al., *Polymer* 46:71 (2005); Lu et al., *Progress in Organic Coatings* 71:336 (2011), which are hereby incorporated by reference in their entirety). Wool et al. have reported the use of soybean oil to synthesize different bio-based products such as sheet molding composites, elastomers, coatings, foams, etc. For instance, Bunker et al. were able to synthesize pressure-sensitive adhesives using miniemulsion polymerization of acrylatedmethyl oleate, a monoglyceride derived from soy bean oil (Bunker et al, *International Journal of Adhesion and Adhesives* 23:29 (2003); Bunker & Wool, *Journal of Polymer Science Part A: Polymer Chemistry* 40:451 (2002), which are hereby incorporated by reference in their entirety). The polymers produced were comparable to their petroleum counterparts. Zhu et al. were able to generate an elastic network based on acrylated oleic methyl ester through bulk polymerization using ethylene glycol as the crosslinker (Zhu & Wool, Polymer 47:8106 (2006), which is hereby incorporated by reference in its entirety). Lu et al. were able to create thermosetting resins synthesized from soybean oil that can be used in sheet molding compound applications. These resins were synthesized by introducing acid functionality and onto the soybean. The acid groups reacted with divalent metallic oxides or hydroxides forming the sheet, while the C═C groups are subject to free radical polymerization (Lu et al., *Polymer* 46:71 (2005), which is hereby incorporated by reference in its entirety). Bonnaillie et al. were able to create a thermoset foam system using a pressurized carbon dioxide foaming process of acrylated epoxidized soybean oil (AESO) (Bonnaillie & Wool, *Journal of Applied Polymer Science* 105: 1042 (2007), which is hereby incorporated by reference in its entirety). Wool et al. were able to synthesize liquid molding resins that were able to be cured into high modulus thermosetting polymers and composites using triglycerides derived from plant oils (U.S. Pat. No. 6,121,398 to Wool et al., which is hereby incorporated by reference in their entirety).

Uncontrolled chain branching and crosslinking were inevitable using the aforementioned conventional polymerization routes in the art due to the multifunctional nature of triglycerides, multiple initiation sites along the chain backbone, and chain transfer/termination reactions. Thus, each polytriglyceride repeating unit has the potential to crosslink with at least one other polytriglyceride; when approximately a fraction of 1/N of such units have crosslinked (N denotes the number of repeating units in a polymer chain), the polymers are said to be at their "gel point" at which an infinite polymer network has formed and the material is a thermoset polymer.

Controlled radical polymerization such as ATRP limits the number of initiation sites, drastically reduces the rate of chain transfer and termination reactions, and also introduces the capability to produce custom chain architectures such as block copolymers (BCPs). An advantage of applying ATRP to the polymerization of triglycerides is that the initiation of new chain branches from other growing chains is eliminated. However, chain branching ultimately leading to gelation is still possible, and will proceed quickly if the polymerization rate or polymer concentration becomes too large. When the reactivities of a propagating chain towards all functional sites on both free monomers and repeating units that are already incorporated into a chain are identical, the general expectation is that the gel point will be reached at an extremely low conversion, such that, prior to gelation, the polytriglyceride has not yet achieved a degree of polymerization sufficient for useful mechanical properties to develop. This general expectation is supported by the past two decades of reports of thermosets from vegetable oils produced by conventional cationic and free radical polymerization.

However, in the results of Examples 1-8, for the first time, a controlled radical polymerization technique was applied to synthesize elastomeric diblock and triblock copolymers containing polystyrene (PS) and poly(AESO) (PAESO). Surprisingly, the ATRP proved to successfully control the polymerization of AESO so that the polymerization terminated at a desired molecular weight and block composition. Homopolymer thermoplastic PAESO were created ranging from a tacky rubber at a low molecular weight to a highly elastic viscoelastic material at large molecular weight. Diblock (PS-PAESO, PAESO-PS) and triblock copolymers (PS-PAESO-PS) were created over a range of block compositions and molecular weights.

Without appropriate reaction conditions, early gelation could still extend to ATRP polymerization techniques if the reactivity ratios between propagating radicals and all unreacted functional sites on the triglycerides were rigorously identical. However, in Examples 1-8, it was found that the preference of a propagating radical for free monomers can be exacerbated through the appropriate selection of temperatures, solvent/solvent concentration, and selection of the catalyst/counter-catalyst system. Under such conditions, it was possible to produce polymerized triglycerides to targeted molecular weights of up to 500 kDa prior to the gel point.

In the examples, vegetable oils, such as AESO, with an average of 3.4 acrylates (Lu et al., *Polymer* 46:71 (2005), which is hereby incorporated by reference in its entirety), and styrene were used to form elastomeric block copolymers analogous to, e.g. the PS-polybutadiene-PS (SBS) polymers of the Kraton® family. The addition of styrene helped improve the processability, aided in the control of the polymers' melt state properties (glass transition temperature ($T_g$), elastic moduli, etc.) (RICHARD P. WOOL & XIUZHI SUSAN SUN, BIO-BASED POLYMERS AND COMPOSITES (Academic Press, Burlington, Mass. 2005), which is hereby incorporated by reference in its entirety), and served as physical crosslinking sites below the $T_g$ of the PS (100° C.). In a typical SBS elastomer, the styrene composition is about 10-30 wt % such that spherical or cylindrical styrene domains form in a matrix of butadiene. When the temperature is below the glass transition temperature of polystyrene ($T_g$=100° C.), the polybutadiene matrix is liquid ($T_g$<−90° C.) but is bound between the vitreous polystyrene spheres, which serve as physical crosslinks. When the temperature is above the glass transition temperature of polystyrene, the entire elastomer system is molten and may be processed easily. Crosslinked poly(soybean oil) has been reported to have $T_g$ values as low as −56° C. (Yang et al., *Journal of Polymers and the Environment* 19:189 (2011), which is hereby incorporated by reference in its entirety). Accordingly, the poly(soybean oil) is an excellent candidate to serve as the liquid component in thermoplastic elastomers based on styrenic block copolymers.

Block copolymers (BCPs) containing styrene and butadiene, particularly the Kraton® (SBS) family of polymers have been used worldwide in different range of applications: ranging from pressure sensitive adhesives, to tires, packaging materials, footwear, and as a modifier of bitumen/asphalt, which is one of its largest markets. With the forecast of increasing demand of liquid asphalt for the next decade, a strong need exists for a new type of cost effective, environment-friendly, viable polymers that can be used as an asphalt modifier in lieu of standard styrene-butadiene type modifiers. The soybean oil-based biopolymers described in the examples provided viable material properties as bitumen modifiers.

Example 9—Soybean Oil-Based Thermoplastic Elastomeric Block Copolymers Via ATRP and their Characterizations ATRP synthesis was performed analogously to the procedure described by Matyjaszewski et al, *Journal of the American Chemical Society* 119:674 (1997), which is hereby incorporated by reference in its entirety. See the procedures described in Examples 1-3 and 6.

Using acrylated epoxidized soybean oil (AESO) as the monomer, benzyl chloride (BCl as the initiator, copper(I) chloride ($Cu_ICl$) and copper(II) chloride ($Cu_{II}Cl$) as the catalyst and counter catalyst respectively, and N,N,N',N",N"-pentamethyldiethylenetriamine (PMDETA) as the ligand. A 1:1 ratio of initiator (BCl) to catalyst ($Cu_ICl$), a 1:1 ratio of ligand (PMDETA) to monomer, and a 0.1:1 molar ratio of counter-catalyst ($CuCl_2$) to monomer were used.

Experiments were conducted to obtain a better solvent system for the polymerization reaction, evaluated by factors such as the ease of purification, ease of removal from the final polymer, the solubility of the final polymer in the solvent, and the influence of the solvent on the reaction kinetics. Chloroform, THF, and toluene were studied as solvents. Toluene to be a better candidate solvent than the other two solvents for its higher evaporation temperature and better solubility with the product polymer.

Figure 12:
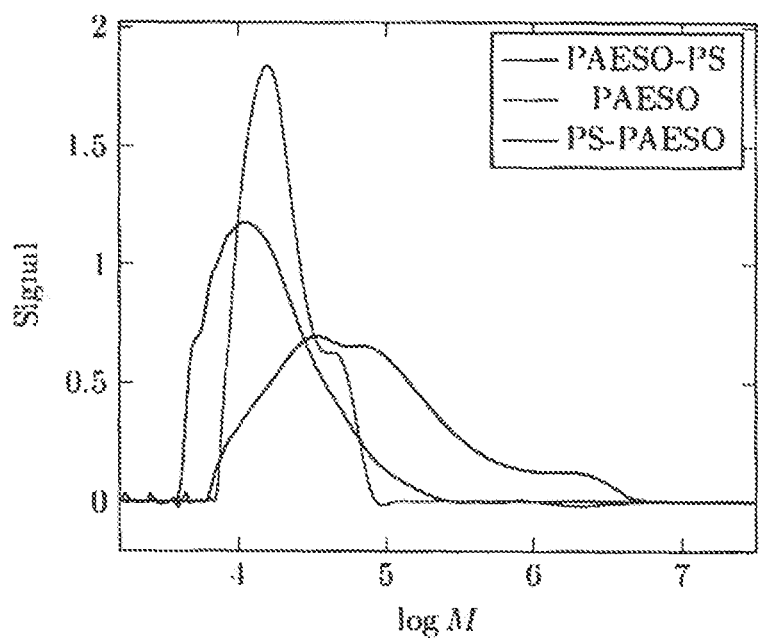
FIG. 12 is a graph showing the molecular weight distribution of the PAESO, PAESO-PS, and PS-PAESO characterized by the elution time determined using size exclusion chromatography.

Experiments were also carried out to investigate the reaction kinetics (i.e., conversion of monomer to polymer as a function of time), with all reaction conditions fixed except for the temperature, the presence of $Cu_{II}Cl_2$, and the ratio of monomer to solvent. Kinetic studies examined all combinations of the three temperatures (65° C., 85° C., and 100° C., the addition of the counter catalyst, and six monomer concentrations ranging from 0.5 to 1.0 weight percent monomer). The reactions were allowed to proceed until they reach the gel point. Reactions that did not reach the gel point were terminated by quenching to room temperature after 72 hours. The molecular weight distribution of each product, poly(acrylated epoxidized soybean oil) (PAESO), was determined by size exclusion chromatography, see FIG. 12.

The results from the above experiments provided insight on the effect of solvent, counter catalyst, and temperature on gelation of PAESO. It was observed that addition of solvent (20% by mass solvent/monomer) and $Cu_{II}Cl_2$ in a reaction system at 65° C. slowed the polymerization the most, and no gelation occurred under such condition in 72 hours. Reactions with the higher percent of monomer, without $Cu_{II}Cl_2$ at 100° C. reached gelation within 10 hours after reaction started.

Polymerization of styrene containing diblocks and triblocks were carried out at 100° C. No solvent was used for the polymerization of the styrene homopolymer, but the solvent was present to solvate polymers in the polymerization of the diblocks and tri blocks. Table 3 lists some of the polymers utilized for characterization.

TABLE 3

Compositions of biopolymer utilized for characterization.

| Sample Name | M.W.[a] | PDI[b] | % Sty[c] | 1[std] | 2[nde] |
|---|---|---|---|---|---|
| PAESO | 29,500 | 1.39 | 0 | — | — |
| PAESO-PS | 48,150 | 1.59 | 0.39 | 18,650 | — |
| PS-PAESO | 40,980 | 1.34 | 0.33 | 13,900 | — |
| PS-PAESO-PS #1 | 53,300 | 1.84 | 0.49 | 13,900 | 12,200 |

[a]Total molecular weight of BCP
[b]Polydispersity
[c]Percent styrene in BCP
[d]Molecular weight of styrene in first block
[e]Molecular weight of styrene in second block

$^1$H NMR was carried out on the dried sample, which proved the presence of polystyrene in the product. See FIG. 4.

To characterize viscoelastic properties of the biopolymers, DSC was used to find the glass transition temperatures ($T_g$) of the polymers. DSC experiments were conducted on a TA-Instruments Q2000 Differential Scanning calorimeter equipped with liquid nitrogen cooling system (LNCS). Three consecutive heating and cooling runs where performed for each sample (−100° C. to 150° C.) using standard aluminum pans and a heating/cooling rate of 10° C./min. PAESO showed a glass transition temperature ($T_g$) of −48° C., characteristic of a rubbery polymers. See FIG. 6.

Figure 13:
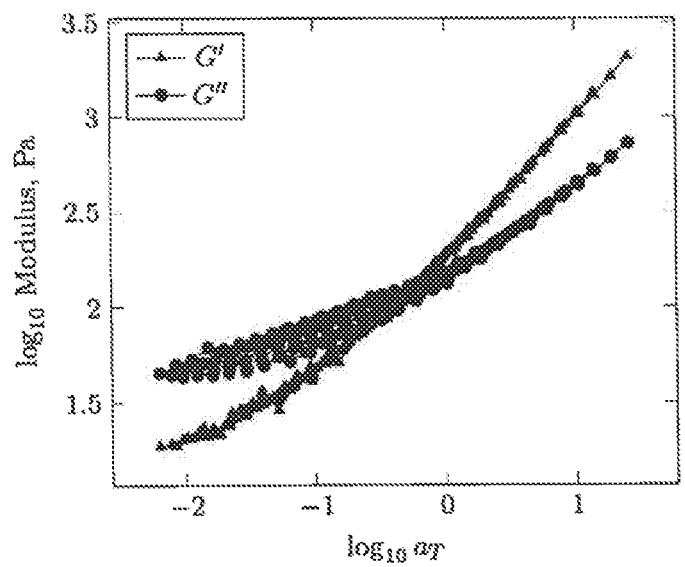
FIG. 13 is a graph showing time temperature superposition (TTS) of PAESO with an average molecular weight of 45 kDa.
Figure 14:
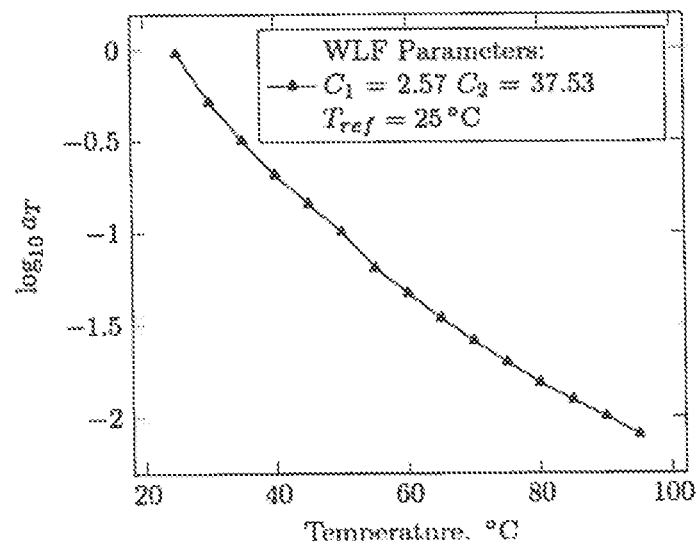
FIG. 14 is a graph showing the shift factors used to calculate TTS in FIG. 13.

Rheology measurements were performed in a TA Instruments AR2000ex, stress controlled rheometer with a convection oven was used to test the polymers under nitrogen gas flow to prevent polymer degradation. Samples were tested in a parallel plate geometry using a temperature ramp test at heating rate of 5° C. and a strain of 2%. Samples were mixed with butylated hydroxytoluene (BHT) to prevent crosslinking of the polymer. FIG. 13 is the rheology curve of the PAESO homopolymer showing a low modulus and liquid-like behavior of the PAESO homopolymer at high temperatures, typical of a thermoplastic elastomer. The shift factors used to calculate the TTS graph of FIG. 13 was shown in FIG. 14.

Figure 15:
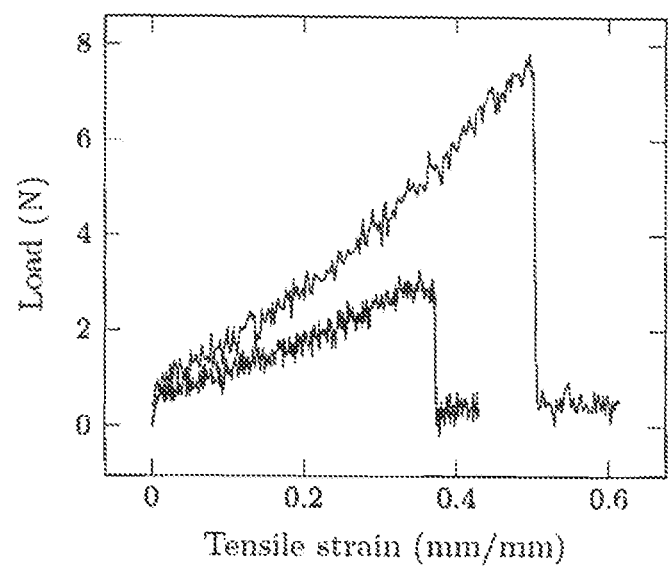
FIG. 15 is a graph showing the results of the tensile test of PS-PAESO-PS; results were from the same sample.
Figure 16:
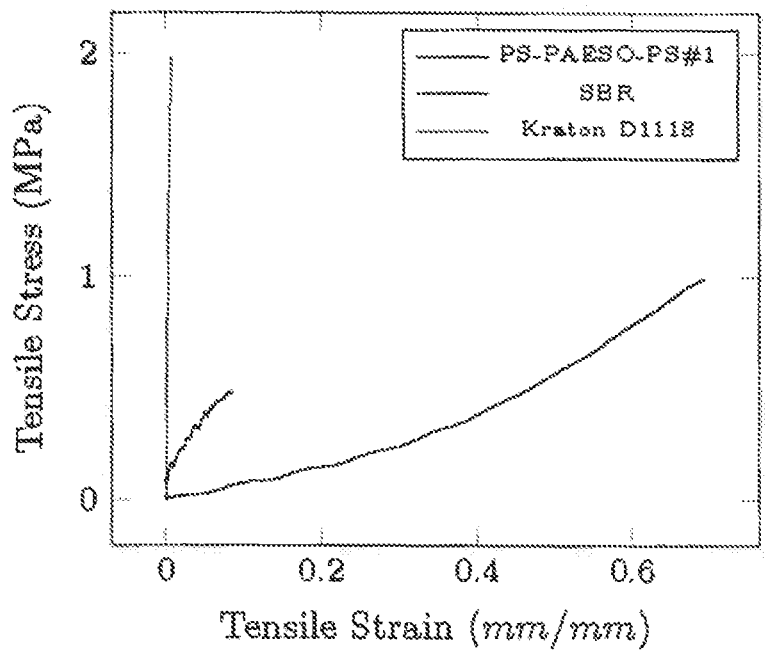
FIG. 16 is a graph showing the stress vs. strain curves for two petroleum-based triblock copolymers (SBR, and Kraton D1118) compared to the PS-PAESO-PS#1. Tests were carried out using an average speed of 50 mm/min.

Tensile Testing was carried out in an Instron 4204 Tension Test Frame and Controller, using an average speed of speed of 50 mm/min. See FIG. 15. Stress vs. strain curves for PS-PAESO-PS#1 were compared to commercially available petroleum-based triblock copolymers: SBR and Kraton D1118, as shown in FIG. 16. The results demonstrated that the elastic characteristics of the biopolymer showed an almost linear increase in strain with respect to stress. These characteristics were similar to those of the SBR polymers due to the high rubber content in the biopolymer. Elongation-to-break of the PS-PAESO-PS#1 was six times higher compared to the SBR and twice as the Kraton D1118. Another characteristic of the elasticity of the biopolymer was the absence of yielding, which can be observed in the Kraton D1118 triblock.

Figure 17:
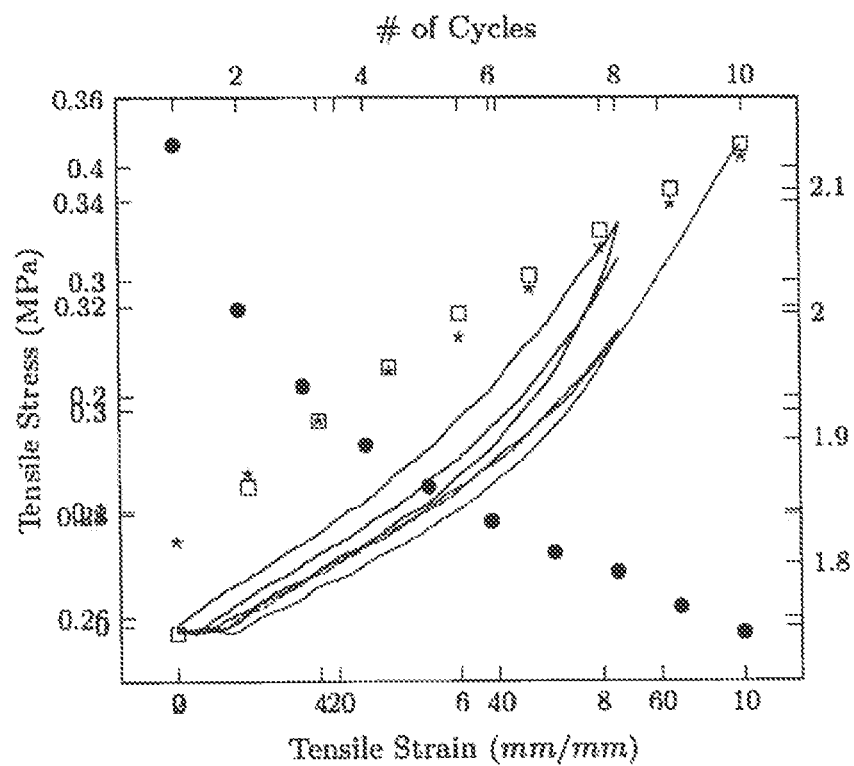
FIG. 17 is a graph showing the stress vs. % strain curves for PS-PAESO-PS#1 in its first load depicted by the blue line, followed by the first hysteresis cycle (black), then by the tenth cycle (red), and the continued loading (gray) to find the maximum stress. Black dots shows the decrease in the maximum stress required to obtain 55% strain as load/unload cycles progress. Young's Modulus of the PS-PAESO-PS#1 load (gray squares) and unload cycles (red stars). Tests was done using an average speed of 50 mm/min and going from 0 to 55% strain.

To study the deformation of the polymer under loading and unloading, the specimens were subjected to 10 consecutive load and unload cycles. Tests were carried out using an average speed of 50 mm/min and going from 0 to 55% strain. FIG. 17 shows the graph for the PS-PAESO-PS#1 in its first load, followed by the first hysteresis cycle, then by the tenth cycle, and allowed to continue to find the maximum stress. The graph showed softening of the biopolymer with each consecutive load/unload cycle; whereas no deformation was seen. This softening seemed to be caused by alignment of the polymer chains and/or the possibility of breaking the interchain secondary bonds. Young's Modulus was plotted with respect with the number cycles, showing an increase in the modulus as the cycles increase. See FIG. 17. This non-linear behavior indicated the high elasticity of the biopolymer.

Figure 18:
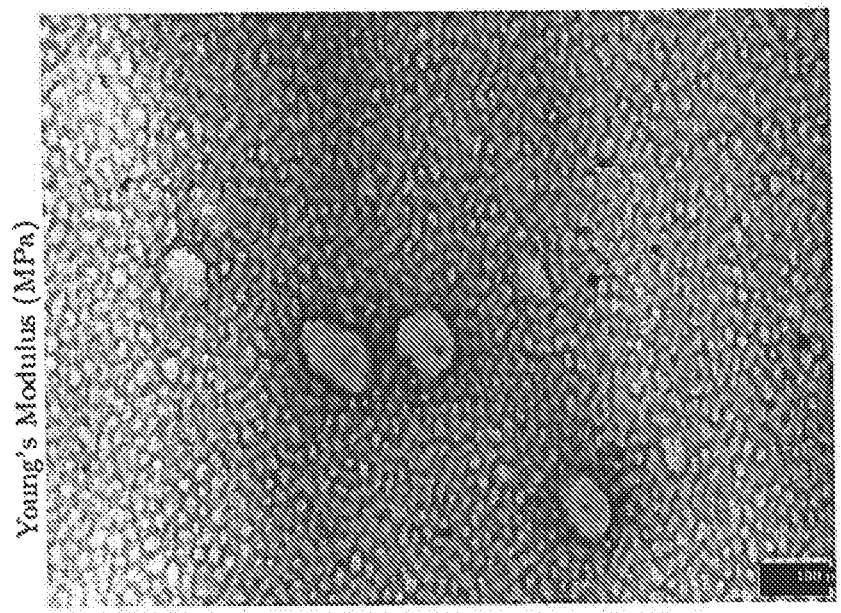
FIG. 18 is a TEM image of the PS-PAESO-PS#1 sample showing a semi-ordered structure where the black islands were styrene block and the lighter regions were the AESO block.

Real-space images of BCPs were collected with a Tecnai G² F20 scanning/transmission electron microscope at a high tension voltage of 200 kV by ultrathin (≈80 nm) sectioning of the BCPs at cryogenic temperature using a Leica Ultramicrotome Ultracut 125UCT, with a Leica EM FCS cryostage. The TEM image of the PS-PAESO-PS triblock stained with osmium tetraoxide $OsO_4$ revealed a semi-periodic microstructure having styrene islands in black surrounded by the AESO regions in a lighter color. See FIG. 18. The ability of these polymers to microphase separate demonstrated that there was a strong incompatibility between the two blocks, indicating the formation of rich AESO and styrene microdomains.

Experiment was conducted on the asphalt modified with different composition of PAESO- and PS-based triblock copolymers, and the results were compared to the experimental results obtained on the asphalt modified with two commercially available SBS polymers. Rheological laboratory testing results of the asphalt-biopolymer blends showed the biopolymers improved the complex shear modulus of the asphalt to a similar and even greater extent as the commercially available SBS polymers. See FIG. 11.

Discussion of Example 9

ATRP polymerization of vegetable oils produced thermoplastic elastomers, as opposed to the thermoset polymers produced by free-radical polymerization. In ATRP, polymerization began when soybean oil molecules became halogenated and started forming low molecular weight linear chains. This process continued until they reached a certain number of repeat units, at which point they either attached to another chain or attacked another monomer to increase the chain length by one. The former path had a low probability as monomer concentration was high and the rate of propagation was much higher than the rate of intermolecular chain transfer. In the latter path, the most probable one, polymers would begin to grow in a hyper-branched fashion where most of the active sites available for crosslinking were contained in the core of a "donut"-like shaped region. When an active chain encountered this molecule, it would have a facile access to the shell of finite thickness but significantly reduced access to the core where the majority of the functional sites resided. This qualitative rational manifested in the rate of chain transfer to polymer, expressed by equation (3), which was derived by making scaling arguments for number of active sites in the shell. The rate of transfer is going to be the same as for free radical modified by a percentage of active sites, which can be estimated by the ratio of the volume of the shell to the volume of the sphere.

$$R_{tr,P} \propto 2.4 k_p N_n \frac{V_{shell}}{V_{sphere}} \quad (3)$$

$k_p$ is the propagation constant, $N_n$ is the average degree of polymerization, $$V_{sphere} \propto \frac{\pi}{6} R_g^3,$$

and $V_{shell} = V_{sphere} - V_{core}$. Where $$V_{core} \propto \frac{\pi}{6} (R_g - t)^3,$$

furthermore $$\frac{V_{shell}}{V_{sphere}} \propto \frac{1}{R_g} \propto \frac{1}{\sqrt{N_n}}.$$

Substitution of the volume fraction into equation (3) gives the ATRP rate of transfer, described in equation (4), which is inversely proportional to the square root of the degree of polymerization. For ATRP, the rate of transfer can be suppressed compared to that of free radical polymerization due to mass transfer limitations.

$$R_{tr,P} \propto 2.4 k_{app} \sqrt{N_n} \quad (4)$$

where kapp is the apparent propagation constant.

Recent advances in polymerization technology have led to the development of elastomeric block copolymers produced with polystyrene and polymerized soy-derived triglycerides, contrasting the past two decades of research that yielded highly crosslinked materials. Using the polymerized triglycerides, SBS-like triblock copolymers were produced where the "B" block was replaced with polymerized soybean oil. ATRP polymerization technique was used to synthesize the biopolymers as it allows for the construction of macromolecules with precisely defined degrees of polymerization and the ability to form complex molecular architectures such as block copolymers.

Example 10—Asphalt Modification with Biopolymers Derived from Soybean Oil

Biopolymer Synthesis

Triglyceride oils are composed of three fatty acid chains joined by a glycerol center. Triglycerides derived from soybean oil were used for the synthesis of the thermoplastic block copolymers (BCPs) using atom transfer radical polymerization (ATRP). ATRP, a controlled radical polymerization technique, allows for the construction of macromolecules with precisely defined degrees of polymerization and the ability to form complex molecular architectures such as block copolymers (HIEMENZ R. C. & LODGE T. P., POLYMER CHEMISTRY (CRC Press, Boca Raton, Fla. 2$^{nd}$ ed. 2007), which is hereby incorporated by reference in its entirety).

For the synthesis of the polymers, soybean oil (Renewable Energy Group, Ames, Iowa) was purified over basic alumina, followed by the epoxidation of the double bonds and subsequent acrylation to yield acrylated epoxidized soybean oil (AESO). AESO and styrene were used as the monomers, copper (I) chloride (CuCl) as the catalyst, benzyl chloride as the initiator, copper (II) chloride ($CuCl_2$) as the counter catalyst, N,N,N',N'',N''-pentamethyldiethylenetriamine (PMDETA) as the ligand, and toluene as the solvent during all polymerizations. ATRP polymerization resulted in the creation of a hyper-branched, halogen-terminated thermoplastic poly(styrene-block-AESO-block-styrene) triblock copolymers (PS-PAESO-PS). The halogen termination provides functional sites for further chemistry. Detailed procedures for synthesizing PAESO and PS-PAESO-PS were described in Examples 1-3 and 6.

The effect of a polymer to asphalt modification is determined by several polymer parameters, including: chain architecture, composition, and the molecular weight distribution. Even though a branched polymer does not disperse as finely into asphalt and can be more difficult to incorporate in the blend, it is more effective in binder elasticity improvement compared to a linear polymer (Lu & Isacsson, "Compatibility and Storage Stability of Styrene-Butadiene-Styrene Copolymer Modified Bitumens," *Materials and Structures* 30:618-626 (1997), which is hereby incorporated by reference in its entirety).

Figure 19A:
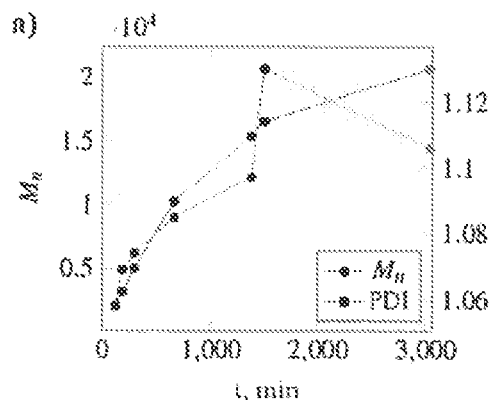
FIGS. 19A-19B are graphs showing the results of the molecular weight ($M_n$) and polydispersity index (PDI) of the polystyrene (PS) homopolymer (FIG. 19A) and the poly(styrene-block-AESO) (P(S-b-AESO)) diblock copolymer (FIG. 19B) as a function of time.
Figure 19B:
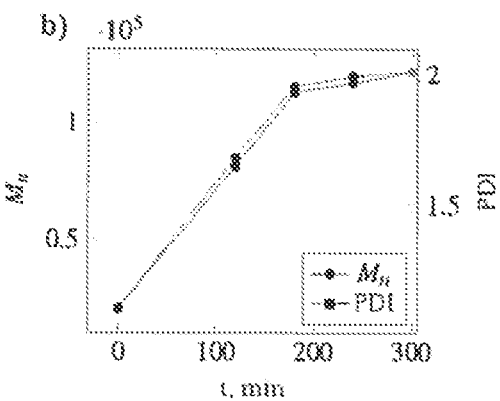

Butadiene-based styrenic BCPs (SBS) copolymers should also meet several requirements to be compatible with asphalt. The SBS copolymers should be rich in butadiene (generally 60-70%) and the molecular weight of the styrene fraction should exceed 10,000 daltons to obtain polystyrene (PS)-rich domains (Lewandowski, "Polymer Modification of Paving Asphalt Binders," *Rubber Chemistry and Technology* 76(3):447 (1994), which is hereby incorporated by reference in its entirety). The (PS-PAESO-PS) biopolymers produced for this example contained 72% poly(AESO). FIGS. 19A-B show the increase in molecular weight (number average) and polydispersity of the styrene homopolymer (FIG. 19A) and poly(styrene-block-AESO) diblock (FIG. 19B) as a function of time. After approximately 700 minutes, the molecular weight of the polystyrene increases well beyond 10,000 daltons and the diblock to 150,000 daltons.

Asphalt Modification with PS-PAESO-PS Biopolymers

To study the effectiveness of the developed PS-PAESO-PS biopolymer as an asphalt modifier, blends of asphalt modified with the PS-PAESO-PS biopolymer were compared to blends of asphalt modified with two commercially available Kraton® SBS polymers, D1101 and D1118. Both of the Kraton® SBS polymers are linear SBS triblock polymers. D1101 has a styrene content of 31% by weight of polymer and D1118 has a styrene content of 33% by weight of polymer.

A soft asphalt from a local refinery utilizing a Canadian crude source was used as the base asphalt. All asphalt-polymer blends were prepared in the laboratory with a Silverson L4RT shear mixer at 3000 rpm. The asphalt was heated to 150° C. and approximately 500 grams of asphalt was poured into each of eight different 0.95-Liter aluminum cans to prepare eight 500-gram batches. Polymers were added to the batches at 3% by total weight of the asphalt-polymer blend.

Blending temperature of asphalt with the biopolymers was then determined. For each polymer, two batches were prepared, with one batch blended for 3 hours at 180° C. and the other batch blended for 3 hours at 200° C. The remaining two batches from the total of eight batches of asphalt were prepared as the control treatments with no polymer added. One control treatment batch was immediately tested after being poured into the aluminum can, while the other control treatment batch was first placed in the shear mixer for 3 hours at 200° C. before being tested. No cross-linking agent such as sulfur was used during the blending process. A softer base binder containing a relatively low fraction of asphaltenes could be used to result in improved blend compatibility and stability in an SBS polymer system (Alonso et al., "Rheology of Asphalt Styrene-butadiene Blends," *Journal of Materials Science* 45:2591-2597 (2010), which is hereby incorporated by reference in its entirety).

After the asphalt-polymer blends were prepared, the complex modulus (G*) and phase angle of the blends were measured at high and low temperatures using the dynamic shear rheometer (DSR) and bending beam rheometer (BBR).

The Multiple Stress Creep Recovery (MSCR) test was then conducted on rolling thin film oven (RTFO)-aged materials by following American Association of State Highway and Transportation Officials (AASHTO) specification TP 70-11. The test was conducted at 46° C. due to the high temperature grade of the virgin asphalt. The original (no aging) material of each blend was also tested in a DSR at multiple temperatures and frequencies so master curves could be constructed that characterize the rheological properties of the asphalt-polymer blends over a wide range of temperatures.

Discussion of Example 10

Asphalt cement is commonly modified with poly(styrene-block-butadiene-block-styrene) (SBS), a thermoplastic elastomer (TPE). Polymer modification is known to substantially improve the physical and mechanical properties of asphalt paving mixtures. Polymer modification increases asphalt elasticity at high temperatures, as a result of an increased storage modulus and a decreased phase angle, which improves rutting resistance. It also increases the complex modulus, but lowers creep stiffness at low temperatures, thus improving cracking resistance (Isacsson & Lu, "Characterization of Bitumens Modified With SEBS, EVA and EBA Polymer," *Journal of Materials Science* 34:737-3745 (1999), which is hereby incorporated by reference in its entirety). SBS-type polymers are typically added to asphalt pavements when additional performance is desired or when optimizing life-cycle costs is warranted. SBS allows for the production of many specialty mixes including cold mixes, emulsion chip seals, and micro-surface mixes.

SBS TPEs are block copolymers (BCPs) comprised of styrene-butadiene-styrene polymer chains that create an ordered morphology of cylindrical glassy polystyrene block domains within a rubbery polybutadiene matrix (Bulatovic et al., "Polymer Modified Bitumen," *Materials Research Innovations* 16(1):1-6 (2012), which is hereby incorporated by reference in its entirety). SBS polymers are thermoplastic, meaning that they can be easily processed as liquids at temperatures higher than their glass transition temperature due to the linear nature of their chains. Upon cooling, the rigid polystyrene end-blocks vitrify and act as anchors for the liquid rubbery domains by providing a restoring force when stretched (FRIED J. R., POLYMER SCIENCE AND TECHNOLOGY (Prentice Hall, Upper Saddle River, NJ, $2^{nd}$ ed. 2008), which is hereby incorporated by reference in its entirety).

SBS is incorporated into asphalt through mixing and shearing at high temperatures to uniformly disperse the polymer. When blended with asphalt binder, the polymer swells within the asphalt maltene phase to form a continuous tridimensional polymer network (Lesueur, "The Colloidal Structure of Bitumen: Consequences on the Rheology and on the Mechanisms of Bitumen Modification," *Advances in Colloid and Interface Science* 145:42-82 (2009), which is hereby incorporated by reference in its entirety). At high temperatures, the polymer network becomes fluid yet still provides a stiffening effect that increases the modulus of the mixture. At low temperatures, a crosslinked network within the asphalt redevelops without adversely affecting the low temperature cracking performance due to the elastic properties of the polybutadiene (Airey G. D., "Styrene Butadiene Styrene Polymer Modification of Road Bitumens," *Journal of Materials Science* 39:951-959 (2004), which is hereby incorporated by reference in its entirety). The resulting performance properties widen the working temperature range of the binder-polymer system.

The butadiene monomer used in SBS is typically derived from petrochemical feedstocks, a byproduct of ethylene production. It has been rapidly increasing in price, not only due to increases in the price of crude oil, but also due to global market shifts in supply and demand. As shale gas supplies become more abundant, crackers are more commonly using lighter petrochemical feeds such as ethane to produce ethylene and its co-products. However, using lighter feeds lowers butadiene production, thus tightening the supply (Foster, "Lighter Feeds in US Steam Crackers Brings New Attitude Toward On-purpose Butadiene, Propylene Prospects," *Platts Special Report: Petrochemicals* 1-6 (2011), which is hereby incorporated by reference in its entirety). Many commercially relevant elastomers require polybutadiene for its soft and rubbery properties. As a result, there is growing interest in sustainable biopolymers synthesized from plant-based feedstocks to replace the need for their petrochemical counterparts, specifically the identification of alternative feedstocks that can be made to mimic the properties of polybutadiene.

Linseed, rapeseed, flaxseed, and soybean, are examples of the agriculturally available biodegradable and renewable resources composed of triglycerides that can be synthesized into the rubbery component in BCPs. Soybean oil, for instance, is comprised of 86% of mono- and poly-unsaturated fatty acids—molecules containing the required double bonds for standard polymerization chemistry to produce macromolecules. Nonetheless, the multifunctional nature of soybean oil allows it to easily crosslink with other polytriglycerides leading to the formation of a thermoset, irreversibly, highly crosslinked polymer. Bhuyan et al, "Micro- and Nano-tribological Behavior of Soybean Oil-based Polymers of Different Crosslinking Densities," *Tribology International* 43:2231-2239 (2010), which is hereby incorporated by reference in its entirety, have shown that a variety of plant oils may be successfully polymerized via cationic polymerization into thermoset polymers with a broad spectrum of physical properties and aesthetic appearances.

Example 10, however, showed the use of polymerized triglycerides to produce a polybutadiene replacement and its incorporation with styrene to form thermoplastic elastomeric triblock copolymers, which was then used to modify asphalt binders.

Figure 20:
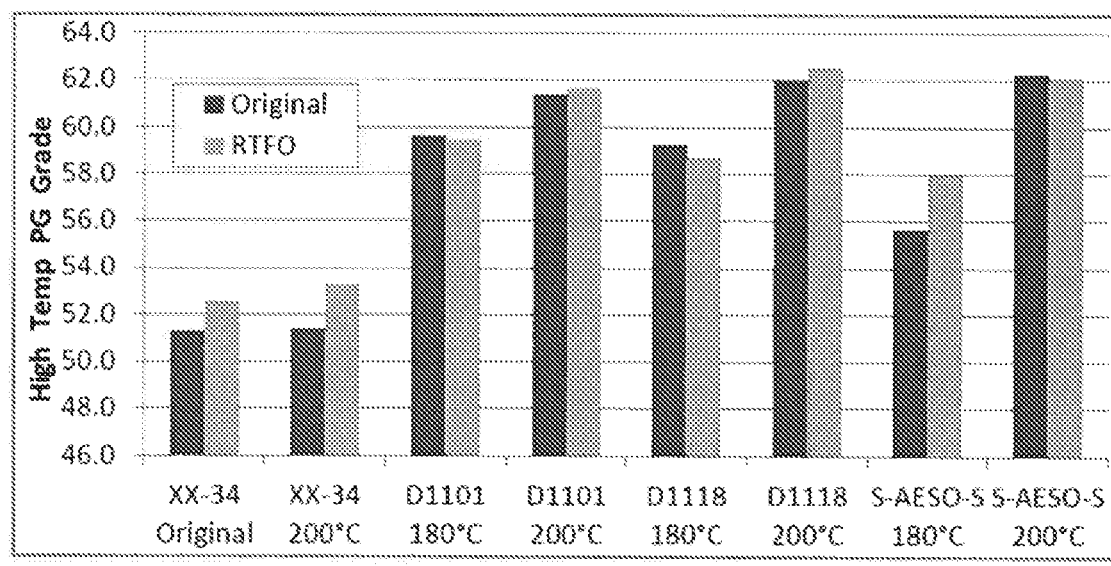
FIG. 20 is a graph showing the high temperature performance grade (PG) of asphalt-polymer blends. "RTFO" in the graph indicates the blends were aged in the rolling thin film oven (RTFO).

In Example 10, the high temperature stiffness of the asphalt-polymer blends before and after aging in the RTFO, under pressures of 1.0 kPa and 2.2 kPa, respectively, is presented in FIG. 20. The virgin asphalt had a performance grade (PG) 46-34 according to AASHTO M320 "Standard Specification for Performance Graded Asphalt Binder," since the original asphalt had a governing G*/Sin(δ) value of 51.3° C. After 3 hours of mixing in the shear mill at 200° C., the PG of the virgin asphalt was only slightly increased with a G*/Sin(δ) value of 52.6° C. This shows the blending procedure used in this study does not significantly age harden the asphalt and increase the performance grade. Any increase in complex modulus or decrease in phase angle was therefore mostly caused by the polymer influencing the rheological properties of the asphalt.

FIG. 20 also shows that raising the blending temperature from 180° C. to 200° C. increased the high temperature PG of asphalt. The two commercial SBS blends performed similarly with the D1118 blend having a slightly higher original G*/Sin(δ) value of 62.0° C. when blended with asphalt at 200° C. The increase in blending temperature had the greatest affect on the biopolymer blend. At 180° C., the original G*/Sin(δ) value for the biopolymer blend was 55.7° C., whereas at 200° C., the original G*/Sin(δ) value for the biopolymer blend was 62.3° C. A comparison of all the original G*/Sin(δ) values shows the biopolymer blended at 200° C. has the highest PG temperature.

Figure 21:
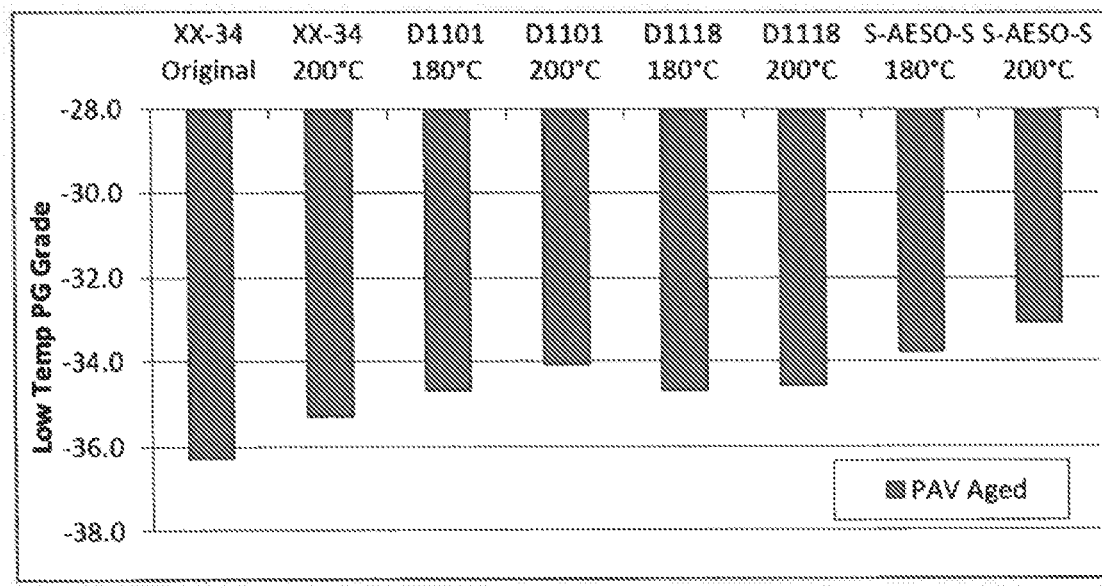
FIG. 21 is a graph showing the low temperature performance grade (PG) of asphalt-polymer blends. "PAV-aged" in the graph indicates the blends were aged in the pressure aging vessel.

FIG. 21 presents the critical low temperatures with a limiting creep stiffness (300 MPa) and limiting m-value (0.3) determined at a loading time of 60 seconds in the BBR. The critical low temperature of the virgin asphalt was −36.3° C. and increased one degree to −35.3° C. after blending for 3 hours in the shear mixer. The critical low temperature also increased for each polymer blend when the blending temperature increased from 180° C. to 200° C., indicating that the increased performance benefits on the high temperature side were compromised on the low temperature side.

With the exception of the biopolymer blends, each asphalt-polymer blend passed the −34° C. criteria to be graded as a 46-34 asphalt. However, the continuous grade range in presented in Table 4 shows the performance grade range of the biopolymer-blended asphalt at 200° C. was only 0.3° C. less than the D1101 SBS-blended asphalt and 1.4° C. less than the D1118 SBS-blended asphalt. The continuous PG range indicates the temperature susceptibility of the biopolymers and their physical performances over a working range of temperatures were very close to the commercially available SBS polymers. These were results obtained before any study was conducted to optimize the formulation of the PS-PAESO-PS biopolymer as an asphalt modifier.

TABLE 4

Continuous PG range of asphalt-polymer blends

| Asphalt-Polymer Blend | Continuous Grade Range, (° C.) |
|---|---|
| 46-34 Original | 87.6 |
| 46-34 blended at 200° C. | 86.7 |
| D1101 blended at 180° C. | 94.2 |
| D1118 blended at 200° C. | 95.5 |
| D1101 blended at 180° C. | 94.0 |
| D1118 blended at 200° C. | 96.6 |
| S-AESO-S Biopolymer blended at 180° C. | 89.5 |
| S-AESO-S Biopolymer blended at 200° C. | 95.2 |

Although many transportation state agencies in the United States use a form of AASTHO M-320 as an acceptance specification of asphalt binders, the high temperature test parameter G*/Sin(δ) has been shown to apply a strain level not high enough to sufficiently test the polymer-modified binders for their rutting resistance. Recently, the Multiple Stress Creep Recovery (MSCR) test was developed in the United States which uses the DSR to apply higher strain levels to capture the stiffening effects and delayed elastic response of the polymer in a polymer-modified asphalt (D'Angelo et al., "Revision of the Superpave High Temperature Binder Specification: The Multiple Stress Creep Recovery Test," *Journal of the Association of Asphalt Paving Technologists* 76:123-162 (2007), which is hereby incorporated by reference in its entirety).

Figure 22:
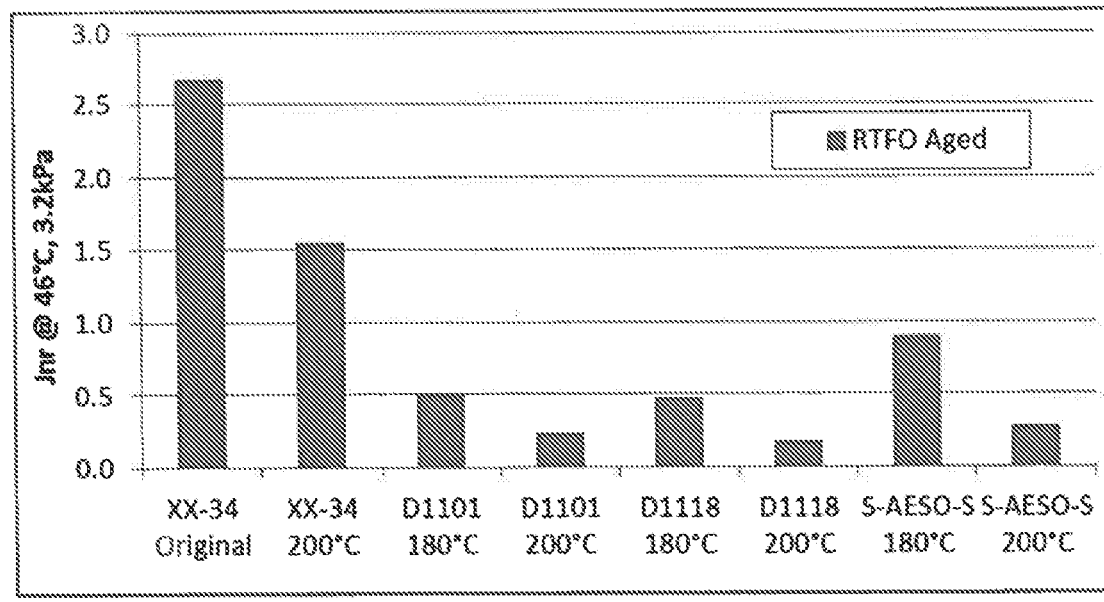
FIG. 22 is a graph showing the non-recoverable creep compliance (Jnr) values.

The non-recoverable creep compliance (Jnr) calculated from the MSCR test is presented in FIG. 22. Lower Jnr values indicate good resistance to rutting. The commercial asphalt-SBS polymer blends at 200° C. and the biopolymer blend at 200° C. had the lowest Jnr values. The biopolymer blends along with the commercial blends at 200° C. met the highest traffic level criteria of "Extremely Heavy Traffic" since their Jnr values fell below 0.5 kPa.

Figure 23:
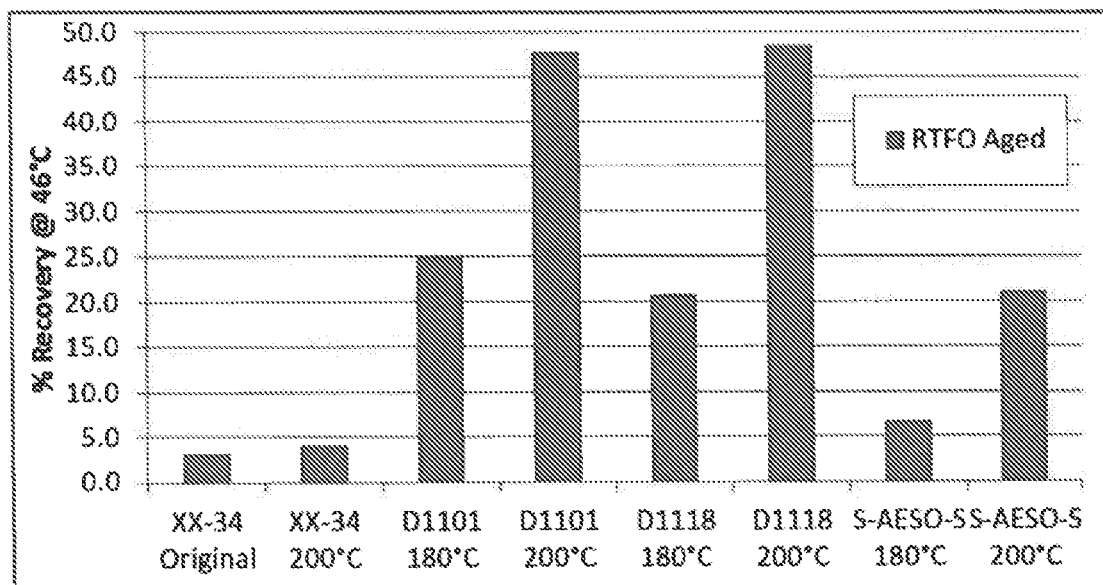
FIG. 23 is a graph showing the percent recovery of the asphalt-polymer blends.

In addition to the Jnr values, the MSCR test also measures the "recovery" value which indicates the percent strain recovered during the test. Higher percentages of strain recovery indicate the presence of an elastomeric polymer and the quality of the asphalt-polymer blend. In FIG. 23, the higher blending temperature appeared to improve the polymer network established in the binder. Similar results were found by D'Angelo & Dogre, "Practical Use of Multiple Stress Creep and Recovery Test," *Transportation Research Record* 2126, Transportation Research Board, National Research Council, Washington, D.C., 73-82 (2009), which is hereby incorporated by reference in its entirety, in an SBS blending study using the MSCR test. The results of this test also showed the contrast in elastic recovery between the commercial SBS polymer blends (47.8% for D1101 and 48.6% for D1118) and the biopolymer blend (21.1%) at the higher blending temperature.

Figure 24:
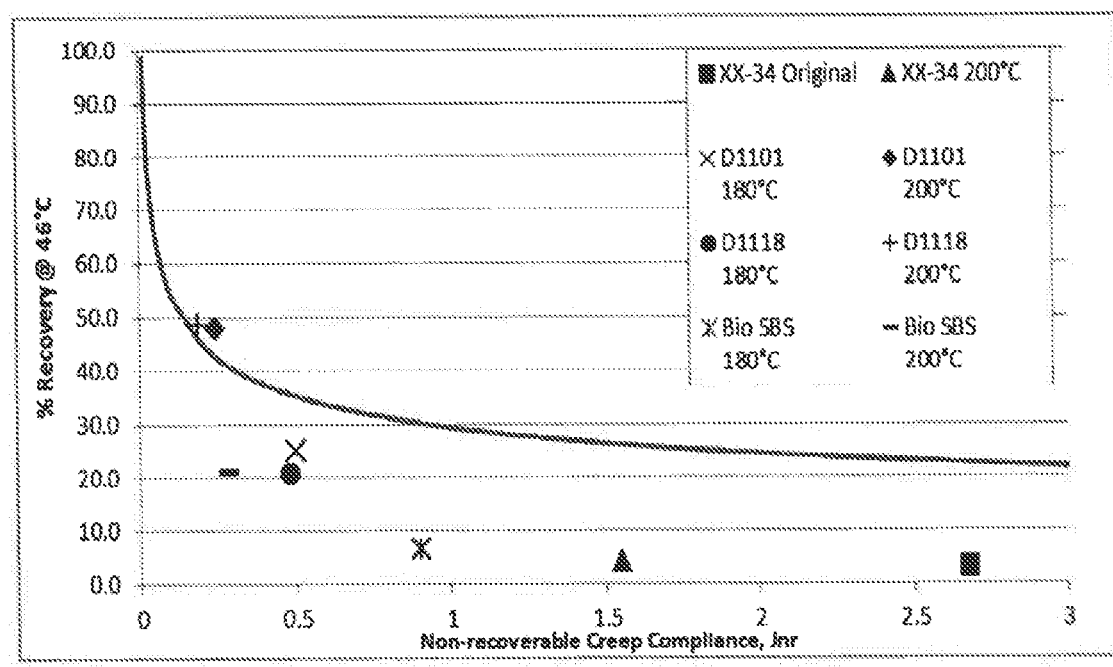
FIG. 24 is a graph showing the percent recovery versus non-recoverable creep compliance of the asphalt-polymer blends.

FIG. 24 plots the MSCR recovery as a function of Jnr. The curve in the plot represents the recommended minimum percent recovery values a polymer-modified asphalt should have for sufficiently delayed elastic response. Values that plot above the line indicate the presence of an elastomeric polymer and a quality blend. The biopolymer percent recovery did not plot above the curve which means the blending procedure and/or biopolymer formulation may be further improved to enhance the quality of the asphalt blends. The commercial polymers are linear polymers and, therefore, should be more compatible with an asphalt binder than a radial polymer when a crosslinking agent is not used. In contrast, the biopolymer has a branched network due to the polytriglycerides. A crosslinking agent may improve the ability of the biopolymer to form an evenly dispersed and slightly crosslinked network in the asphalt.

Master curves used to analyze the rheological properties of the asphalt-polymer blends were constructed from data using the DSR. Frequency sweeps were conducted on 25 mm plate samples in the materials linear viscoelastic range from 0.1 Hz to 50 Hz at 6° C. intervals from 16° C. to 70° C. The master curve for the complex shear modulus (G*) data was constructed using Excel Solver. G* isochrones were shifted to fit the Williams-Landel-Ferry (WLF) model with 40° C. as the reference temperature. The shift factors were then used to shift the phase angle data to build the phase angle master curve. Equation 5 presents the WLF equation.

$$\text{Log} a_T = \frac{-C_1(T - T_r)}{C_2 + T - T_r} \quad (5)$$

where $a_T$=shift factor, $C_1$ and $C_2$=constants, $T_r$=reference temperature, and T=temperature of the material.

Figure 25:
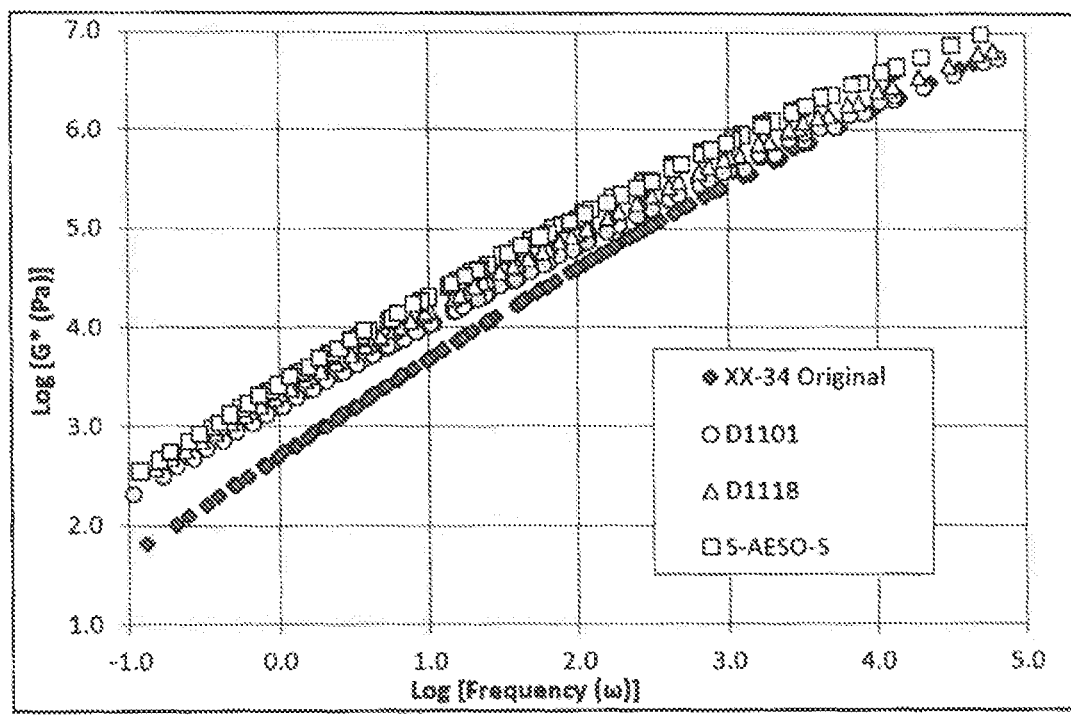
FIG. 25 is a graph showing the percent recovery versus non-recoverable creep compliance of the asphalt-polymer blends.
Figure 26:
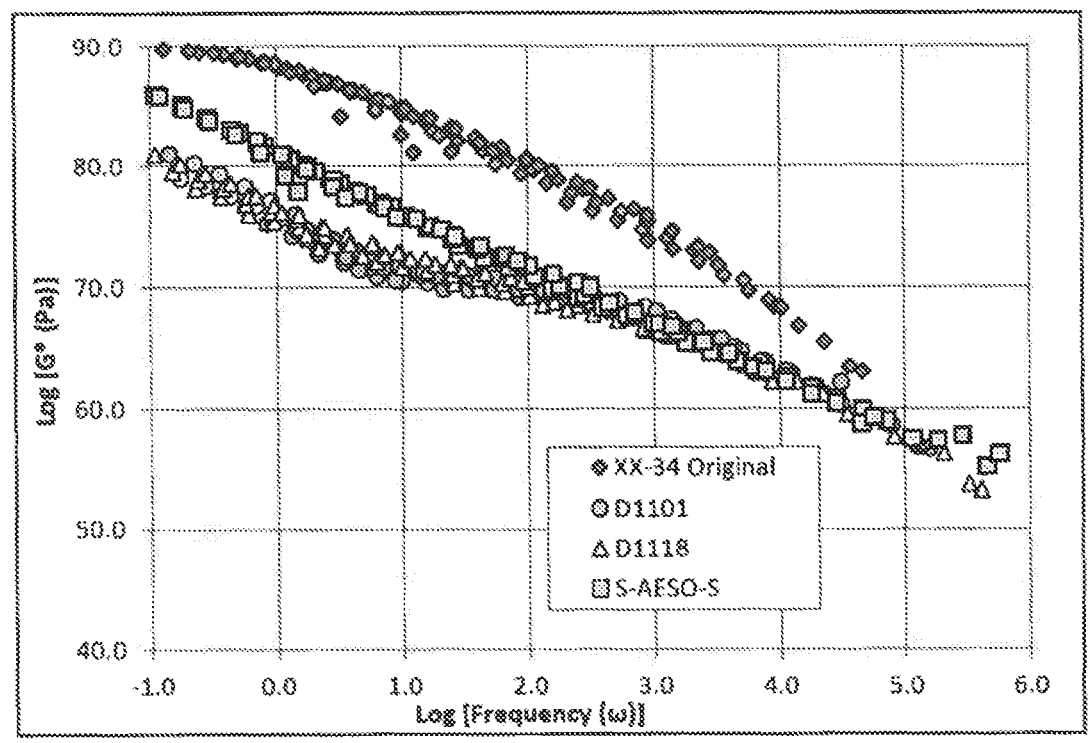
FIG. 26 is a graph showing the percent recovery versus non-recoverable creep compliance of the asphalt-polymer blends.

The shear modulus master curves in FIG. 25 show the biopolymer increased the stiffness of the virgin asphalt across a wide frequency range. In FIG. 26, the biopolymer also reduced the phase angle of the asphalt, but not to the levels as low as the two SBS polymers. In FIG. 26, the asphalt modified with the two SBS polymers had a dip in the phase angle, showing evidence of the polymer rubbery plateau. Similar rubbery plateau did not appear to show in the biopolymer modified asphalt. This data suggests the blending procedure and/or biopolymer formulation may be further improved to provide the asphalt with a sufficient elastic response. The lowered phase angle might be the result of the stiffening effect from the glassy polystyrene phase.

In Example 10, using the polymerized triglycerides, SBS-like triblock copolymers were produced where the "B" block was replaced with polymerized soybean oil. ATRP polymerization technique was used to synthesize the biopolymers allowing for the construction of macromolecules with precisely defined degrees of polymerization and the ability to form complex molecular architectures such as block copolymers.

The effectiveness of the PS-PAESO-PS biopolymer as an asphalt modifier was evaluated and compared against the asphalt modified with two commercially available Kraton® linear SBS polymers. All asphalt-polymer blends were prepared with a base asphalt modified with 3% polymer. Rheology test results showed the ability of the biopolymer to widen the grade range of asphalt almost identically as the commercially available SBS polymers, although the low critical temperature of the biopolymer was 1.4° C. higher than the D1118 SBS polymer. The MSCR test results also showed the biopolymer lowered the Jnr value as low as those of the two commercially available SBS polymers.

The biopolymer and the SBS polymers showed differences in performance when measured for their elastic response in the MSCR test and their phase angle at different temperatures. The current yet to be optimized formulation of the biopolymer did not appear to indicate a rubbery plateau in the asphalt-polymer blend phase-angle master curve and provided a 21.1% MSCR recovery compared to the 48.6% elastic recovery provided by the D1118 SBS polymer. However, this may be overcome by optimizing the asphalt blending formulation of the biopolymer and the blending procedures.

Although preferred embodiments have been depicted and described in detail herein, it will be apparent to those skilled in the relevant art that various modifications, additions, substitutions, and the like can be made without departing from the spirit of the present invention and these are therefore considered to be within the scope of the present invention as defined in the claims which follow.

What is claimed:

1. A method of preparing a thermoplastic block copolymer, said method comprising:
   providing a radically polymerizable monomer, represented by A, or a polymer block PA comprising more than one unit of monomer A;
   providing a radically polymerizable plant oil monomer containing one or more triglycerides, represented by B; and
   radical polymerizing monomer A or the polymer block PA with monomer B, in the presence of an initiator and a transition-metal catalyst system to form the thermoplastic block copolymer.

2. The method of claim 1, wherein said radical polymerizing comprises:
   a) radical polymerizing monomer A in a solvent suitable for dissolving PA; and
   b) radical polymerizing monomer B in a solvent suitable for dissolving PA and PB, with PA from step a) being the initiator, to form a diblock copolymer PA-PB.

3. A method of preparing a thermoplastic block copolymer, said method comprising:
   providing a radically polymerizable plant oil monomer containing one or more triglycerides, represented by B, or a polymer block PB comprising more than one unit of monomer B;
   providing a radically polymerizable monomer, represented by A; and
   radical polymerizing monomer B or the polymer block PB with monomer A, in the presence of an initiator and a transition-metal catalyst system, to form the thermoplastic block copolymer.

4. The method of claim 3, wherein said radical polymerizing comprises:
   a) radical polymerizing monomer B in a solvent suitable for dissolving PB; and
   b) radical polymerizing monomer A in a solvent suitable for dissolving PA and PB, with PB from step a) as the initiator, to form the diblock copolymer PB-PA.

5. The method of claim 2, further comprising:
c) radical polymerizing monomer A or monomer B with the formed block copolymer in step b) as the initiator, thereby adding an additional polymer block to the block copolymer formed in step b).

6. The method of claim 5, further comprising:
d) repeating step c) to form a multiple block copolymer.

7. The method of claim 1, further comprising:
catalytically hydrogenating the PB block to partial or full saturation after said radical polymerizing.

8. The method of claim 1, wherein said radical polymerizing is carried out by atom transfer radical polymerization.

9. The method of claim 1, wherein the monomer A is vinyl, acrylic, diolefin, nitrile, dinitrile, or acrylonitrile monomer.

10. The method of claim 1, wherein the monomer A is selected from the group consisting of styrene, α-methyl styrene, t-butyl styrene, vinyl xylene, vinyl naphthalene, vinyl pyridine, divinyl benzene, methyl acrylate, methyl (meth)acrylate, ethyl (meth)acrylate, propyl (meth)acrylate, butyl (meth)acrylate, heptyl (meth)acrylate, hexyl (meth) acrylate, acrylonitrile, adiponitrile, methacrylonitrile, butadiene, isoprene, and mixtures thereof.

11. The method of claim 10, wherein the monomer A is styrene.

12. The method of claim 1, wherein the plant oil is soybean oil, linseed oil, flax seed oil, or rapeseed oil.

13. The method of claim 1, wherein the plant oil is acrylated epoxidized plant oil.

14. The method of claim 1, wherein the monomer A is styrene, and the monomer B is soybean oil.

15. The method of claim 1, wherein said radical polymerizing is carried out at a temperature of 65 to 100° C.

16. The method of claim 2, wherein said radical polymerizing of step a) forms a PA block having a molecular weight of 1 to 300 kDa.

17. The method of claim 2, wherein the diblock copolymer PA-PB or PB-PA has a molecular weight of 5 to 500 kDa.

18. The method of claim 5, wherein said radical polymerizing of step c) forms a block copolymer PA-PB-PA having a molecular weight of 7 to 1000 kDa.

19. The method of claim 2, wherein the solvent is toluene, THF, chloroform, cyclohexane, or a mixture thereof.

20. The method of claim 19, wherein the monomer concentration dissolved in the solvent ranges from 5% to 100% weight percentage monomer.

21. The method of claim 1, wherein the initiator is an aryl halide.

22. The method of claim 21, wherein the initiator is benzyl chloride.

23. The method of claim 1, wherein the transition-metal catalyst system comprises a transition-metal compound and a ligand capable of coordinating to the transition metal of the transition-metal compound.

24. The method of claim 23, wherein the transition-metal compound is CuCl.

25. The method of claim 23, wherein the ligand is a N-, O-, P-, or S-containing compound capable of coordinating with the transition metal in a form of σ- or π-bond.

26. The method of claim 25, wherein the ligand is pentamethyldiethylenetriamine (PMDETA).

27. A method of preparing a thermoplastic polymer or polymer block, said method comprising:
providing a radically polymerizable plant oil monomer containing one or more triglycerides; and
radical polymerizing said plant oil monomer, in the presence of an initiator and a transition-metal catalyst system to form the thermoplastic polymer or polymer block.

28. The method of claim 27, wherein said radical polymerizing is carried out by atom transfer radical polymerization.

29. The method of claim 27, wherein the plant oil is soybean oil, linseed oil, flax seed oil, or rapeseed oil.

30. The method of claim 27, wherein the plant oil is acrylated epoxidized plant oil.

31. The method of claim 1, wherein the method is carried out in the presence of a counter-catalyst and a solvent at a temperature ranging from 65 to 85° C.

* * * * *